(12) United States Patent
Martin et al.

(10) Patent No.: US 11,692,090 B2
(45) Date of Patent: Jul. 4, 2023

(54) DIELECTRIC CROSS-LINKED FLUOROPOLYMER

(71) Applicants: DAIKIN AMERICA, INC., Orangeburg, NY (US); DAIKIN INDUSTRIES, LTD., Osaka (JP)

(72) Inventors: Arthur W. Martin, Decatur, AL (US); Kyle R. Ptak, Decatur, AL (US); Lensey H. Smith, Decatur, AL (US); Dakarai Kameron Brown, Hopkins, MN (US)

(73) Assignees: DAIKIN AMERICA, INC., Orangeburg, NY (US); DAIKIN INDUSTRIES, LTD., Osaka (JP)

( * ) Notice: Subject to any disclaimer, the term of this patent is extended or adjusted under 35 U.S.C. 154(b) by 21 days.

(21) Appl. No.: 16/945,680

(22) Filed: Jul. 31, 2020

(65) Prior Publication Data
US 2021/0032453 A1    Feb. 4, 2021

Related U.S. Application Data

(60) Provisional application No. 62/881,703, filed on Aug. 1, 2019.

(51) Int. Cl.
| | | |
|---|---|---|
| C08K 5/1535 | (2006.01) | |
| C08K 5/3417 | (2006.01) | |
| C08K 5/353 | (2006.01) | |
| C08F 214/18 | (2006.01) | |
| C08L 79/08 | (2006.01) | |
| C08L 27/18 | (2006.01) | |
| C08L 27/24 | (2006.01) | |
| C08L 29/10 | (2006.01) | |
| C08L 27/20 | (2006.01) | |
| C08G 73/10 | (2006.01) | |
| C08K 5/00 | (2006.01) | |

(52) U.S. Cl.
CPC ............... *C08L 27/20* (2013.01); *C08L 27/18* (2013.01); *C08L 29/10* (2013.01); *C08F 214/18* (2013.01); *C08F 214/184* (2013.01); *C08G 73/1046* (2013.01); *C08K 5/0025* (2013.01); *C08K 5/1535* (2013.01); *C08K 5/3417* (2013.01); *C08K 5/353* (2013.01); *C08L 27/24* (2013.01); *C08L 79/08* (2013.01); *C08L 2205/025* (2013.01); *C08L 2205/03* (2013.01); *C08L 2205/08* (2013.01); *C08L 2312/00* (2013.01)

(58) Field of Classification Search
None
See application file for complete search history.

(56) References Cited

U.S. PATENT DOCUMENTS

| | | | |
|---|---|---|---|
| 4,214,060 | A | 7/1980 | Apotheker et al. |
| 4,353,961 | A | 10/1982 | Gotcher et al. |
| 5,059,483 | A | 10/1991 | Lunk et al. |
| 5,409,997 | A | 4/1995 | Murphy |
| 6,080,487 | A | 6/2000 | Coggio et al. |
| 6,559,238 | B1 | 5/2003 | Brothers et al. |

(Continued)

*Primary Examiner* — Richard A Huhn
(74) *Attorney, Agent, or Firm* — Sughrue Mion, PLLC

(57) ABSTRACT

A polymer composition of cross-linked fluoropolymers is provided, that is generated using a fluoropolymer compatibilizer. The cross-linked fluoropolymers have excellent mechanical and dielectric characteristics at high temperatures, making them useful for such applications as insulation for automotive communications cables and PCB laminates.

18 Claims, 43 Drawing Sheets

(56) References Cited

U.S. PATENT DOCUMENTS

| | | |
|---|---|---|
| 6,716,919 B2 | 4/2004 | Lichtenhan et al. |
| 7,193,015 B1 | 3/2007 | Mabry et al. |
| 7,897,667 B2 | 3/2011 | Mabry et al. |
| 8,394,870 B2 | 3/2013 | Hung et al. |
| 2001/0029284 A1* | 10/2001 | Nagashima ............. C08L 27/12 525/422 |
| 2010/0218975 A1 | 9/2010 | Mehan |
| 2013/0072637 A1 | 3/2013 | Hung et al. |

* cited by examiner

FIG. 10
Tetravinyl-terminated polyimide:
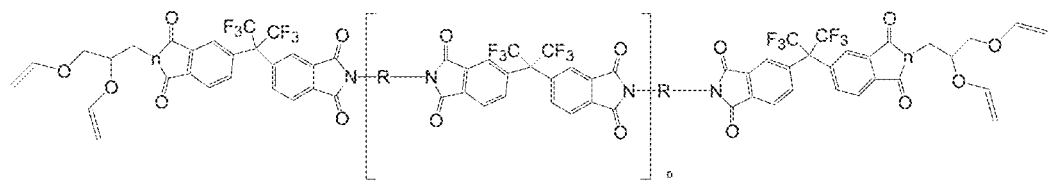
Vinyl POSS Cage:
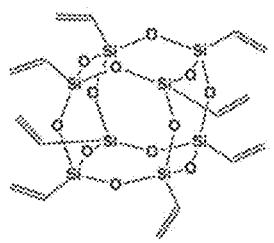
1,3,5-Triallyl-1,3,5-triazine-2,4,6(1H,3H,5H)-trione
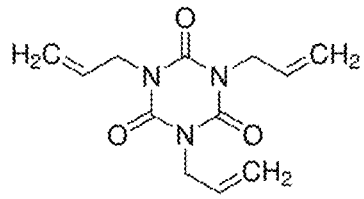
Octamaleamic acid POSS
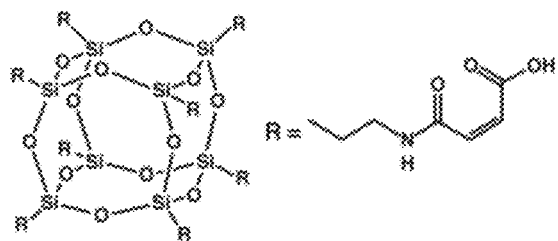

FIG. 11

| | |
|---|---|
| ZrS-10 | zirconium (+4) salt of TBSA |
| CrS-10 | chromium (+3) salt of TBSA |
| CeS-10 | cerium (+4) salt of TBSA |
| KS-10 | potassium salt of TBSA |
| HS-10 | TBSA |
| AS-10 | aluminum salt of TBSA |
| SrS-10 | strontium salt of TBSA |
| CaS-10 | calcium salt of TBSA |
| ZnS-10 | zinc salt of TBSA |
| BaS-10 | barium salt of TBSA |
| LS-10 | lithium salt of TBSA |
| FS-10 | iron (+3) salt of TBSA |
| TEAS-10 | triethylamine salt of TBSA |
| BS-6A | barium p-(perfluoro[1,3-dimethylbutyl]) benzene sulfonate |
| BS-9A | barium p-(perfluoro[1,3,5-trimethylhexyl]) benzene sulfonate |
| BaS-A1(H) | barium p-toluene sulfonate |
| BaP-A | barium benzene phosphonate |
| NaP-A | sodium benzene phosphonate |
| NaS-A(II) | 4,5-dihydroxy-m-benzene disulfonic acid disodium salt |
| NaS-6 | sodium perfluorohexane sulfonate |
| BS-6 | barium perfluorohexane sulfonate |
| BS-8 | barium perfluorooctane sulfonate |
| KS-6 | potassium perfluorohexane sulfonate |
| KS-8 | potassium perfluorooctane sulfonate |
| KS-8C | potassium perfluorocyclohexylethane sulfonate |
| NaS-1 | sodium trifluoromethane sulfonate |
| KS-1 | potassium trifluoromethane sulfonate |
| KS-1(H) | potassium methane sulfonate |
| BaS-3(H) | barium propane sulfonate |
| NaTCA | sodium trichloroacetate |
| BTBP | barium salt of $F(CF_2)_nCH_2CH_2PO_3H$ wherein n is a mixture of 6, 8, 10 and possibly 12, predominantly 8 |
| NTBP | sodium salt of $F(CF_2)_nCH_2CH_2PO_3H$ wherein n is a mixture of 6, 8, 10 and possibly 12, predominantly 8 |
| LL1121B | barium perfluoro(2,5-dimethyl)-3,6-dioxatridecanoate |
| BC14(06) | barium perfluoro 3,5,7,9,11,13-hexaoxatetradecanoate |
| BS-12(H) | barium lauryl sulfate |
| NS-12(H) | sodium lauryl sulfate |
| CC-18(H) | calcium stearate |
| BaC-8 | barium perfluorooctanoate |
| BaC-9 | barium perfluorononanoate |
| AWG-26 | Solid copper wire 404 micrometers in diameter |
| AWG-24 | Solid copper wire 510 micrometers in diameter |
| AWG-22 | Solid copper wire 635 micrometers in diameter |

DIELECTRIC CROSS-LINKED FLUOROPOLYMER

BACKGROUND

Field

The present disclosure relates generally to thermoplastics, and specifically to cross-linked fluoropolymer thermoplastics, methods of their production, and uses thereof.

Background

Thermoplastic fluoropolymers possess superior properties including: low coefficient of friction, excellent chemical resistance, good electrical insulation characteristics, and good thermal resistance. Because of the excellent inherent properties of fluoropolymer resins, they are utilized in wire insulation, cable jacket, automotive under engine wiring, electrical appliance, oil and gas down-hole cable, pressure hose and thin films. Fluoropolymers help to meet the specialty requirements posed by such applications.

There are many potential applications in which polymers, such as those used in the insulation of wires, may be exposed to heat continuously. In general, thermoplastics (which by definition melt) suffer decreased mechanical properties at high temperature. Increases in temperature normally result in a decrease in tensile strength, tensile modulus, compressive strength, dynamic cut-through, and abrasion resistance. As a result, thermoplastics are not considered suitable materials for use under conditions of sustained high temperature.

While fluoropolymers have higher use temperatures than many commodity plastics, this decrease in mechanical properties persists for fluoropolymers. This often leads to a combination of polymers being used for wire and cable jacketing in areas that require high temperature resistance. A layered structure of polyimide (PI) and polytetrafluoroethylene (PTFE) tapes are often used; PTFE provides flexibility and cut-through resistance, while PI provides rigidity. Both PTFE and PI are high-temperature plastics. The use of these materials requires wires and cables to be tape-wrapped in multiple successive steps (typically three layers: PTFE, PI, PTFE). This process is generally more energy and time intensive than coating a wire with a melt-processable polymer directly. However, such tape wraps are considered the industry standard in such industries as aerospace.

To function as a replacement for the tape wrap that is currently used, a melt-processable fluoropolymer would need to meet many mechanical, thermal, and electrical requirements. In aeronautical applications, a wide range of temperatures is experienced by the materials of construction. Materials must be able to withstand these temperatures for short times as well as rapid temperature fluctuations. At these temperatures, materials must maintain their mechanical properties. For wire and cable, the resistance to abrasion and cut-through are of utmost importance. While these properties can be measured directly, hardness, tensile modulus, and tensile strength can serve as guiding properties. Similarly, materials for wire and cable must be flexible enough to as not to break under the bending stresses encountered, such as going around corners. This means a high elongation (>100%) at break is desirable. For certain applications, low dielectric constant and dielectric loss (Dk and Df, respectively), are also needed to prevent cross-talk of tightly packed data transmission wires. Additionally, in aerospace applications, materials may be exposed to high levels of radiation; maintenance of mechanical properties when exposed to radiation is necessary.

Thermoplastics such as polyethylene have been cross-linked to improve their mechanical properties both at room temperature and with increased service temperature. Cross-linking, or alternatively, molecular weight increase or hyper-branching, improves not only thermal resistance, but also allows plastics to maintain improved mechanical properties at elevated temperatures. This strategy has been applied to partially fluorinated fluoropolymers such as ethylene Tetrafluoroethylene (ETFE) and Polyvinylidene fluoride (PVDF). ETFE and PVDF are normally cross-linked via one of two methods. Either additives are used during processing and cross-linking is initiated via chemical reaction within the extruder, or radiation is used. In radiation cross-linking, a two-step process is necessary: extrusion followed by exposure to radiation (for example by an electron beam or e-beam). Both methods are used to improve the mechanical properties of ETFE and PVDF both at room temperature and elevated temperatures.

Fully fluorinated systems such as fluorinated ethylene propylene (FEP), which is a copolymer of hexafluoropropylene and tetrafluoroethylene, and perfluoroalkoxy alkanes (PFA) often possess improved electrical and thermal properties over their partially fluorinated counterparts. However, FEP and PFA cannot be cross-linked by e-beam radiation.

Described herein is a state of matter and a method of producing the same for a fluoropolymer with cross-linking agents to induce enhanced mechanical performance. Chemically cross-linking PFA and FEP would allow processing improvements over the current industry standard. By utilizing a chemical cross-link rather than radiative cross-link, a simplified process to produce cross-linked material can be utilized. Additionally, PFA and FEP are melt-processable. Disclosed is a method that requires a simple extruder set-up. ETFE is commonly cross-linked using triallyl isocyanurate (TAIC), which has a boiling point of 144° C. TAIC would excessively boil at the temperatures needed to extrude FEP or PFA, requiring specialized injection processes which are not needed in the disclosed methods. In some embodiments, a material with high temperature resistance that maintains its mechanical properties at such elevated temperatures could be produced and applied to its substrate in a single processing step. This would allow the production of a thermally stable, mechanically strong jacketing for wire and cable in aerospace and other specialty applications in a simple fashion.

In the electronics industry, polymeric materials used to manufacture Printed Circuit Board (PCB) laminates can be ranked by the value of their dielectric constant (Dk), and their dissipation factor (Df), with the top of the pyramid represented by the highest performance materials having the lowest dielectric constant and dissipation factor. A PCB can be rigid, flexible, or rigid-flexible, and contain 1 to 50 or more laminates, each made of thermoplastic or thermoset materials. The material used for a specific laminate in a PCB will depend on a variety of factors, such as cost, position in the PCB, and technical characteristics including mechanical, electrical, thermal, and other properties.

Low Dk and low Df, which define a material as being "low loss," are critical properties for high-speed digital/high frequency PCBs which are used in a variety of emerging markets such as autonomous driving and Fifth Generation Wireless Communication (5G). Applications include, but are not limited to, automotive radars and electronic components found in 5G communication devices; such components include, without limitation, radio frequency components and power amplifiers and antennas, especially operating in the so-called mm wave band (30 GHz and above). Low loss (Dk, Df) thermoplastic laminates are used in high frequency PCBs to enable high-power applications and reduce the loss of energy generated by heat, which would degrade the quality of the signal. Low Dk laminates are particularly important in high speed digital PCBs by enabling rapid signal propagation.

Polytetrafluoroethylene (PTFE) is a thermoplastic material exhibiting some of the lowest dielectric properties, and is thus the preferred material for low loss PCB laminate. Its mechanical properties are however relatively weak compared to other specialty materials used in high performance PCB applications, such as Liquid Crystal Polymers (LCP) and Polyimide (PI). Furthermore, its low surface energy makes it difficult to bond other materials to it.

In the automotive industry, due to ever increasing network data traffic, modern computer systems have been continuously updated with higher processing speeds and bandwidth to keep pace. These increasing data demands are becoming ever more present in network systems used in motor vehicles. Historically, to transfer data in motor vehicle network systems, the industry has relied upon systems such as controller area networks (CAN Bus). Systems such as CAN Bus, and the cables to support them, are too slow and cumbersome to handle the new high speed and broadband devices being placed in motor vehicles such as Lidar, Radar, advanced infotainment, and back up camera systems. The motor vehicle is quickly becoming a rolling Virtual Private Network (VPN) and will need to be able to process increasing data throughput, with very high reliability and uptime, at ever increasing speeds (lower latency). To realize the next generation in motor vehicle control, autonomous driving, an advanced network operating system, such as Ethernet, will need to be deployed. Ethernet is the universal operations protocol for network systems used in buildings. Once high speed Ethernet is installed in motor vehicles, they will be able to communicate with the new 5G network, and seamless, reliable, low latency communication will be available for advanced applications such as autonomous driving.

The Institute of Electrical and Electronics Engineers (IEEE) 802.3 Ethernet Group and the Society of Automotive Engineers (SAE) have developed, or are in the process of developing, standards for high speed Ethernet motor vehicle networks (including the physical layer). According to these standards, automotive Ethernet networks will be interconnected with high performance, single pair, twisted pair cables. This is a departure from building systems which have historically used four pair, twisted pair cables. The automotive industry's need for reduced size and weight have driven developers to create these unique single pair designs. Ethernet technology has advanced to the point that ultimately multiple gigabits of data per second will be reliably transmitted over a single twisted pair cable. Unfortunately, the materials used in previously known Ethernet cables are not capable of withstanding the environmental conditions within a motor vehicle while still allowing the Ethernet cable to provide sufficient data throughput to meet the data demands of modern and future motor vehicle computer systems.

Consequently, there is a need in the art for methods of processing fluorinated thermoplastics that impart sufficient mechanical properties for high temperature applications, such as new types of communications cables (e.g., Ethernet cables) and high speed/high frequency PCB laminates.

SUMMARY

The present disclosure describes a polymer composition that addresses the problems described above by adding chemically cross-linkable groups to thermoplastic fluoropolymers. A fluorinated system is disclosed with pendant or end terminal groups that can be compatibilized by an unsaturated bisoxazoline moiety that, with the addition of a multifunctional vinyl cross-linker and peroxide catalyst, yields a stable system with improved mechanical properties.

Some disclosed embodiments relate to chemically cross-linked fluoropolymer systems that are highly fluorinated systems with end groups or side groups that can be melt compatibilized with a high temperature aromatic bisoxazoline species containing a double bond. The compatibilized chain-extended blend may be combined with a multifunctional cross-linker to yield a cross-linked system during extrusion or injection molding. The fluoropolymer can also be pelletized and then later extruded or molded into different articles. In some embodiments, further inducement to cross-link, including e-beam irradiation or the use of an organic peroxide is not necessary to achieve enhanced properties. Mechanical properties such as tensile modulus, flexural modulus, and storage modulus may increase up to 100% over pure PFA. The improved properties of the fluoropolymer make it ideal for a wide variety of applications where high performance wire and cable Jacketing and insulation is needed, including aerospace, 5G, automotive, and oil and gas.

Some disclosed embodiments relate to a fluoropolymer containing end terminal groups, where the terminal end groups are utilized with a compatibilization agent such as 4,4'-bis(2-benzoxazolyl)stilbene which acts to stabilize the miscibility of the other components. Compatibilizers capable of withstanding high temperatures without decomposition are utilized for some embodiments of the disclosed system. A cross-linking agent, such as polyether imide resin containing terminal functional groups or a polyhedral oligomeric silsesquioxane (POSS) functionalized with vinyl groups, is added to the blended system to improve cross-link density above what normally could be obtained. These components can be blended, reacted, and formed in a single extrusion or other processing step without the need for equipment specialized to low-boiling materials.

Some disclosed embodiments relate to articles having improved tensile modulus, maximum tensile stress, tensile strength, flexural modulus, and maximum flexural load; tunable elongation, and in some embodiments, increased Shore D hardness and higher storage modulus over a wide range of temperatures.

Some disclosed embodiments relate to a di-functional stilbene. The stilbene moieties may be linked by an unsaturated hydrocarbon chain. Fluoropolymers often have functional end groups after production, often comprising of carboxylic acid of hydroxyl end groups. These carboxylic acid end groups react with the stilbene. In some embodiments, this creates a chain-extended PFA with an unsaturated hydrocarbon incorporated along the backbone. This unsaturation can then be cross-linked with vinyl groups, such as those present on vinyl POSS, or via other functional groups such as maleimide.

Some disclosed embodiments relate to the combination of a fluoropolymer, unsaturated bisoxazoline as a compatabilizer, and high-temperature thermally initiated cross-linking groups.

The above presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

FIG. 1 shows dielectric constant of functionalized FEP (KP18006249C) and pure fully fluorinated FEP to be similar.

FIG. 10 shows structures of specific cross-linking agents suitable for use in the compositions and processes disclosed.

FIG. 11 shows some examples of nucleating agents.

DETAILED DESCRIPTION

A. Definitions

Figure 1:
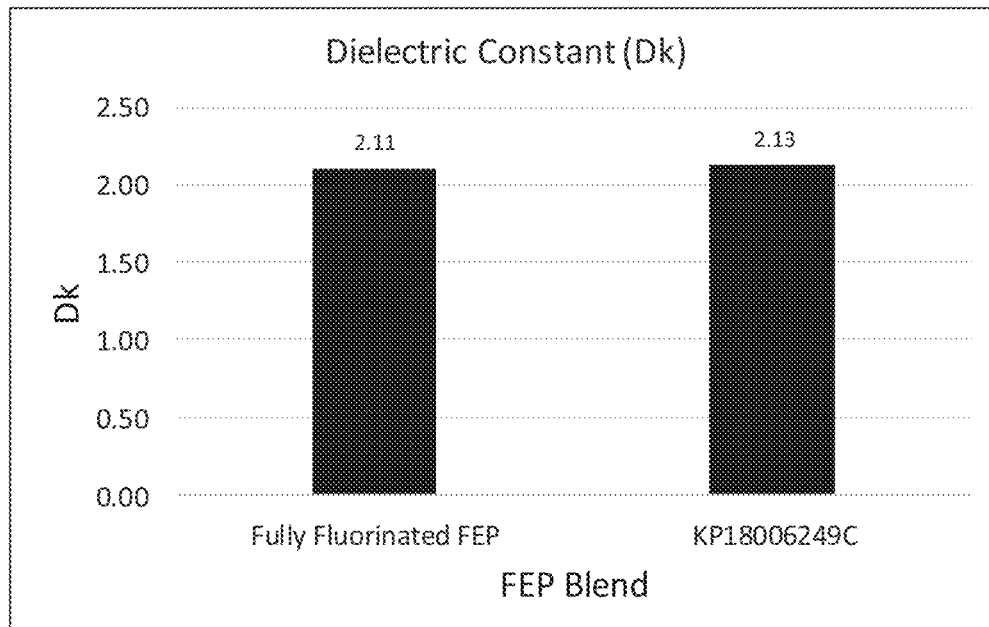
Figure 2:
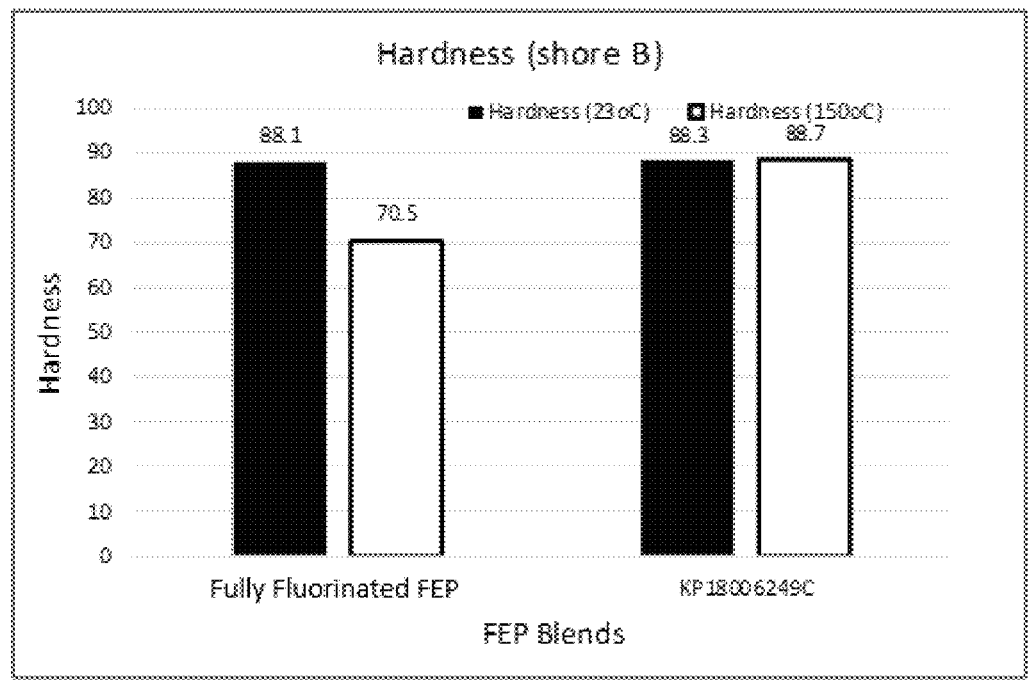
FIG. 2 shows Cross-linked KP18006249C maintained hardness at elevated temperature while the pure fully fluorinated FEP showed a significant reduction in hardness when temperature was increased from 23° C. to 150° C.
Figure 3:
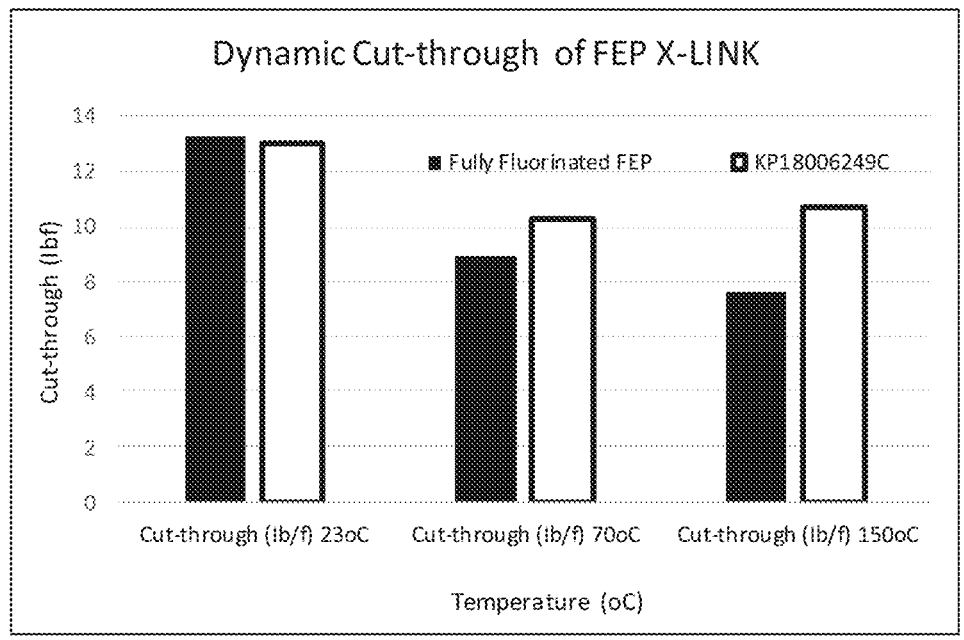
FIG. 3 shows cross-linked FEP (KP18006249C) had better dynamic cut-through at elevated temperature than did the pure fully fluorinated FEP at temperatures tested above room temperature (i.e., 23° C.).
Figure 4:
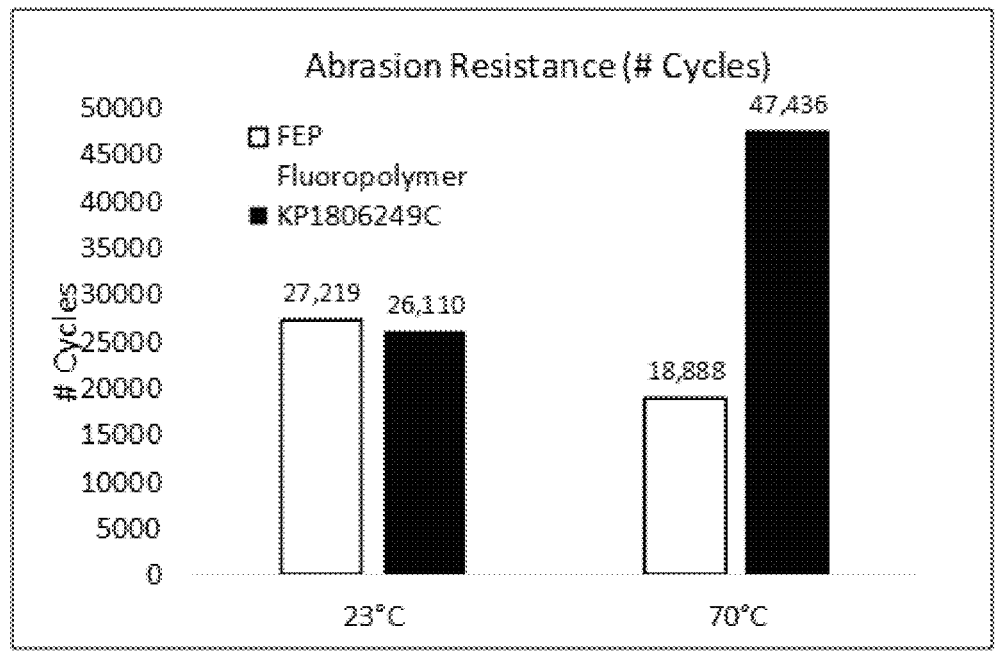
FIG. 4 shows cross-linked FEP (KP18006249C) showed improved abrasion resistance at elevated temperature while the pure fully fluorinated FEP showed a significant reduction in abrasion resistance when temperature was increased from 23° C. to 70° C.
Figure 5:
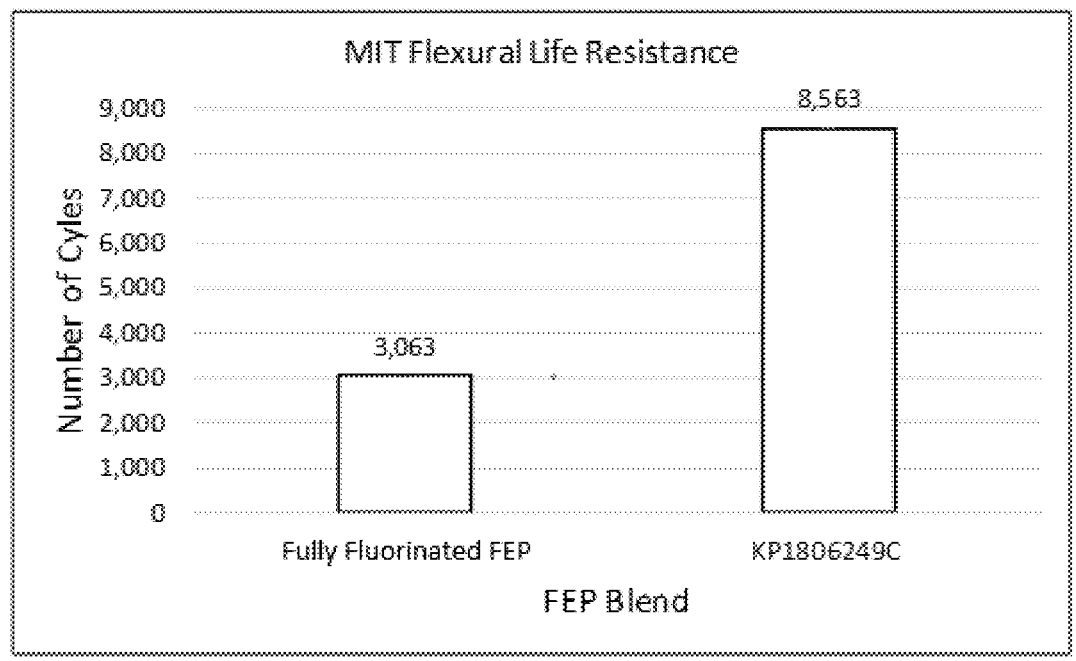
FIG. 5 shows cross-linked FEP (KP18006249C) showed significant increase in MIT Flexural life over pure fully fluorinated FEP.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one), unless the context clearly indicates only the singular or only the plural is allowed.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

As used herein, the term "alkyl", whether used alone or as part of a substituent group, includes straight hydrocarbon groups comprising from one to twenty carbon atoms. Thus the phrase includes straight chain alkyl groups such as methyl, ethyl, propyl, butyl, pentyl, hexyl, heptyl, octyl, nonyl, decyl, undecyl, dodecyl and the like. The phrase also includes branched chain isomers of straight chain alkyl groups, including but not limited to, the following which are provided by way of example: —CH(CH3)2, —CH(CH3)(CH2CH3), —CH(CH2CH3)2, —C(CH3)3, —C(CH2CH3)3, —CH2 CH(CH3)2, —CH2CH(CH3)(CH2CH3), —CH2CH(CH2CH3)2, —CH2C(CH3)3, —CH2C(CH2CH3)3, —CH(CH3)CH(CH3)(CH2CH3), —CH2CH2CH(CH3)2, —CH2CH2CH(CH3)(CH2CH3), —CH2CH2CH(CH2CH3)2, —CH2CH2C(CH3)3, CH2CH2C(CH2CH3)3, —CH(CH3)CH2CH(CH3)2, CH(CH3)CH(CH3)CH(CH3)CH(CH3)2, —CH(CH2 CH3) CH(CH3)CH(CH3)(CH2CH3), and others. The phrase also includes cyclic alkyl groups such as cyclopropyl, cyclobutyl, cyclopentyl, cyclohexyl, cycloheptyl, and cyclooctyl and such rings substituted with straight and branched chain alkyl groups as defined above. The phrase also includes polycyclic alkyl groups such as, but not limited to, adamantyl norbornyl, and bicyclo[2.2.2]octyl and such rings substituted with straight and branched chain alkyl groups as defined above.

As used herein, the term "alkenyl", whether used alone or as part of a substituent group, includes an alkyl group having at least one double bond between any two adjacent carbon atoms.

As used herein, the term "alkynyl", whether used alone or as part of a substituent group, includes an alkyl group having at least one triple bond between any two adjacent carbon atoms.

As used herein, the term "unsubstituted alkyl", "unsubstituted alkenyl" and "unsubstituted alkynyl" refers to alkyl, alkenyl and alkynyl groups that do not contain heteroatoms.

The phrase "substituted alkyl", "substituted alkenyl" and "unsubstituted alkynyl" refers to alkyl alkenyl and alkynyl groups as defined above in which one or more bonds to a carbon(s) or hydrogen(s) are replaced by a bond to non-hydrogen or non-carbon atoms such as, but not limited to, an oxygen atom in groups such as alkoxy groups and aryloxy groups; a sulfur atom in groups such as, alkyl and aryl sulfide groups, sulfone groups, sulfonyl groups, and sulfoxide groups; a silicon atom in groups such as in trialkylsilyl groups, dialkylarylsilyl groups, alkyldiarylsilyl groups, and triarylsilyl groups; and other heteroatoms in various other groups.

As used herein, the term "unsubstituted aryl" refers to monocyclic or bicyclic aromatic hydrocarbon groups having 6 to 12 carbon atoms in the ring portion, such as, but not limited to, phenyl, naphthyl, anthracenyl, biphenyl and diphenyl groups, that do not contain heteroatoms. Although the phrase "unsubstituted aryl" includes groups containing condensed rings such as naphthalene, it does not include aryl groups that have other groups such as alkyl or halo groups bonded to one of the ring members, as aryl groups such as tolyl are considered herein to be substituted aryl groups as described below. Unsubstituted aryl groups may be bonded to one or more carbon atom(s), oxygen atom(s), nitrogen atom(s), and/or sulfur atom(s) in the parent compound, however.

As used herein, the term "substituted aryl group" has the same meaning with respect to unsubstituted aryl groups that substituted alkyl groups had with respect to unsubstituted alkyl groups. However, a substituted aryl group also includes aryl groups in which one of the aromatic carbons is bonded to one of the non-carbon or non-hydrogen atoms, such as, but not limited to, those atoms described above with respect to a substituted alkyl, and also includes aryl groups in which one or more aromatic carbons of the aryl group is bonded to a substituted and/or unsubstituted alkyl, alkenyl, or alkynyl group as defined herein. This includes bonding arrangements in which two carbon atoms of an aryl group are bonded to two atoms of an alkyl or alkenyl, group to define a fused ring system (e.g. dihydronaphthyl or tetrahydronaphthyl). Thus, the phrase "substituted aryl" includes, but is not limited to tolyl, and hydroxyphenyl among others.

As used herein, the term "unsubstituted aralkyl" refers to unsubstituted alkyl or alkenyl groups as defined above in which a hydrogen or carbon bond of the unsubstituted or substituted alkyl or alkenyl group is replaced with a bond to a substituted or unsubstituted aryl group as defined above. For example, methyl (CH3) is an unsubstituted alkyl group. If a hydrogen atom of the methyl group is replaced by a bond to a phenyl group, such as if the carbon of the methyl were bonded to a carbon of benzene, then the compound is an unsubstituted aralkyl group (i.e., a benzyl group).

As used herein, the term "substituted aralkyl" has the same meaning with respect to unsubstituted aralkyl groups that substituted aryl groups had with respect to unsubstituted aryl groups. However, a substituted aralkyl group also includes groups in which a carbon or hydrogen bond of the alkyl part of the group is replaced by a bond to a non-carbon or a non-hydrogen atom.

As used herein, the term "unsubstituted heterocyclyl" refers to both aromatic and nonaromatic ring compounds including monocyclic, bicyclic, and polycyclic ring compounds such as, but not limited to, quinuclidyl, containing 3 or more ring members of which one or more is a heteroatom such as, but not limited to, N, O, and S. Although the phrase "unsubstituted heterocyclyl" includes condensed heterocyclic rings such as benzimidazolyl, it does not include heterocyclyl groups that have other groups such as alkyl or halo groups bonded to one of the ring members, as compounds such as 2-methylbenzimidazolyl are "substituted heterocyclyl" groups as defined below. Examples of heterocyclyl groups include, but are not limited to: unsaturated 3 to 8 membered rings containing 1 to 4 nitrogen atoms such as, but not limited to pyrrolyl, pyrrolinyl, imidazolyl, pyrazolyl, pyridyl, dihydropyridyl, pyrimidyl, pyrazinyl, pyridazinyl, triazolyl, tetrazolyl; saturated 3 to 8 membered rings containing 1 to 4 nitrogen atoms such as, but not limited to, pyrrolidinyl, imidazolidinyl, piperidinyl, piperazinyl; condensed unsaturated heterocyclic groups containing 1 to 4 nitrogen atoms such as, but not limited to, indolyl, isoindolyl, indolinyl, indolizinyl, benzimidazolyl, quinolyl, isoquinolyl, indazolyl, benzotriazolyl; unsaturated 3 to 8 membered rings containing 1 to 2 oxygen atoms and 1 to 3 nitrogen atoms such as, but not limited to, oxazolyl, isoxazolyl, oxadiazolyl; saturated 3 to 8 membered rings containing 1 to 2 oxygen atoms and 1 to 3 nitrogen atoms such as, but not limited to, morpholinyl; unsaturated condensed heterocyclic groups containing 1 to 2 oxygen atoms and 1 to 3 nitrogen atoms, for example, benzoxazolyl, benzoxadiazolyl, benzoxazinyl (e.g. 2H-1,4-benzoxazinyl etc.); unsaturated 3 to 8 membered rings containing 1 to 3 sulfur atoms and 1 to 3 nitrogen atoms such as, but not limited to, thiazolyl, isothiazolyl, thiadiazolyl (e.g. 1,2,3-thiadiazolyl, 1,2,4-thiadiazolyl, 1,3,4-thiadiazolyl, 1,2,5-thiadiazolyl, etc.); saturated 3 to 8 membered rings containing 1 to 2 sulfur atoms and 1 to 3 nitrogen atoms such as, but not limited to, thiazolodinyl; saturated and unsaturated 3 to 8 membered rings containing 1 to 2 sulfur atoms such as, but not limited to, thienyl, dihydrodithiinyl, dihydrodithionyl, tetrahydrothiophene, tetrahydrothiopyran; unsaturated condensed heterocyclic rings containing 1 to 2 sulfur atoms and 1 to 3 nitrogen atoms such as, but not limited to, benzothiazolyl, benzothiadiazolyl, benzothiazinyl (e.g. 2H-1,4-benzothiazinyl, etc.), dihydrobenzothiazinyl (e.g. 2H-3,4-dihydrobenzothiazinyl, etc.), unsaturated 3 to 8 membered rings containing oxygen atoms such as, but not limited to furyl; unsaturated condensed heterocyclic rings containing 1 to 2 oxygen atoms such as benzodioxolyl (e.g. 1,3-benzodioxoyl, etc.); unsaturated 3 to 8 membered rings containing an oxygen atom and 1 to 2 sulfur atoms such as, but not limited to, dihydrooxathiinyl; saturated 3 to 8 membered rings containing 1 to 2 oxygen atoms and 1 to 2 sulfur atoms such as 1,4-oxathiane; unsaturated condensed rings containing 1 to 2 sulfur atoms such as benzothienyl, benzodithiinyl; and unsaturated condensed heterocyclic rings containing an oxygen atom and 1 to 2 oxygen atoms such as benzoxathiinyl. Heterocyclyl group also include those described above in which one or more S atoms in the ring is double-bonded to one or two oxygen atoms (sulfoxides and sulfones). For example, heterocyclyl groups include tetrahydrothiophene, tetrahydrothiophene oxide, and tetrahydrothiophene 1,1-dioxide. Preferred heterocyclyl groups contain 5 or 6 ring members. More preferred heterocyclyl groups include morpholine, piperazine, piperidine, pyrrolidine, imidazole, pyrazole, 1,2,3-triazole, 1,2,4-triazole, tetrazole, thiomorpholine, thiomorpholine in which the S atom of the thiomorpholine is bonded to one or more O atoms, pyrrole, homopiperazine, oxazolidin-2-one, pyrrolidin-2-one, oxazole, quinuclidine, thiazole, isoxazole, furan, and tetrahydrofuran.

As used herein, the term "substituted heterocyclyl" has the same meaning with respect to unsubstituted heterocyclyl groups that substituted alkyl groups had with respect to unsubstituted alkyl groups. However, a substituted heterocyclyl group also includes heterocyclyl groups in which one of the carbons is bonded to one of the non-carbon or non-hydrogen atom, such as, but not limited to, those atoms described above with respect to a substituted alkyl and substituted aryl groups and also includes heterocyclyl groups in which one or more carbons of the heterocyclyl group is bonded to a substituted and/or unsubstituted alkyl, alkenyl or aryl group as defined herein. This includes bonding arrangements in which two carbon atoms of a heterocyclyl group are bonded to two atoms of an alkyl, alkenyl, or alkynyl group to define a fused ring system. Examples, include, but are not limited to, 2-methylbenzimidazolyl, 5-methylbenzimidazolyl, 5-chlorobenzthiazolyl, 1-methyl piperazinyl, and 2-chloropyridyl among others.

As used herein, the term "unsubstituted heterocyclylalkyl" refers to unsubstituted alkyl or alkenyl groups as defined above in which a hydrogen or carbon bond of the unsubstituted alkyl or alkenyl group is replaced with a bond to a substituted or unsubstituted heterocyclyl group as defined above. For example, methyl (CH3) is an unsubstituted alkyl group. If a hydrogen atom of the methyl group is replaced by a bond to a heterocyclyl group, such as if the carbon of the methyl were bonded to carbon 2 of pyridine (one of the carbons bonded to the N of the pyridine) or carbons 3 or 4 of the pyridine, then the compound is an unsubstituted heterocyclylalkyl group.

As used herein, the term "substituted heterocyclylalkyl" has the same meaning with respect to unsubstituted heterocyclylalkyl groups that substituted aryl groups had with respect to unsubstituted aryl groups. However, a substituted heterocyclylalkyl group also includes groups in which a non-hydrogen atom is bonded to a heteroatom in the heterocyclyl group of the heterocyclylalkyl group such as, but not limited to, a nitrogen atom in the piperidine ring of a piperidinylalkyl group.

As used herein "carbocyclyl" refers to cyclic compounds in which all of the ring members are carbon atoms. These may be aromatic or not. An "unsubstituted carbocyclyl" refers to a cyclic compound in which all of the ring members are carbon atoms, and in which all carbon atoms are saturated. A "substituted carbocyclyl" has the same meaning with respect to unsubstituted carbocyclyl that substituted aryl groups had with respect to unsubstituted aryl groups.

Methods used to generate data are the same as described in the relevant section unless otherwise noted. Some samples described herein have names in the following format: AWxxxxxxxA, where x is a digit from 0-9 and A is a letter. In figures, samples are typically referred to by the last four characters of this name, or the last three numbers and the final letter In some places reference is made to standard methods, such as but not limited to methods of measurement. It Is to be understood that such standards are revised from time to time, and unless explicitly stated otherwise reference to such standard in this disclosure must be interpreted to refer to the most recent published standard as of the time of filing.

B. Polymer Composition

In some embodiments, a polymer composition is provided that facilitates the chemical cross-linking of fluoropolymers. The composition includes a functionalized fluoropolymer having a first reactive group and a fluorinated group. The fluorinated group may be fully or partially fluorinated. In this context "fully fluorinated" refers to a group in which the carbon atoms are bonded either to fluorine atoms, carbon atoms, or heteroatoms that are bonded to other carbon atoms (i.e., part of the polymer chain). Fully fluorinated groups include fluorocarbon groups, such as fluorinated ethylene propylene (FEP) and polytetrafluoroethylene (PTFE). In this context they also include fluorocarbon ethers such as perfluorocarbon ethers and perfluoroalkoxy alkanes (PFA). Partially fluorinated groups include hydrofluorocarbons, such as ethylene tetrafluoroethylene (ETFE), polyvinylidene fluoride (PVDF), terpolymer of ethylene, tetrafluoroethylene, and hexafluoropropylene (EFEP), and a copolymer of vinylidene fluoride and tetrafluoroethylene. The functionalized fluoropolymer may advantageously have thermoplastic properties, to facilitate its use in heated extrusion, die molding, and blow molding; In more specific embodiments it is a melt processable thermoplastic. Further embodiments of the functionalized fluoropolymer may be partially crystalline.

The functionalized fluoropolymer includes at least one reactive group. Each reactive group may be a terminal end group or a pendant side group. Greater numbers of reactive groups have the advantage of providing more abundant sites for cross-linking to occur. Fewer reactive groups confer the advantage of greater fluoropolymer characteristics (such a low reactivity). Some embodiments of the functionalized fluoropolymer have an end group count of at least 1, 10, 20, 30, 40, 50, 60, 70, 80, 90, 100, 120, 140, 160, 180, 200, 300, 400 or 500 reactive groups per $10^8$ carbon atoms. Further embodiments comprise and end group count of about 1-10000, 10-1000, or 100 reactive groups per $10^6$ carbon atoms. In a preferred embodiment the functionalized fluoropolymer has at least 100 reactive groups per $10^6$ carbon atoms. The functional groups may be incorporated by any of various methods. For instance, a partially fluorinated polymer may be grafted with a functional monomer to provide a chemically reactive group. However, for a fully-fluorinated polymer incorporation of a functional moiety can be performed using the terminal end-groups. The grafting of the functional moiety may be performed by reaction extrusion or by inserting the organic species in a small mole percentage during chemical synthesis to render functionality. Both methods may employ a peroxide initiator for successful grafting. It can also be performed without an initiator. Other methods for incorporating functional groups into polymers include, for example, by direct polymerization of functional monomers, post-polymerization modification of monomer units, use of functional initiators, or end-group transformation chemistry such as nucleophilic substitution reactions.

The reactive group is a moiety that forms chemical bonds with other groups. Such bonding may be spontaneous, require catalysis, or require elevated temperatures, depending on the specific reaction. Examples of suitable reactive groups include carboxyl, amine, anhydride, hydroxyl, epoxy, sulfhydryl, oxazoline, cyanate ester, and acid chloride. The bond may be a covalent bond. In further embodiments, the bond may be an ionic bond, a hydrogen bond, or a coordinate bond. Covalent bonds are referenced as one preferred type of bond between reactive groups, but such references should be understood to refer to one possible type of bond that is not exclusive of others.

The composition includes an organic "compatabilizer" comprising a second reactive group and a third reactive group, wherein at least one of the first and second reactive groups is capable of reacting with the first reactive group to form a bond, such as a covalent bond. Examples of suitable second and third reactive groups that form covalent bonds include carboxyl, amine, anhydride, hydroxyl, epoxy, sulfhydryl, oxazoline, cyanate ester, and acid chloride. The compatabilizer contains a double bond in its backbone and is conjugated to the functionalized fluoropolymer. The chain extended fluoropolymer containing the double bond now has multiple cross-linking sites for further cross-linking with any multifunctional cross-linker. The second and third reactive groups may be linked to one another via a substituted or unsubstituted alkyl, alkenyl, alkynyl, aryl, aralkyl, heterocyclyl, heterocyclylalkyl, carbocyclyl, or a combination of one or more of the foregoing. In some embodiments of the composition the compatabilizer is of the class of unsaturated bis-oxazoline compounds. Particular suitable bis-oxazoline compounds include the following:

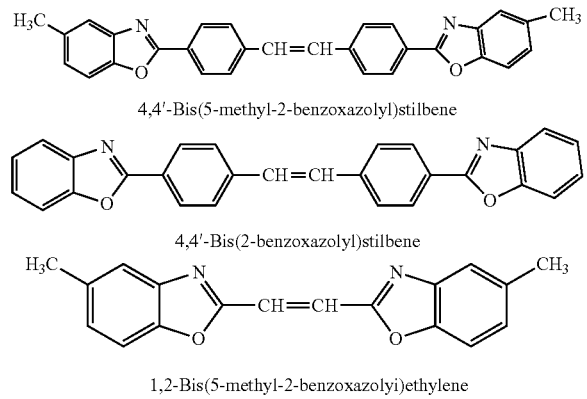

4,4'-Bis(5-methyl-2-benzoxazolyl)stilbene 4,4'-Bis(2-benzoxazolyl)stilbene 1,2-Bis(5-methyl-2-benzoxazolyl)ethylene In a specific embodiment of the composition the compatabilizer is 4,4'-bis(2-benzoxazolyl)stilbene. The compatabilizer will be present in a concentration sufficient to create a significant number of compatabilizer-fluoropolymer complexes. In some embodiments of the composition the compatabilizer is present at about 0.01-1% w/w. In a specific embodiment the compatabilizer is present at about 1% w/w.

An initiator is used to generate free radicals that react with the fluoropolymers or compatabilizer groups to form an intermediate compound capable of linking successively with a large number of other monomers into a polymeric compound. Various such initiators are known. For example, one suitable class of initiators are peroxide initiators. In a one embodiment of the composition, 3,3,5,7,7-pentamethyl-1,2,4-trioxepane is used (TRIGONEX 311). Further examples of suitable initiators include: t-butyl peroxy-(cis-3-carboxy)propenoate, 1,1-di(t-amylperoxy)cyclohexane, 1,1-di(t-butylperoxy)-3,3,5-trimethylcyclohexane, 1,1-di(t-butylperoxy)cyclohexane, OO-t-amyl O-(2-ethylhexyl) monoperoxycarbonate, OO-t-butyl O-isopropyl monoperoxycarbonate, OO-t-butyl O-(2-ethylhexyl) monoperoxycarbonate, polyether tetrakis(t-butylperoxycarbonate), 2,5-dimethyl-2,5-di(benzoylperoxy)hexane, t-amyl peroxyacetate, t-amyl peroxybenzoate, t-Butyl Peroxyisononanoate, t-butyl peroxyacetate, t-butyl peroxybenzoate, di-t-butyl diperoxyphthalate, 2,2-di(t-butylperoxy)butane, 2,2-di(t-amylperoxy)propane, n-butyl 4,4-di(t-butylperoxy)valerate, ethyl 3,3-di(t-amylperoxy)butyrate, ethyl 3,3-di(t-butylperoxy)butyrate, dicumyl peroxide, a,a'-bis(t-butylperoxy)diisopropylbenzene, 2,5-dimethyl-2,5-di(t-butylperoxy)hexane, di(t-amyl) peroxide, t-butyl a-cumyl peroxide, di(t-butyl) peroxide, 2,5-dimethyl-2,5-di(t-butylperoxy)-3-hexyne, specialty peroxide blend for rotational molding, and t-butyl hydroperoxide. The initiator may be present in an amount effective to achieve free radical generation to promote polymerization. In some embodiments of the composition the initiator is present at 0.0001-10% w/w; in further embodiments the initiator is present at 0.001-1% w/w; in still further embodiments the initiator is present at 0.01% w/w. In some embodiments no initiator is present as no initiator is used.

A cross-linking agent is used that functions at or above the melting temperature of the fluoropolymer. The cross-linking agent comprises reactive terminals groups that can be designed based on the chemistry of the reactive fluoropolymer and/or the compatabilizer. Examples of suitable terminal groups include vinyl groups, maleimide groups, and carboxyl groups. Classes of cross-linker having such groups include a tetra-vinyl terminated polyimide, a vinyl polyoctahedral silsesquioxane (POSS), a vinyl triazine compound, and a POSS maleamate. Specific examples of suitable cross-linkers include 1,3,5-triallyl-1,3,5-triazine-2,4,6(1H,3H,5H)-trione, tetravinyl-termined polyimides, vinyl-POSS cages, and octamaleamic acid POSS. The structures of such cross-linkers are shown in FIG. 10. The cross-linker may be present in an amount effective to result in measurable cross-linking between molecules. In some embodiments, two or more cross-linkers are used. When two or more cross-linkers are used, they may have the same or different end group functionalities. In some embodiments of the composition, the cross-linker is present from about 0.1-10% w/w. In some embodiments of the composition, the cross-linker is present from about 4-9% w/w. In some embodiments of the composition, two or more cross-linkers are present in a combined total of between 5 and 8% w/w.

A second fluoropolymer may be present in the composition. The second polymer need not have any reactive groups, and some embodiments of the second fluoropolymer lack reactive groups. The second fluoropolymer may be any partially or fully fluorinated polymer disclosed above as a possible fluoropolymer group in the functionalized fluoropolymer. For example, the second fluoropolymer may be a fluorocarbon, hydrofluorocarbon, perfluorocarbon, or other partially or fully fluorinated molecule. The second fluoropolymer confers enhanced dielectric characteristics, chemical resistance, and thermal resistance to the composition. The functionalized fluoropolymer and the second fluoropolymer can be said to be part of a "fluoropolymer fraction" of the composition. In some embodiments of the composition the fluoropolymer fraction is at least 50% w/w of the entire composition. In further embodiments, the fluoropolymer fraction is at least 55, 60, 65, 70, 75, 80, 85, 90, 95, 96, 97, 98, 99, or 100% w/w of the composition. Within the fluoropolymer fraction itself, a variety of concentrations of the functionalized fluoropolymer and the second fluoropolymer are contemplated. For example, the fluoropolymer fraction may be from 1-100% w/w functionalized fluoropolymer. In further embodiments, the fluoropolymer fraction is at least 10% w/w functionalized fluoropolymer. In still further embodiments, the fluoropolymer fraction is 10, 20, 30, 40, 50, 60, 70, 80, 85, 90, 95, 96, 97, 98, 99 or 100% w/w functionalized fluoropolymer. In some embodiments of the composition, the fluoropolymer fraction may be from 1-99% w/w second fluoropolymer. Further embodiments of the composition are up to 90% w/w of the second fluoropolymer, or about 90% w/w. The combined functionalized fluoropolymer and second fluoropolymer may be a majority of the fluoropolymer fraction (at least 50% w/w). In some embodiments of the composition the combined functionalized fluoropolymer and second fluoropolymer comprise 55, 60, 65, 70, 75, 80, 85, 90, 95, 99, or 100% w/w of the fluoropolymer fraction. In a specific embodiment, the fluoropolymer fraction consists of the functionalized fluoropolymer, and optionally includes the second fluoropolymer.

If a foamed polymer is to be formed, a foam nucleating agent may be present. Foamed polymers have the advantage of improved dielectric properties and lower weight. Some embodiments of the composition may comprise 1-10% w/w of the foam nucleating agent. Various suitable nucleating agents are known in the art, and may include components such as boron nitride, inorganic salts (such as barium salts, calcium tetraborate, sodium tetraborate, potassium tetraborate, calcium carbonate, zinc tetraborate, and barium nitrate), sulfonic acid, phosphonic acids, conjugate salts thereof, talc, and metal oxides such as magnesium oxide, aluminum oxide, and silicon dioxide. A specific embodiment of the composition comprises a foam nucleating agent comprising mostly boron nitride and calcium tetraborate. Further embodiments comprise a barium salt of $F(CF_2)_nCH_2CH_2SO_3H$ (n=6, 8, 10, or 12). Among foam nucleating agents that may constitute or may be components of the foam nucleating package are the foam nucleating agents represented by the formula $Z(CF_2)_x$ $(CF_2CFX)_p$ $(R')_y(CH_2)_z(RO_3)_nM$ wherein: the bivalent groups, except for $RO_3$, may be present in any sequence; Z is selected from $CCl_3$, $CCl_2H$, H, F, Cl, and Br; each X, independently, is selected from H, F, $C_1$, and $CF_3$; R is selected from sulfur and phosphorus; M is selected from H and a metallic, ammonium, substituted ammonium and quaternary ammonium cation; each of x and z, independently, is an integer and is 0 to 20; p is an integer and is 0 to 6; y is 0 or 1; x+y+z+p is a positive integer or, if x+y+z+p is 0, then Z is $CCl_3$ or $CCl_2H$; n is the valence of M; and R' is selected from a $C_{5-6}$ perfluorinated alicyclic ring diradical; a $C_{1-16}$ perfluorinated aliphatic polyether diradical with repeat units selected from $CF_2O$, $[CF_2CF_2O]$, and $[CF_2CF(CF_3)O]$; and a substituted or unsubstituted aromatic diradical, in which case, Z is H. Embodiments of the foam nucleating agent suitable for extrusion processes may have a foam nucleating effective amount of at least one thermally stable compound selected from sulfonic and phosphoric acids and/or salts thereof. Examples of foam nucleating agents are provided in FIG. 11. "TBSA" is $F(CF_2)_nCH_2CH_2SO_3H$ wherein n is 6, 8, 10, and possibly 12, being predominately 8.

C. Process for Forming a Cross-Linked Fluoropolymer

In some embodiments, a process is provided for forming a cross-linked fluoropolymer. The process generally involves melting the composition to allow covalent bonds to form between the reactive groups. The initiator may be added with the other components, or it may be added separately, for example if necessary to prevent initiation prior to processing.

The processing comprises melting at least the functional fluoropolymer. This will generally involve heating the composition to a temperature determined to be near or above its melting point. Such heating may be accomplished by various means, such as by using a heated extruder or injection molding machine. The composition may be heated to a temperature sufficient to melt the second fluoropolymer (if present) and/or the compatabilizer. If additional components are present in the composition, the melting step may take them into account as well. The result may be a fully or partially molten fluoropolymer composition.

Chemical bonds will then be formed between the reactive groups on the functionalized fluoropolymer and the compatabilizer, forming fluoropolymer-compatabilizer complexes. These can then be cross-linked using the cross-linking agent, such as by free radical cross-linking using a peroxide cross-linker. Detailed processing methodology can be found in the sections below.

A foamed cross-linked fluoropolymer can be formed if the composition contains a foaming agent, as described above. In such embodiments of the process a gas will be introduced during processing. The gas can be any that is known in the art to be suitable for forming foamed fluoropolymers. In a specific embodiment the gas is $N_2$, which has the advantage of being relatively inert and low in cost. In some embodiments of the method, the gas is introduced to achieve up to 90% gas content by volume. In further embodiments of the method the gas is introduced to achieve 10-80% gas content by volume.

Cross-linked fluoropolymer workpieces can be formed by various methods known in the art. For example, extruded workpieces (such as extruded films) can be formed by extruding the molten cross-linked fluoropolymer composition. After extrusion, a film can be formed as a blown film, cast film, or by other conventional means. Some embodiments of the cross-linked fluoropolymer film so produced may be foamed according to the process described above. Such foamed films may contain up to 90% gas content by volume. Further embodiments of the film contain 10-80% gas content by volume. The film may have various characteristics based on the composition of the cross-linked fluoropolymer.

Some embodiments of the film have an unusual ability to maintain hardness at elevated temperature. Some embodiments of the film display superior hardness at 150° C. compared to the non-functionalized version of the functional fluoropolymer. Some such embodiments display a hardness (shore B) that does not significantly differ between 23° C. and 150° C., as measured by ASTM D2240 (shore B). Some such embodiments display a hardness (shore B) of at least about 80 at 150° C., as measured by ASTM D2240 (shore B).

Some embodiments of the film have also been observed to have good cut through resistance at high temperature. Some embodiments of the film display superior cut through resistance at 70° C. compared to the non-functionalized version of the functional fluoropolymer. Some such embodiments have a cut through resistance of at least about 10 pound feet at 150° C. (all reference to cut through resistance herein refer to such resistance as measured by ASTM D150 method 703).

Some embodiments of the film have also been observed to have high abrasion resistance at elevated temperatures. Some embodiments of the film display superior abrasion resistance at 70° C. compared to the non-functionalized version of the functional fluoropolymer. Some embodiments of the film have an abrasion resistance of at least 30000 cycles at 70° C. Further such embodiments of the film have an abrasion resistance of at least 45000 cycles at 70° C. All reference to abrasion resistance herein refers to such resistance as measured by AS4373 method 301.

Some embodiments of the film display high MIT flexural life. Some embodiments of the film display superior MIT flexural life compared to the non-functionalized version of the functional fluoropolymer. Further embodiments of the film display flexural resistance of at least 400 cycles; still further such embodiment of the film display flexural resistance of at least about 8000 cycles. Refer to section H for flexural life testing methodology.

An injection molded workpiece can be formed by injecting the molten composition into a mold cavity. This can be by various injection molding methods known in the art. Examples of various injection molding conditions can be found in Section H and in the examples.

Some embodiments of the injection molded workpiece so produced may be foamed according to the process described above. Such foamed workpieces may contain up to 90% gas content by volume. Further embodiments of the workpiece contain 10-80% gas content by volume. The workpiece may have various characteristics based on the composition of the cross-linked fluoropolymer.

Some embodiments of the injection-molded workpiece have been observed to have a higher Young's modulus (also known as tensile modulus) than of the non-functionalized version of the functionalized fluoropolymer. Some such embodiments have a Young's modulus of at least about 400 MPa. Further such embodiments have a Young's modulus of at least about 450 MPa. All reference to Young's modulus herein refers to the property as measured by ASTM D638 Standard Test Method for Tensile Properties of Plastics. For an example of specific methodology, see Section H below.

Some embodiments of the injection-molded workpiece have been observed to have higher elongation than of the non-functionalized version of the functionalized fluoropolymer. Some such embodiments display elongation of at least 130%; further such embodiments may display elongation of at least 190%. All reference to elongation herein refers to the property as measured by ASTM D638 Standard Test Method for Tensile Properties of Plastics.

D. Insulated Cable

Some of the compositions disclosed herein find use as cable insulators due to their light weight, temperature resistance, and dielectric properties. An insulated cable is provided comprising a conductor and an insulating layer comprising any of the cross-linked fluoropolymers disclosed herein.

This disclosure describes embodiments of a communications cable, such as an Ethernet cable. The cable is particularly useful in motor vehicle computer systems, which are exposed to high temperatures but have ever increasing data demands. One particular embodiment of the cable includes a single twisted pair of wires. The wire insulation of each of these wires is provided by highly insulative, low attenuation, and thermally resistant material such as the cross-linked fluoropolymers disclosed above. The twisted pair of wires is configured to carry differential data and/or power signals. The use of the cross-linked fluoropolymers disclosed above as a wire insulator allows for the cable to transmit differential signals within high frequency ranges (e.g., 100 MHz- 10 GHz) while being capable of handling the more extreme thermal conditions presented by a motor vehicle. It should be noted that other embodiments of the cable may include several pairs of wires to provide multiple paths for differential data and/or power signals. Further embodiments of the cable comprise more than one twisted pair. Specific embodiments of the cable comprise at least 1, 2, 3, or 4 twisted pairs. Still further specific embodiments of the cable comprise exactly 1, 2, 3, or 4 twisted pairs. These pairs of wires may be inserted within a cable jacket, which provides the Ethernet cable with its structural integrity. Furthermore, in some implementations, the cable may be shielded to help protect the cable from electromagnetic interference.

Figure 12:
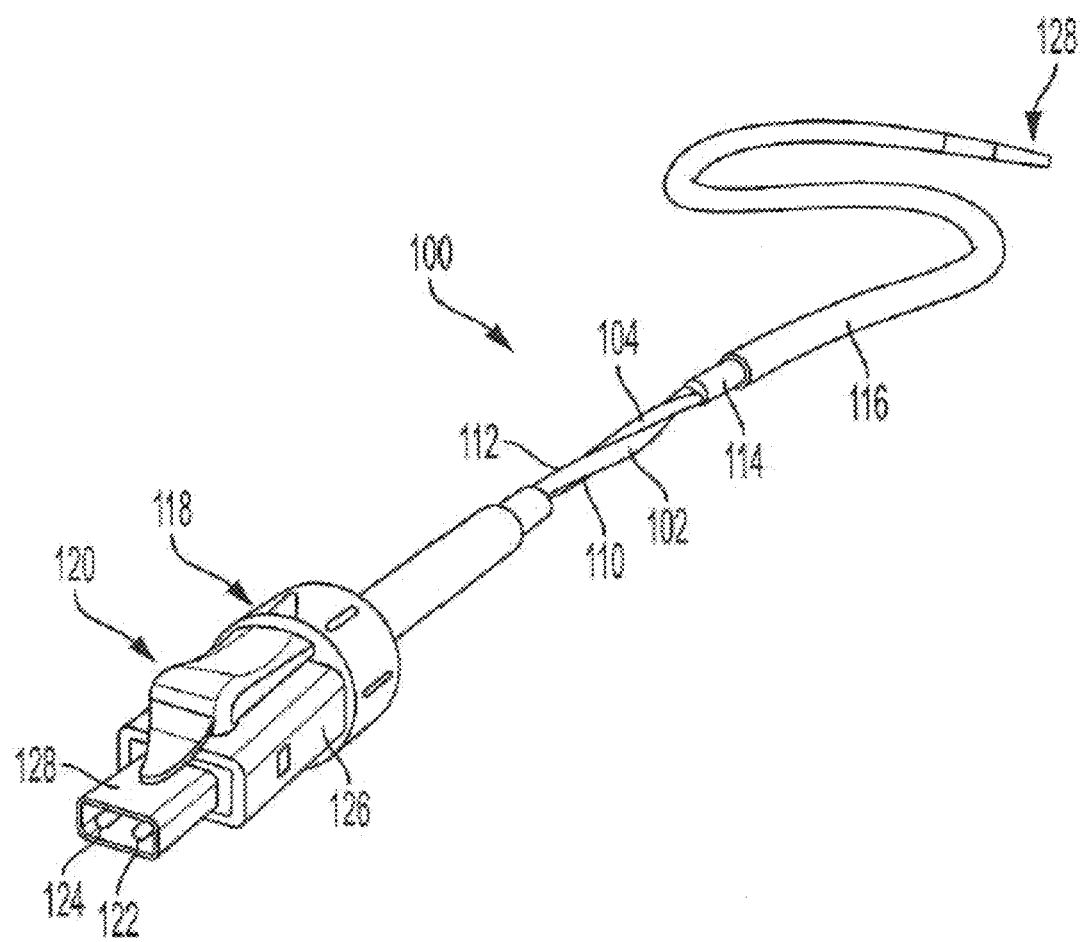
FIG. 12 shows an embodiment of the insulated cable disclosed.
Figure 13:
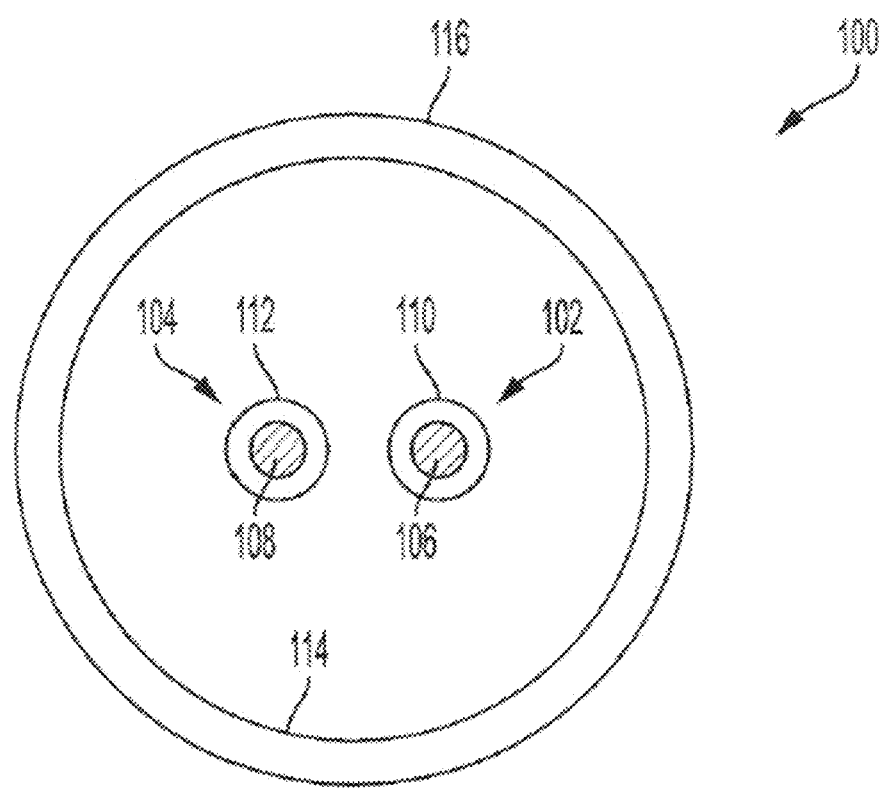
FIG. 13 shows a cross-sectional view of an embodiment of the insulated cable disclosed.
Figure 14:
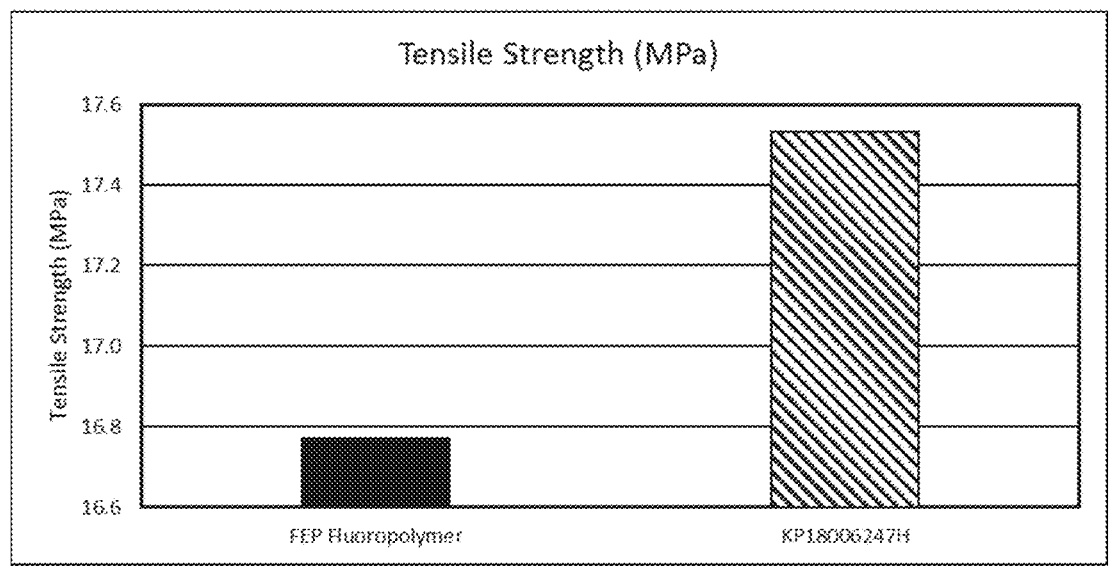
FIG. 14 shows a graph showing the tensile strength of cross-linked fluoropolymer (KP18006247H) thin films.
Figure 15:
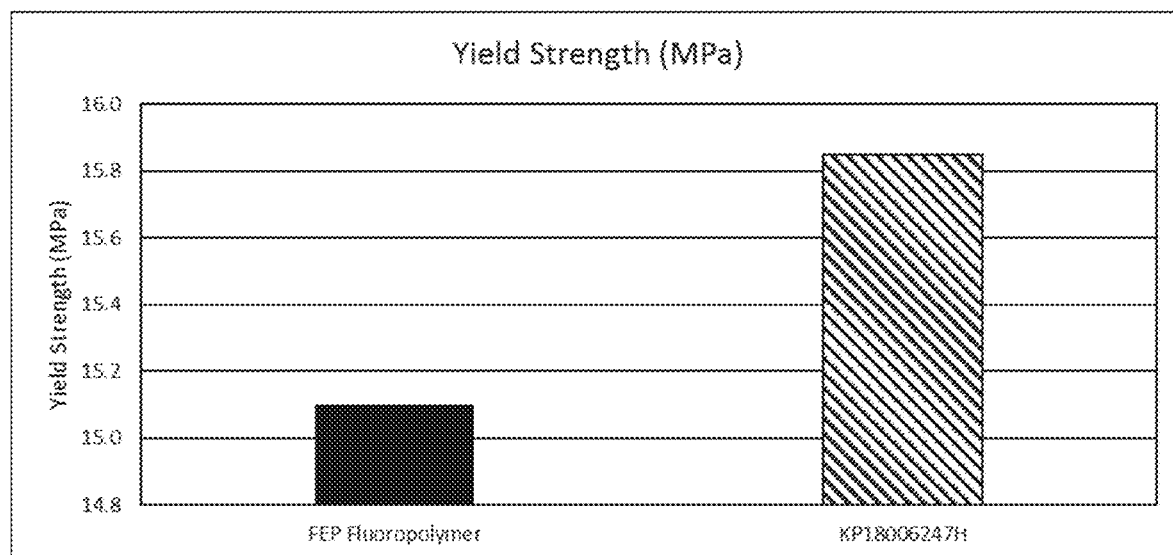
FIG. 15 Shows a graph showing the yield strength of cross-linked fluoropolymer (KP18006247H) thin films.
Figure 16:
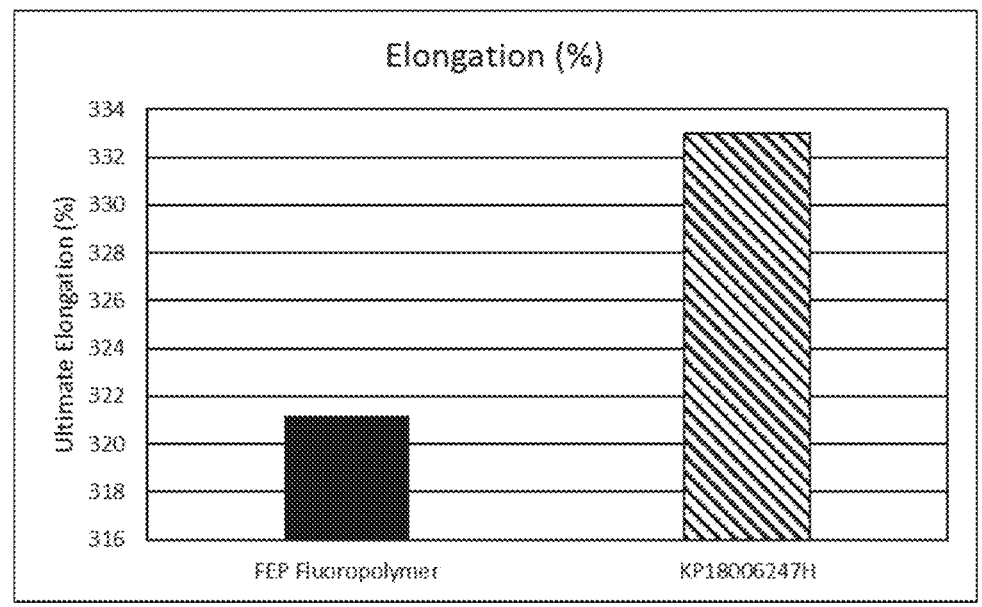
FIG. 16 shows a graph showing the elongation of cross-linked fluoropolymer (KP18006247H) thin films.
Figure 17:
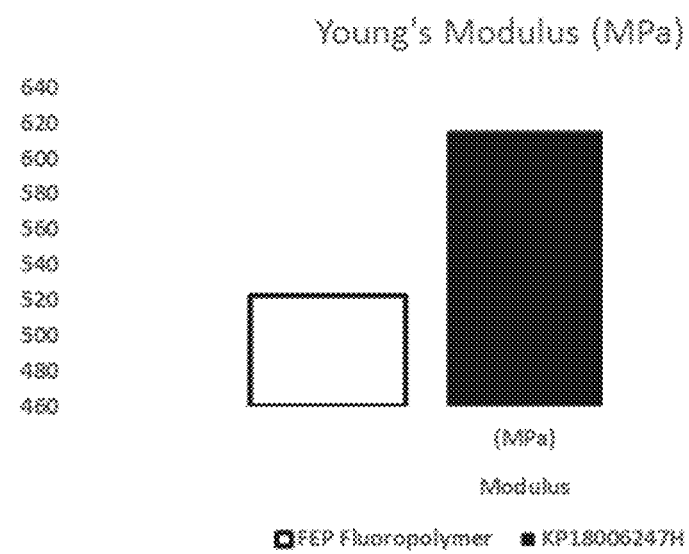
FIG. 17 shows a graph showing the Young's Modulus of cross-linked fluoropolymer (KP18006247H) thin films.

FIG. 12 illustrates a perspective view of an embodiment of a cable 100 in accordance with this disclosure while FIG. 13 illustrates a cross sectional view of the embodiment of a cable 100 shown in FIG. 12. The cable 100 includes a pair of wires 102, 104 that are twisted together so as to form a twisted pair of wires 102, 104. The wire 102 includes a conductor 106 (See FIG. 13) while the wire 104 includes a conductor 108 (See FIG. 13) that are each formed from a conductive material. The conductive material that forms the conductors 106, 108 may be any conductive material, including elemental metals, alloys, and the like. In one embodiment, the conductors 106, 108 in the wires 102, 104 are each formed from copper. The pair of conductors 106, 108 may be used in some implementations to propagate a differential signal, such that the conductors 106, 108 carry complementary signals that are approximately 180 degrees apart in phase. Thus, the pair of wires 102, 104 are twisted to help cancel electromagnetic interference between the wires 102, 104 and maintain the pair of conductors 106, 108 balanced. In one implementation, the pair of wires 102, 104 will be used to handle both data signaling and power transmission. For example, the pair of wires 102, 104 may be utilized to deliver around 50 Watts of power to sensors and active communications devices.

As shown in FIG. 12 and FIG. 13, each of the wires 102, 104 also includes wire insulation 110, 112. The wire insulation 110 of the wire 102 surrounds and covers the conductor 106 while the wire insulation 112 of the wire 104 surrounds and covers the conductor 108. The wire insulation 110 and the wire insulation 112 are formed from an insulation material that has a low dielectric constant has a low permittivity and thus resists the concentration of electromagnetic lines of flux in the presence of high charges and currents. This allows the pair of wires 102, 104 to propagate high frequency signals. In one implementation, the cable 100 is a Category 6A Ethernet cable, which requires that the cable 100 be capable of carrying signals with an operating frequency between 10 MHz and 500 MHz and a system throughput up to 10 Gigabits per second (Gbps), while minimizing external noise influences and internal crosstalk sources, such as near end crosstalk (NEXT) and far end crosstalk (FEXT). Examples of suitable forms of Category 6A cable 100 include unshielded twisted pair cable (UTP), segmented shield twisted pair (SSTP), and shielded twisted pair (STP). One suitable form of STP comprises a shield having polyethylene terephthalate (PET) on one side and aluminum on the other, and a drain wire. One suitable form of SSTP comprises a shield having polyethylene terephthalate (PET) on one side and aluminum on the other, wherein the aluminum is cut at regular intervals while the PET is intact along the length of the shield, obviating the need for a drain wire.

In some embodiments, the insulation material that forms the wire insulation 110 and the wire insulation 112 has a dielectric constant between approximately 1.2 to approximately 2.1 at temperatures experienced under the hood of modern automotive engines. Typically, these temperatures vary from −40° C. to 200° C. In another embodiment, the insulation material that forms the wire insulation 110 and the wire insulation 112 has a dielectric constant between approximately 1.5 to approximately 2.1 at temperatures experienced under the hood of modern automotive engines. In still another embodiment, the insulation material that forms the wire insulation 110 and the wire insulation 112 has a dielectric constant between approximately 1.7 to approximately 2.1 at temperatures experienced under the hood of modern automotive engines.

The insulator of each conductive wire may be at least 50% w/w of the cross-linked fluoropolymer. In further embodiments, each conductive wire may be at least 55, 60, 65, 70, 75, 80, 85, 90, 95, 96, 97, 98, 99, or 100% of the cross-linked fluoropolymer.

The insulation materials may also include additives, modifiers, or reinforcements. For example, the insulation materials may be pigmented or include a colorant for identification purposes.

It should be noted that other embodiments of the cable 100 may be provided so as to be an Ethernet cable of a different category, such as Category 5e, Category 6, Category 7, Category 7A, and Category 8. Alternative embodiments of the cable 100 may be provided as other types of Ethernet cables including 10BASE-T1 or 100BASE-T1 cables. Some of the Ethernet standards that different examples of the cable 100 may comply with include IEEE 802.3cg, IEEE 802.3bw, IEEE 802.3 bp, IEEE 802.3ch, IEEE 802.3bu Ethernet standards. Furthermore, some of the cable standards include SAE J3117/1, SAE J3117/2, and SAE J3117/3.

The embodiment of the cable 100 shown in FIG. 12 and FIG. 13 includes a shield 114 and a cable jacket 116 that surround the wires 102, 104 that carry the differential data and/or power signals along the length of the cable 100. In this example, the shield 114 is provided between the wires 102, 104 and the cable jacket 116. The shield 114 is configured to reflect electromagnetic interference (EMI) and/or safely conduct EMI to ground. In either case, the shield 100 helps prevent EMI from effecting the conductors 106, 108 in the wires 102, 104. Thus, even if some EMI passes through the shield 100, it is highly attenuated and does not significantly interfere with the data and/or power signals being transmitted along the conductors 106, 108 of the wires 102, 104.

In this example, the shield 100 is provided as a braid, which may be formed as a woven mesh of a metal such as copper. The shield 100 can thus provide a highly conductive path to ground. This embodiment of the cable 100 is an example of an unshielded twisted pair cable (UTP). In some implementations, the cable 100 is up to 40 meters in length and is particularly useful for use in large trucks. In alternative examples, the shield 100 may be provided as a foil shield, which may be formed by a thin layer of a metal such as aluminum. The foil shield may be attached to a carrier (which may be formed from a material such as polyester) to add strength and ruggedness. In still other examples, the cable 100 may include multiple concentric shields, which is particularly useful in very noisy environments. In still other examples, the cable 100 may be unshielded so that there is no shield 114 between the jacket 116 and the wires 102, 104. This would be an example of an unshielded twisted pair cable (UTP). In some implementations, the UTP may be up to 15 meters in length and be particularly useful in standard consumer automobiles.

The embodiment of the cable 100 shown in FIG. 12 and FIG. 13 also includes the jacket 116, which forms the outermost layer of a cable 100 and is thus whose outer surface is exposed externally to the external environment. Some embodiments of the jacket 116 surround one or both of the shield 114 and the wires 102, 104. In this manner, the jacket 116 is configured to protect the shield, 114, the insulation 110, 112, and the conductors 106, 108 from EMI, external physical forces, heat, and chemical deterioration. The jacket 116 may be formed from any suitable material, such as polyvinyl chloride (PVC), polyurethane (PUR), chlorinated polyethylene (CPE), neoprene, ethylene propylene rubber (EPR), FEP, PFA, or ethylene tetrafluoroethylene (ETFE). In some alternative examples, fillers, plasticizers, activators, and inhibitors may be added to the jacket 116 to enhance a particular physical, electrical, or chemical characteristic of the jacket 116.

The embodiment of the cable 100 shown in FIG. 12 includes a connector 118 that is connected at one end 120 of the cable 100. More specifically, the connector 118 includes a pair of conductive members 122, 124, wherein a corresponding end (not explicitly shown) of the conductor 106 of the wire 102 is connected to the conductive member 122 and a corresponding end (not explicitly shown) of the conductor 108 of the wire 104 is connected to the conductive member 124. The conductive members 122, 124 may provide a differential input/output port of the cable 100 so that the differential data and/or power signals propagated through the wires 102, 104 can be input and/or output into and/or out of the cable 100. The connector 118 also includes a connector housing 126 that house the pair of conductive members 122, 124. The shield 114 and the jacket 116 are terminated and attached internally within the housing 126. The housing 126 further includes an insertable portion 128 that surrounds the conductive members 122, 124 and may be inserted into an antipodal connector (not explicitly shown) so that data and/or power differential signals may be input into and/or output out of the cable 100.

It should be noted that in this example, the connector 118 is a male differential connector since the pair of conductive members 122, 124 provide a male connection to input or output the data and/or power differential signals. In alternative embodiments, the connector 118 may be a female connector and thus include a pair of conductive channels configured to receive the male differential. connector. In addition, in this embodiment of the cable 100, another connector, like the connector 118, is not provided at the other end 128 of the cable 100. Instead, a connection may be provided directly to the conductors 106, 108 at this end 128 of the cable 100. However, in alternative embodiments, another connector, like the connector 118, is connected at this end 128 of the cable 100.

E. Other Uses

The compositions disclosed herein can be designed to exhibit both low loss and high mechanical properties, as well as high surface energy. These improved properties are advantageous for a number of electronics and electrical components, such as rigid, multi-layer low loss PCBs. The compositions disclosed herein, however, are not limited to the electronics industry, and find applications found in other industries, such as automotive, wire and cable, oil and gas, aerospace, 3D printing, and others.

F. Materials

Disclosed embodiments described in the Examples section utilize some or all of the following materials: perfluoroalkoxy alkane (PFA), fluorinated ethylene propylene (FEP), an unsaturated bisoxazoline such as, for example, 4,4'-Bis(2-benzoxazolyl) stilbene to act as a compatibilizer, a cross-linking agent such as, for example, vinyl functionalized polyhedral oligomeric silsesquioxane (POSS) or other engineering polymers including polyether imides (PEIs) and polyimides (PIs) with vinyl or amine functional groups, a PFA-PEI copolymer as an additional compatabilizer and cross-linker, and, in some cases, a cross-linking initiating agent, such as an organic peroxide.

Some of the PFAs and/or FEPs used in the examples below contain functional end groups. Types of functional end-groups (i.e. not fully fluorinated end groups) include hydroxyl and carboxylic acid functionalities. Alternatively, it is also possible to blend PFA and FEP together. In such cases, the FEP, PFA, or both may contain a tunable amount of functional end-groups.

G. PFA-PEI Block Copolymer

A PFA-PEI block copolymer was used in some examples below as a compaibilizer and/or cross-linker. The PFA-PEI copolymer was created using a PFA referred to as PFA Grade 2. In some embodiments, PFA Grade 2 contains between about 500 and 8,000 reactive end groups. In some embodiments, Grade 2 PFA contains between about 500 and 3,000 reactive end groups. In some embodiments, Grade 2 PFA contains between about 500 and 2,000 reactive end groups. In some embodiments, PFA Grade 1 is utilized in addition to or in combination with PFA Grade 2. PFA Grade 1 contains between about 0 and about 500 reactive end groups.

Figure 53:
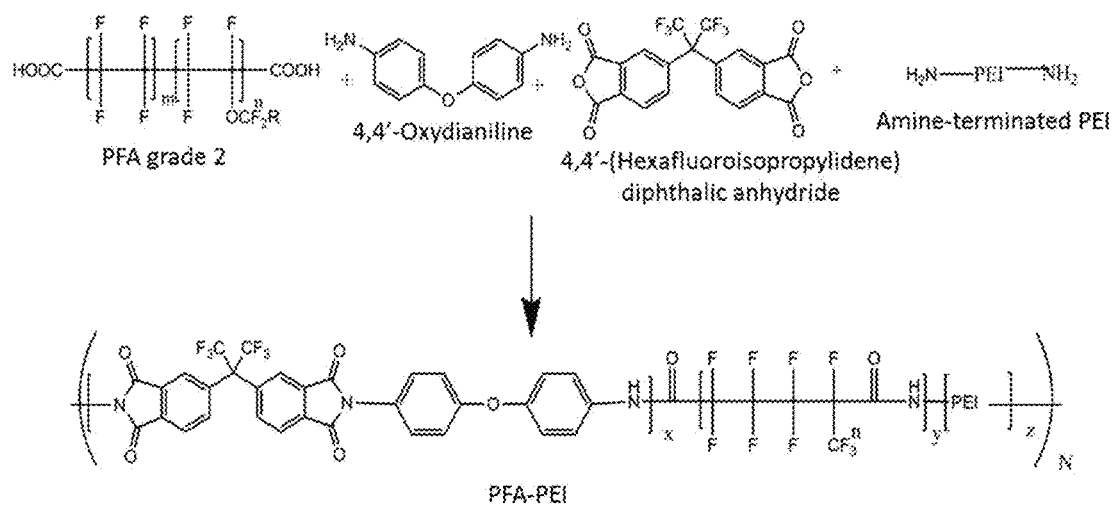
FIG. 53 shows a potential reaction for synthesizing PFA-PEI

FIG. 53 illustrates a potential reaction scheme for the synthesis of PFA-PEI by reactive extrusion. As shown in FIG. 53, PFA Grade 2 is mixed with the following components: amine-terminated PEI, 4,4'-(Hexafluoroisopropylidene) diphthalic anhydride (6FDA), and 4,4'-Diaminodiphenyl ether.

The amounts of 6FDA and 4,4'-Diaminodiphenyl ether are chosen so as to achieve a 1:1 molar ratio of these components. All components were mixed manually and then fed into the twin screw extruder at a rate of 4.5-6.0 kg/hr. The temperature profile of the extruder is given in Table 1. After extrusion, pellets were dried in an oven at 100° C. for at least 4 hours prior to use.

TABLE 1

Temperature Profile of Extruder during synthesis of PFA-PEI

| Zone | 1 | 2 | 3 | 4 | 5 | 6 | 7 | 8 |
|---|---|---|---|---|---|---|---|---|
| Temperature (° C.) | 350 | 375 | 385 | 375 | 370 | 385 | 390 | 380 |

As the role of the PFA-PEI in most embodiments is as an additive, it is not injection molded into workpieces for characterization, rather pellets are characterized by DSC, TGA, and MFR. Results and comparison to the grades of PFA used in this study are shown in Table 2.

There are two grades of PEA used in the examples below, PEA Grade 1 and PFA Grade 2. For examples that do not contain PFA-PEI, these are held in a ratio of about 80:20 of PFA Grade 1:PFA Grade 2. The total amount of PFA is what is given when compositions are listed. Some differences in these grades are shown in Table 2. For examples containing PFA-PEI, the compositions are created such that the ratio of PFA Grade 1:PFA Grade 2 is still 80:20, but all of the PFA Grade 2 is contained within the PFA-PEI. It will be appreciated that many alternative formulations and/or grades of PFA may be used independently or in combination in accordance with various embodiments disclosed herein.

TABLE 2

Characteristics of PFA-PEI and PFA Grades

| | Characteristic | | | | |
|---|---|---|---|---|---|
| | Tm | ΔH at 305° C. | 1% wt loss temp | 5% wt loss temp | MFR |
| | | | Method | | |
| | DSC | | TGA | | MFR |
| | | | Units | | |
| | ° C. | J/g | ° C. | ° C. | g/10 min |
| PFA grade 1 | 302.50 | 17.85 | 464.81 | 495.23 | 30.93 |
| PFA grade 2 | 302.02 | 20.24 | 458.80 | 492.27 | 78.83 |
| PFA-PEI | 305.24 | 17.26 | 474.56 | 502.01 | 70.66 |

H. Methods

The following describe examples of general methods and processes of producing various embodiments. Other methods are possible; it is noted in the examples below when the methods used to produce specific examples differ from these.

Once a composition is determined, the necessary components were weighed, combined, and mixed manually. Components are fed into a twin screw extruder (Leistritz ZSE-18 HP-PH) using a gravimetric feeder (K-Tron KCL-24-KOX). For extruder conditions such as barrel temperatures and feed rates, see the examples below. In general, the extruder barrel temperature was stepped increased profile from 315°-350° C., although the temperature was dependent on the composition of matter. Generally, a feed rate of 4.0-4.5 kg/hr and screw speed of 250 RPM are used during extrusion; specific temperatures and extruder conditions used are detailed in each example. A single-hole die was used, and then the extrudate entered a water bath (Bay Plastics Machinery WBX0606). The extruded strand was then fed through a pelletizer (Bay Plastics Machinery BT25). In many cases, the resulting pellets were dried in ovens to remove residual moisture. An injection molding machine (Sumitomo SE75DU) was utilized for the creation of injection molded test specimens; for injection molding conditions, see examples below. Mold inserts are used to create tensile bars (ASTM D638 Type V), flexural bars, and square plaques.

It is notable that for this invention, all materials can be combined via a single step of extrusion. No separate steps are required to incorporate cross-linkers or initiators, nor to initiate or propagate cross-linking reactions. By utilizing a twin screw extruder, both physical blending of materials as well as reactive extrusion can take place in a single processing step. In production, this step can be combined with the final forming of the article, such as injection molding, wire coating, and film or sheet extrusion.

Flexural resistance may be measured by the following procedure: polymer was melt blended in a Leistritz 18 mm Twinscrew Extruder and compound was extruded to a pellet shape. The compound was melt blended with high temperature initiator, and extruded into a film of thickness 0.4 mm using a 1" Brabender single screw extruder. The sample was punched with a Lucris MA Series 3 press with ASTM D2176 rectangular die. The film sample was then loaded into Tinius Olsen MIT Folding Endurance Tester, with a spring loaded with 2 lbs weight.

These materials were characterized in a variety of ways, including the melt flow rate (MFR), differential scanning calorimetry (DSC), thermogravimetric analysis (TGA), dynamic mechanical analysis (DMA), tensile testing, flexural testing, and hardness testing. MFR was measured using a dwell time of 5 minutes and a chamber temperature of 372° C.; both Tinius Olsen MP1200 and Dynisco D4001 MFR testers were employed for MFR testing. For DSC, a TA Instruments Q1000 was used to characterize typically pellet samples rather than injection molded parts were used. Samples were equilibrated at 25° C., then heated at a rate of 10° C./min under 50 mL/min of Nitrogen gas (N2) to 385° C. Samples were then cooled at a rate of 10° C./min to a temperature below their melting temperature, typically 100° C. or 185° C.; and then again heated to 385° C. at a rate of 10° C./min. Data from the initial heating cycle is disregarded to negate the effects of thermal history; data is reported only from the second heating cycle. In TGA, 10 ml/min of nitrogen was used as the purge gas, while 10 mL/min of air was used as the sample gas. Samples were heated at 10°

C./min from an equilibration temperature of 25°-40° C. to 800° C. using a TA Instruments Q500.

A TA Instruments Q800 DMA was used with a single cantilever fixture in multi-frequency strain mode. A single frequency of 1 Hz was used at an amplitude of 15 µm. Samples were cut to fit in the single cantilever fixture from flexural bar samples (approximately 13 mm wide and 3 mm thick). Samples were equilibrated at 40° C. for 1 min. The temperature was then ramped 3° C./min to 270° C., while the oscillatory strain was applied. Tensile and flexural testing was performed using an Instron 5582 Universal tester. For tensile tests, a 10 kN load cell was utilized along with clamps to hold ASTM D638 Type V tensile bars.

In Example 1, the following tensile method was used: samples were gripped at a distance between grips of 25.4 mm. The sample was tensile tested at a rate of 50 mm/min. The sample was tensile tested until failure of sample by breaking. For data in all examples other than Example 1, test specimens were pulled at a rate of 10 mm/min in accordance with ASTM 638. Testing was concluded when load decreased by 85% of maximum peak load or specimen fractured. Data was captured every 100 ms, with the load recorded in intervals of 0.1 N. Reported values are the average of tensile tests on five samples, unless otherwise noted. For ASTM flexural testing, the 1 kN load cell was used, along with a three-point bend fixture. Samples were flexed at a rate of 1.35 mm/min, ending when the flexural extension reached 10.65 mm or the flexural strain reached 10%. Data was collected every 100 ms, and load was reported in increments of 25 N. Reported values are the average of three flexural samples, unless otherwise noted. Shore D hardness was measured by a Phase II digital shore D hardness tester. Reported values are the average of five points taken on the same square plaque, with measurements taken at least 5 mm apart. All tensile, flexural, and hardness tests occur at room temperature unless otherwise noted.

Example 1

A fully fluorinated FEP with end terminal groups and having the properties set forth in Table 3 below was mixed in Leistritz ZSE-18 HP-PH twin screw extruder, with temperature ramped from 280° C. to 320° C., with 0.1 weight % of unsaturated bisoxazoline (sold by ICI America as 4,4 bisphenol stilbene) and 1 weight % unsaturated cross-link enhancing additive (vinyl terminated polyether imide (PEI) resin). Samples were extruded at 6.0 kg/hr and 200 RPM. Extruder conditions are shown in Table 3, along with FEP properties The compounded fluoropolymer was melt extruded on a Brabender single screw extruder through a flexible-lip film die to make a uniform (4 mm measure thickness) film. Tensile bar samples were cut from film by punch press and measured on Instron Universal Testing Machine.

TABLE 3

Example 1 Extruder Conditions and Properties of Fully Fluorinated FEP

| Zone | 1 | 2 | 3 | 4 | 5 | 6 | 7 | 8 |
|---|---|---|---|---|---|---|---|---|
| Temperature ° C. | 280 | 290 | 300 | 300 | 310 | 310 | 320 | 320 |

| Characteristic | Method | Result |
|---|---|---|
| Melt Flow Rate, g/10 min | ASTM D-2116 | 35-42 |
| Melting Point (DSC), ° C. | ASTM D-2116 | 255-265 |

TABLE 3-continued

Example 1 Extruder Conditions and Properties of Fully Fluorinated FEP

| Zone | 1 | 2 | 3 | 4 | 5 | 6 | 7 | 8 |
|---|---|---|---|---|---|---|---|---|
| Tensile Strength, MPa, (minimum) | ASTM D-2116 | | | | | | 18 | |
| Elongation, %, (minimum) | ASTM D-2116 | | | | | | 300 | |
| MIT Flex, cycles, avg. | ASTM D-2176 | | | | | | 3,000 | |

TABLE 4

Thin Film Formulations

| Thin Film Blends | Fully Fluorinated FEP | Carboxylated FEP | 4,4'-bis(2-benzoxazolyl) stilbene (%) | PI-tetravinyl (%) | Trigonox 311 |
|---|---|---|---|---|---|
| Control (Fully Fluorinated FEP) Thin Films | 100.0% | 0.00% | 0.00% | 0.00% | 0.00% |
| KP18006247H (1st run) Thin Films | 88.9% | 10% | 0.1% | 1.00% | 0.01% |
| KP18006249C (2nd run) Thin Films | 88.9% | 10% | 0.1% | 1.00% | 0.01% |
| KP180053120C (3rd run) Injected Molded Part | 0.00% | 100.00% | 0.1% | 1.00% | 0.01% |

All concentrations shown as % w/w.

Figure 9:
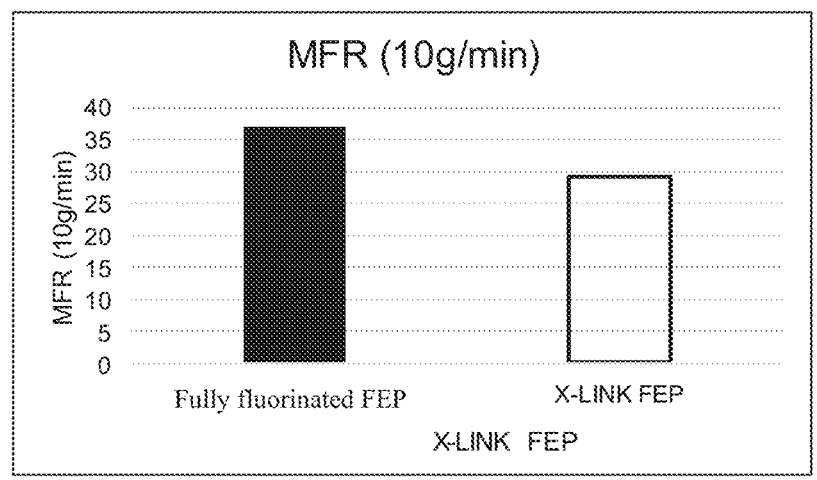
FIG. 9 shows a graph of melt flow rates of cross-linked FEP and pure fully fluorinated FEP.

FIG. 1 shows the dielectric constant of functionalized FEP (KP18006249C) and pure fully fluorinated FEP to be similar. FIG. 9 shows the melt flow rates (MFR) of the cross-linked FEP and the pure fully fluorinated FEP.

The durometer hardness of each sample was measured by ASTM D2240 Durometer B, demonstrating that the cross-linked FEP showed enhanced hardness at elevated temperatures of 155° C. ([0023]). Young's modulus, elongation, yield strength and tensile strength were measured by ASTM D638 Standard Test Method for Tensile Properties of Plastics.

TABLE 5

Mechanical Properties of FEP chemical cross-link thin films

| | Tensile Strength (MPa) | Yield Strength (MPa) | Elongation (%) | Modulus (MPa) |
|---|---|---|---|---|
| FEP Fluoropolymer | 16.8 | 15.1 | 321 | 523 |
| KP18006247H (1st run) | 17.5 | 15.9 | 333 | 616 |

As compared to FEP Fluoropolymer, the cross-linked fluoropolymer (KP18006247H) made by thin films displayed in (Table 3) had superior Young's Modulus, greater elongation, and comparable tensile strength. These data are plotted in FIGS. 14-17.

To measure MIT flexural resistance, each sample was punched with a Lucris MA Series 3 press with an ASTM D2176 rectangular die. The film sample was then loaded into Tinius Olsen MIT Folding Endurance Tester, with a spring loaded with 2 lb weight. The cross-linked fluoropolymer showed superior MIT flexural life as compared to FEP ([0026]).

TABLE 6

MIT Flexural Resistance (23° C.)

| Sample Name | Cycles to break |
|---|---|
| FEP Fluoropolymer | 3,063 |
| KP1806249A | 2,970 |
| KP1806249B | 6,400 |
| KP1806249C | 8,563 |

Compounded fluoropolymer was melt extruded on a Brabender single screw extruder using a 1-3 mm tubing die to form a tube. Tube samples were tested for scrape abrasion resistance according to AS4373 method 301 and tested for dynamic cut-through resistance according to ASTM D150 method 703. The cross-linked FEP showed superior cut-through resistance at 70 and 150° C. compared to FEP ([0024]) and showed vastly superior abrasion resistance to FEP at 70° C. ([0025]).

TABLE 7

Scrape Abrasion Resistance and Dynamic Cut-through

| | Abrasion Resistance | | Dynamic cut-through | | |
|---|---|---|---|---|---|
| Temperature | 23° C. | 70° C. | 23° C. | 70° C. | 150° C. |
| FEP Fluoropolymer | 27218.5 | 18887.5 | 13.3 | 8.94 | 7.6 |
| KP1806249C | 26109.5 | 47435.5 | 13.02 | 10.26 | 10.71 |

Figure 6:
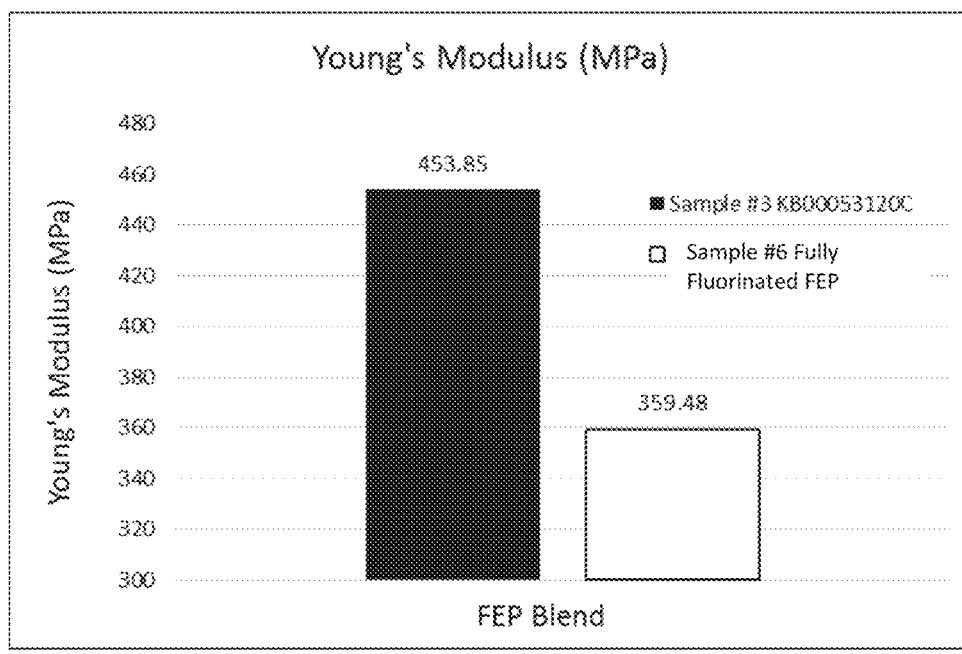
FIG. 6 shows cross-linked FEP (KB00053120C) shows 25% increase in Young's modulus when compared to non-cross-linked fully fluorinated FEP.
Figure 7:
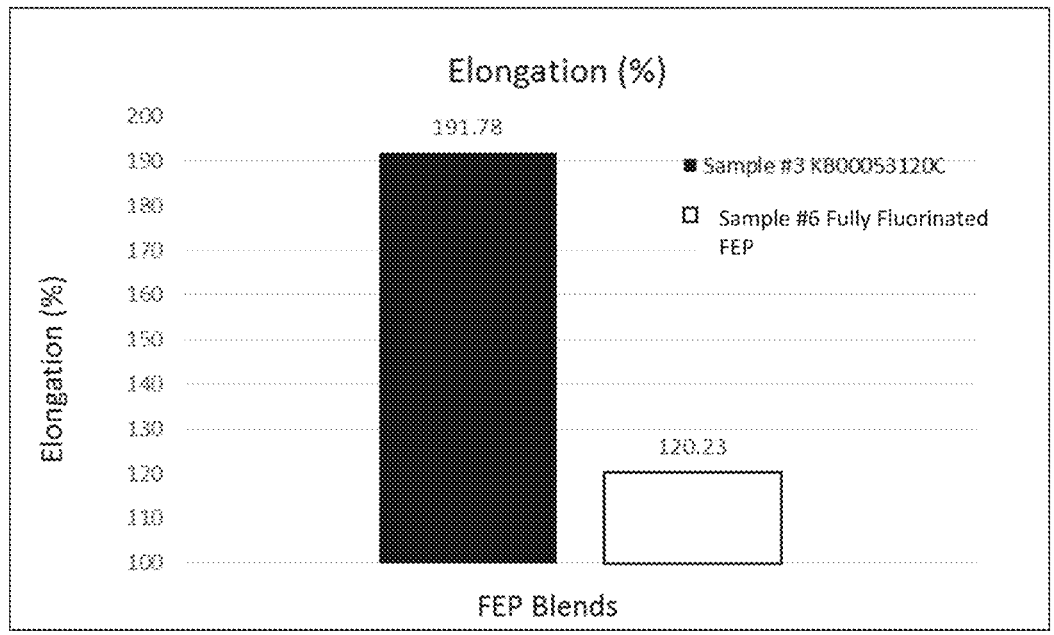
FIG. 7 shows cross-linked FEP (KB00053120C) shows 85% increase in elongation when compared non cross-linked fully fluorinated FEP.
Figure 8:
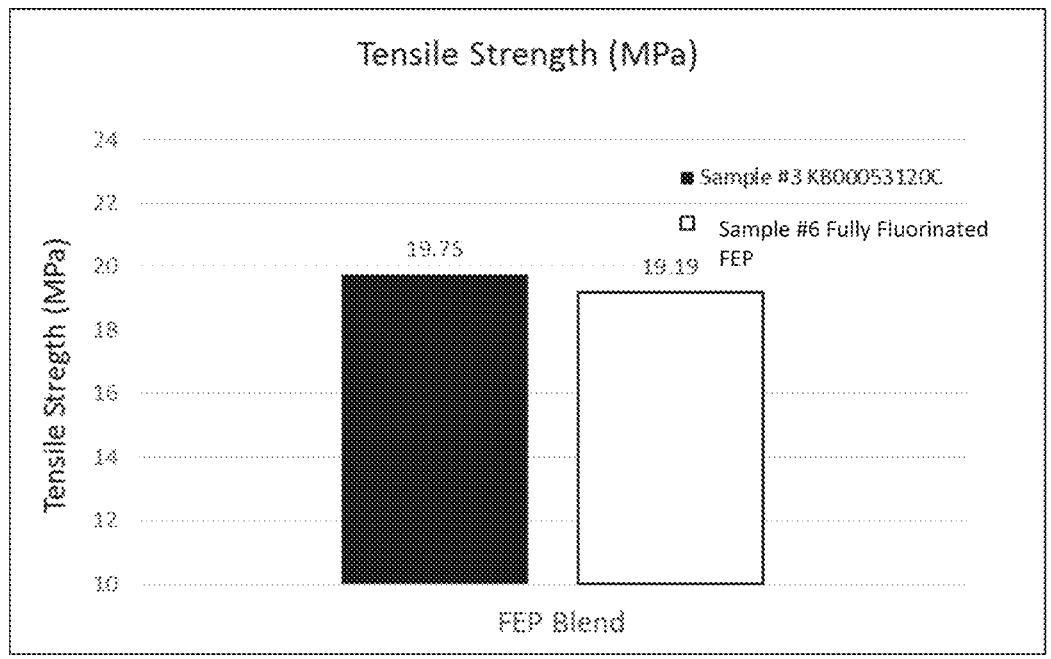
FIG. 8 shows cross-linked FEP (KB00053120C) shows no increase in tensile strength compared to non-cross-linked fully fluorinated FEP.

An injection-molded part (KP180053120C) was tested against FEP for tensile strength, elongation, and Young's modulus. The results in Table 8, below, are illustrated in FIGS. 6-8.

TABLE 8

Injected Molded Part Performance

| Units | Tensile Strength (MPa) | Elongation (%) | Modulus (MPa) |
|---|---|---|---|
| FEP Fluoropolymer | 19.19 | 120.23 | 359.48 |
| KB00053120C | 19.75 | 191.78 | 453.85 |

Example 2: PEA/FEP Blend with Vinyl POSS

Experiments were performed with blends of PFA and FEP, as well as two different grades of a vinyl-functionalized POSS: OL1170 and OL1172. Some sample compositions are shown below in Table 9

TABLE 9

Initial Sample Compositions for Example 2

| Sample name | PFA (%) | FEP (%) | 4,4'-Bis(2-benzoxazolyl) stilbene (%) | Vinyl POSS OL1170 (%) | Vinyl POSS OL1172 (%) | Trigonox 311 (%) |
|---|---|---|---|---|---|---|
| AW1979111D | 77.6 | 19.4 | 1.0 | 1.0 | 0.0 | 1.0 |
| AW1979111E | 95.0 | 0.0 | 1.0 | 3.0 | 0.0 | 1.0 |
| AW1979111F | 76.0 | 19.0 | 1.0 | 3.0 | 0.0 | 1.0 |
| AW1979111G | 76.0 | 19.0 | 1.0 | 0.0 | 3.0 | 1.0 |
| AW1979111H | 95.0 | 0.0 | 1.0 | 0.0 | 3.0 | 1.0 |

In this example, both PFA and FEP contain reactive or functional end groups. Samples were extruded at 4.5 kg/hr at a screw speed of 250 RPM. Extruder barrel temperatures are shown in Table 10 below. Samples were injection molded at the temperatures listed in Table 11.

TABLE 10

Temperature of Twin Screw Extruder used in Example 2

| Zone | 1 | 2 | 3 | 4 | 5 | 6 | 7 | 8 |
|---|---|---|---|---|---|---|---|---|
| Temperature (° C.) | 315 | 315 | 320 | 325 | 330 | 335 | 335 | 340 |

TABLE 11

Temperature of Injection Molding Machine used in Example 2

| Zone | 1 | 2 | 3 | 4 | 5 | Water |
|---|---|---|---|---|---|---|
| Temperature (° F.) | 530 | 610 | 620 | 580 | 530 | 110 |

Figure 18A:
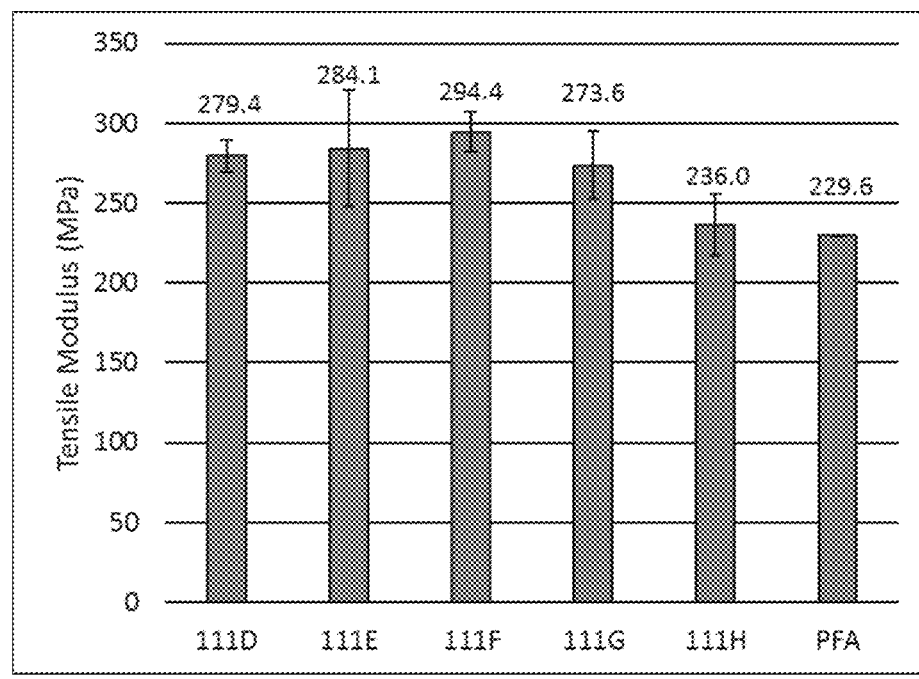
FIG. 18A shows a graph showing the tensile modulus of select polymer samples.
Figure 18B:
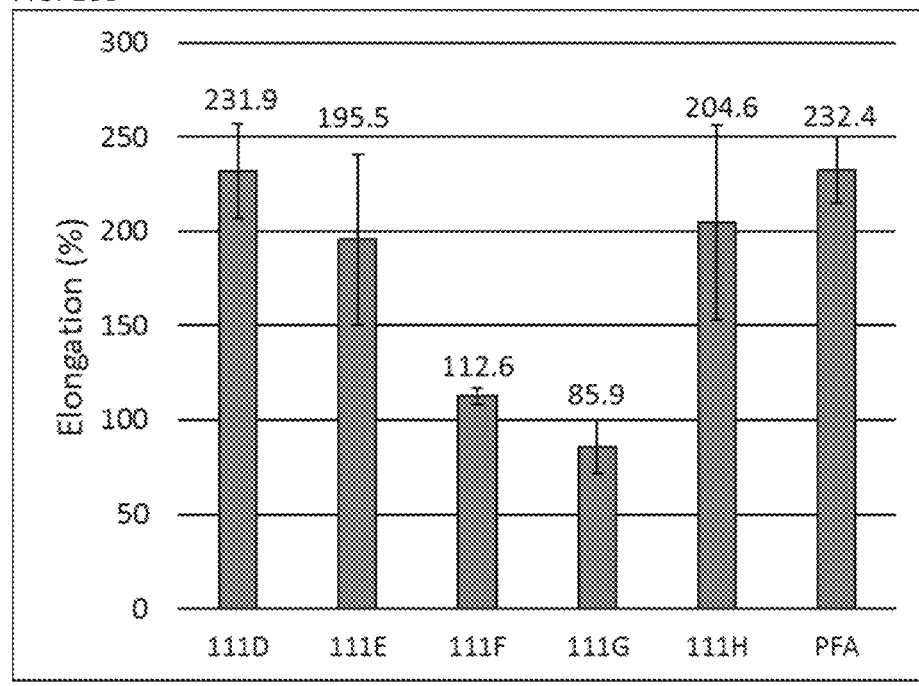
FIG. 18B shows a graph showing the elongation of select polymer samples.

FIG. 18A shows the tensile modulus of samples in Example 2 and PFA. FIG. 18B shows the elongation at break of samples in Example 2 and PEA. Error bars in both FIGS. 18A and 18B are one standard deviation. These measurements were made using tensile testing on samples that had been injection molded. Data collected from tensile tests performed based on ASTM D638. Samples 111E and 111F show the most improved tensile modulus over PFA; no samples show higher elongation than PFA.

Figure 19:
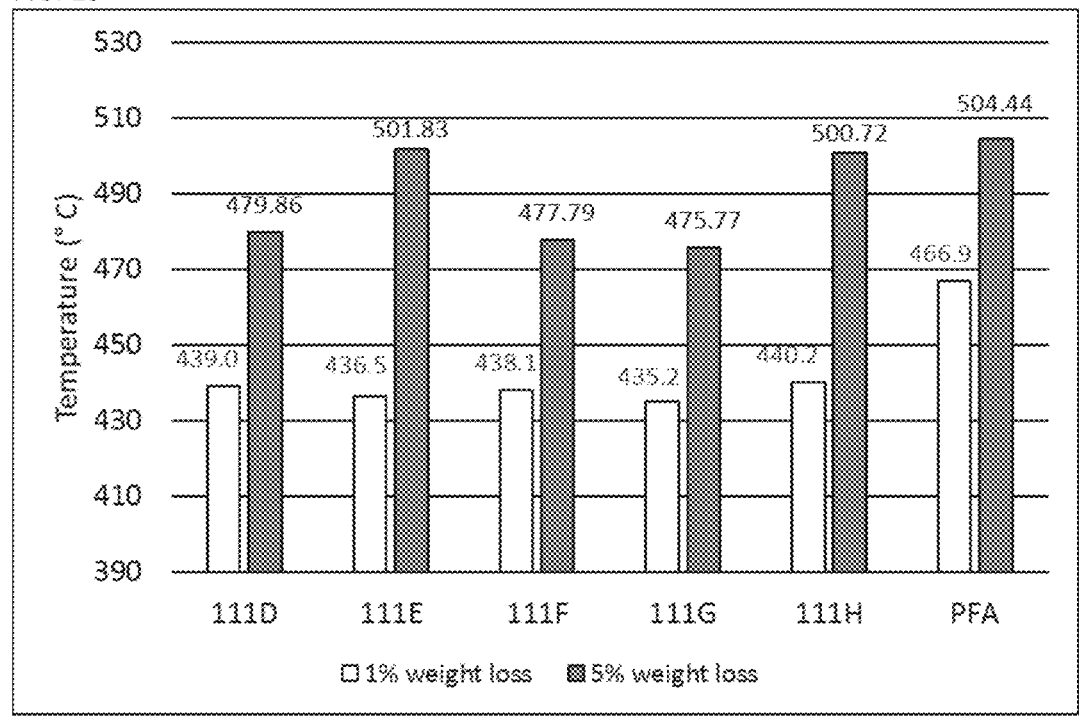
FIG. 19 shows a graph showing the weight loss temperatures of selected polymer samples.

FIG. 19 show the 1% and 5% weight loss temperatures for the samples in Example 2 as well as PFA. All 5% weight loss temperatures are higher than the respective 1% weight loss temperature. These results are from TGA experiments on pellets (not injection molded). Samples 111E and 111H have the highest 5% weight loss temperatures, although none of these samples meet or exceed the 1% and 5% weight loss temperatures of PFA.

Figure 20:
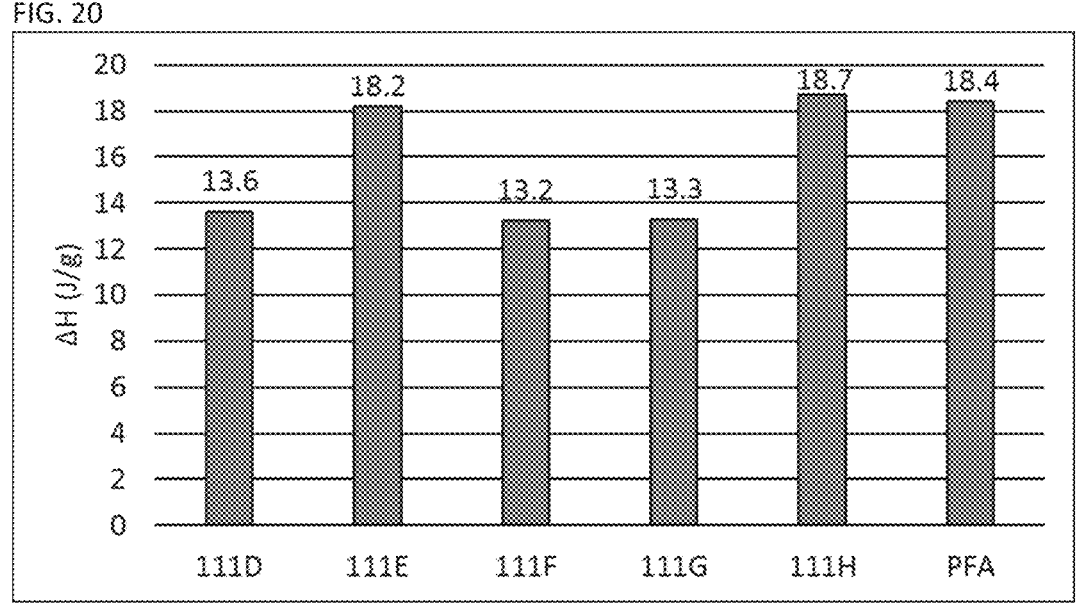
FIG. 20 shows a graph showing the change in enthalpy of fusion of selected polymer samples.

FIG. 20 shows the change in enthalpy of fusion of samples in Example 2, as well as PFA. This data is generated from DSC experiments on pellets and measured at the melting temperature of PFA, 305° C. The change in enthalpy of fusion is, graphically, the normalized integral under the curve around the specified temperature. It is generally proportional to the % crystallinity of the sample, with higher changes in enthalpy of fusion corresponding to higher % crystallinity of the sample.

In comparing cross-linked samples according to disclosed embodiments to unmodified polymer, there are some common trends. The tensile modulus is increased with while the elongation at break is decreased compared to unmodified PFA. Thermal stability is comparable. From DSC, we can measure the enthalpy of fusion, which is an indirect measure of how crystalline a sample is. Some embodiments have a lower enthalpy of fusion and may therefore have a lower crystallinity than PFA alone.

When comparing specific samples, it is shown that increasing the concentration of vinyl POSS grade OL1170 from 1% to 3% (e.g. comparing 111D to 111F) does not have a noticeable effect on thermal properties. Similarly, the tensile modulus is similar, but the elongation is decreased with 3% OL1170. When comparing vinyl POSS grades to each other, OL1170 to OL1172 (e.g. 111F compared to 111G and 111E compared to 111H), all thermal and mechanical properties are comparable. When comparing the amount of FEP in samples (e.g. 111E compared to 111F and 111G compared to 111H), samples without FEP generally have higher enthalpies of fusion and higher elongation. FEP has a lower melting temperature than PFA. Without being bound by theory, it is believed FEP would already be melted by the time the melting point of PFA is reached in the DSC. This means its melting would not contribute to the enthalpy change at the PFA melting temperature.

From this data, one embodiment for Example 2 contains 1 wt % of OL1172 or OL1170 and no FEP. Additional vinyl POSS may not offer benefits when higher elongation is desired. In some embodiments, either grade of vinyl POSS can be used. For the following examples, OL1172 is used.

Example 3: PFA with Varying Compatibilizer Amount

Once a concentration of vinyl POSS and FEP were selected, further experiments were carried out to study other components of the invention. Specifically, the samples with compositions described in Table 12 involved varying the amount of bisoxazoline compatibilizer. Organic peroxide was not used in these samples. The use and amount of organic peroxide is examined in Example 5.

TABLE 12

Initial Sample Compositions for Example 3

| Sample name | PFA (%) | 4,4'-Bis(2-benzoxazolyl) stilbene (%) | Vinyl POSS OL1172 (%) |
|---|---|---|---|
| AW2008811A | 98.9 | 0.1 | 1.0 |
| AW2008811B | 98.5 | 0.5 | 1.0 |
| AW2008811C | 98.0 | 1.0 | 1.0 |
| AW2008811D | 97.0 | 2.0 | 1.0 |

Samples were extruded at 4.5 kg/hr at a screw speed of 250 RPM. Extruder barrel temperatures are shown in Table 13 below. Samples were injection molded at the temperatures listed in Table 14.

TABLE 13

Temperature of Twin Screw Extruder used in Example 3

| Zone | 1 | 2 | 3 | 4 | 5 | 6 | 7 | 8 |
|---|---|---|---|---|---|---|---|---|
| Temperature (° C.) | 315 | 315 | 320 | 325 | 330 | 335 | 340 | 350 |

TABLE 14

Temperature of Injection Molding Machine used in Example 3

| Zone | 1 | 2 | 3 | 4 | 5 | Water |
|---|---|---|---|---|---|---|
| Temperature (° F.) | 610 | 671 | 680 | 698 | 707 | 110 |

Select mechanical and thermal data for samples from this example are shown in FIGS. 21-25.

Figure 21A:
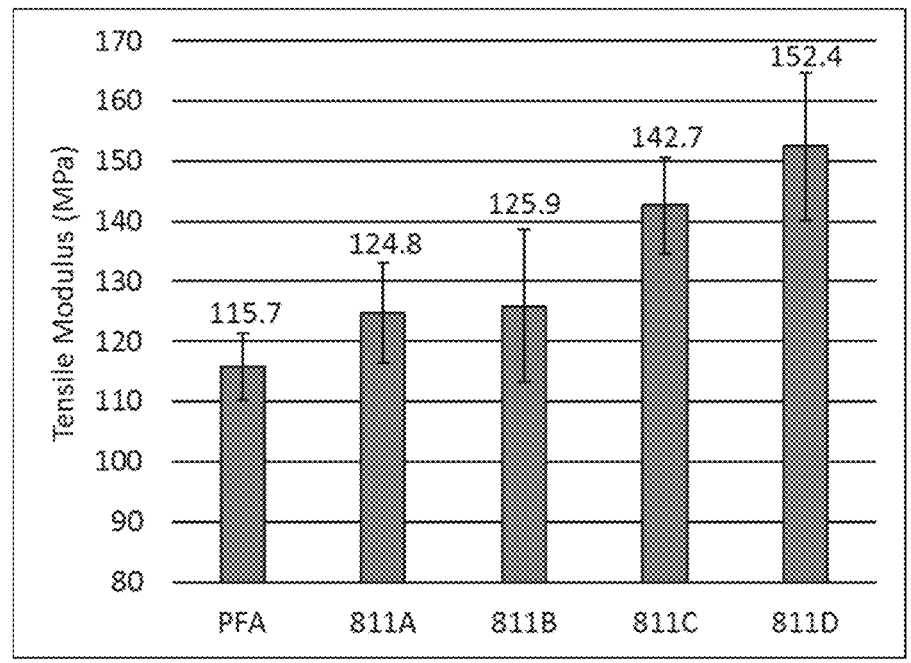
FIG. 21A shows a graph showing the tensile modulus of select polymer samples.
Figure 21B:
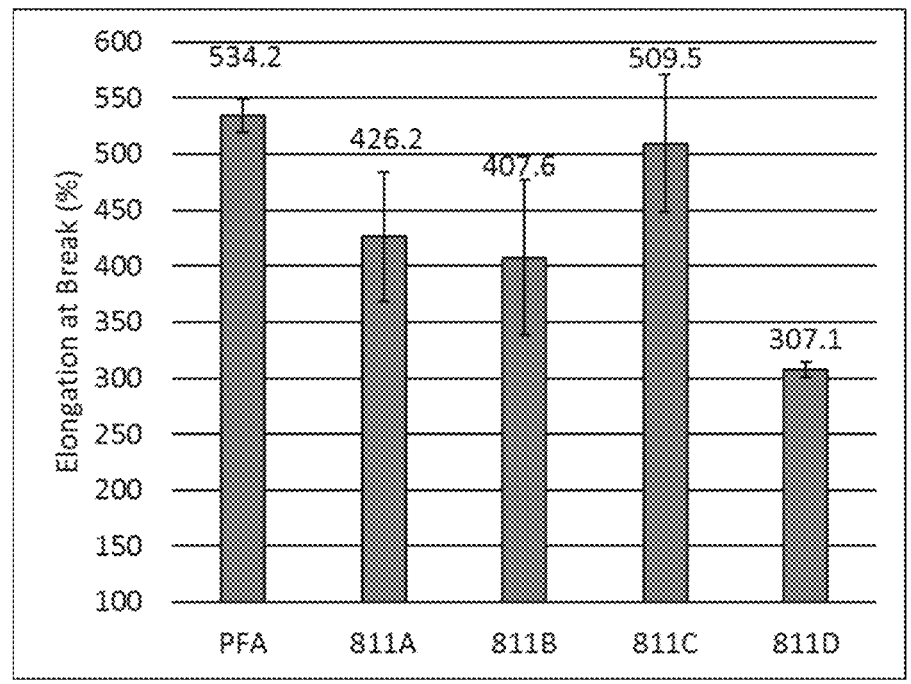
FIG. 21B shows a graph showing the elongation of select polymer samples.

FIG. 21A shows the tensile modulus of samples in Example 3 and PFA. FIG. 21B shows the elongation at break of these same samples. Error bars in both FIGS. 21A and 21B are one standard deviation. These measurements were made using tensile testing on samples that had been injection molded. Data collected from tensile tests performed based on ASTM D638. Samples with 2 wt % of bisoxazoline show increased tensile modulus and lower elongation compared to PFA.

Figure 22:
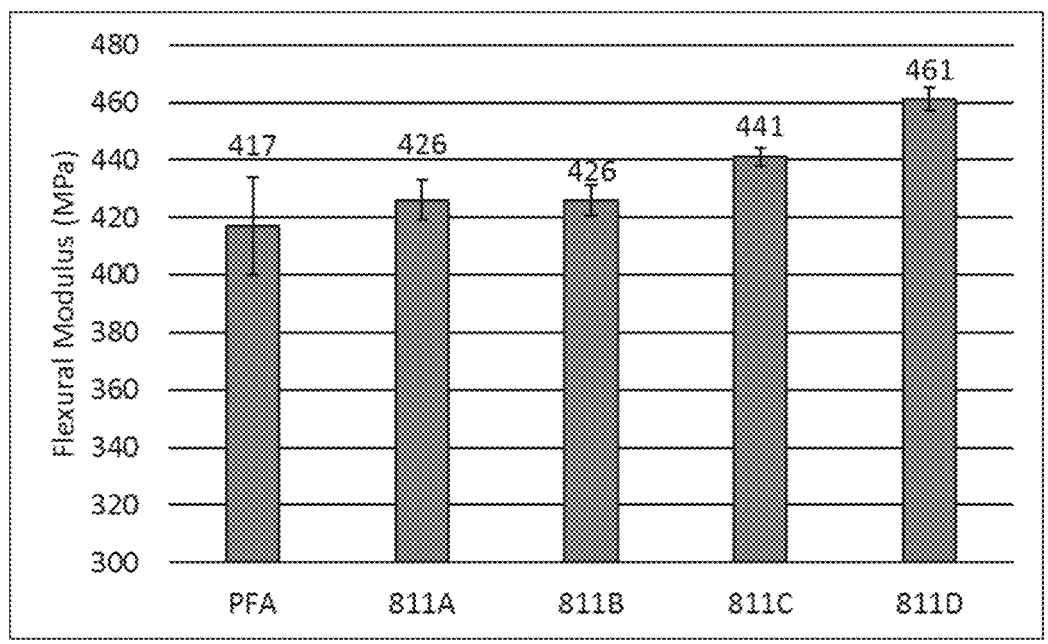
FIG. 22 shows a graph showing the flexural modulus of select polymer samples.

FIG. 22 shows the flexural modulus of samples in Example 3 and PFA. These measurements were made using 3-point bend testing on samples that had been injection molded. Error bars represent one standard deviation. Again, samples with high concentrations of bisoxazoline (2%) show improved modulus over PFA.

Figure 23A:
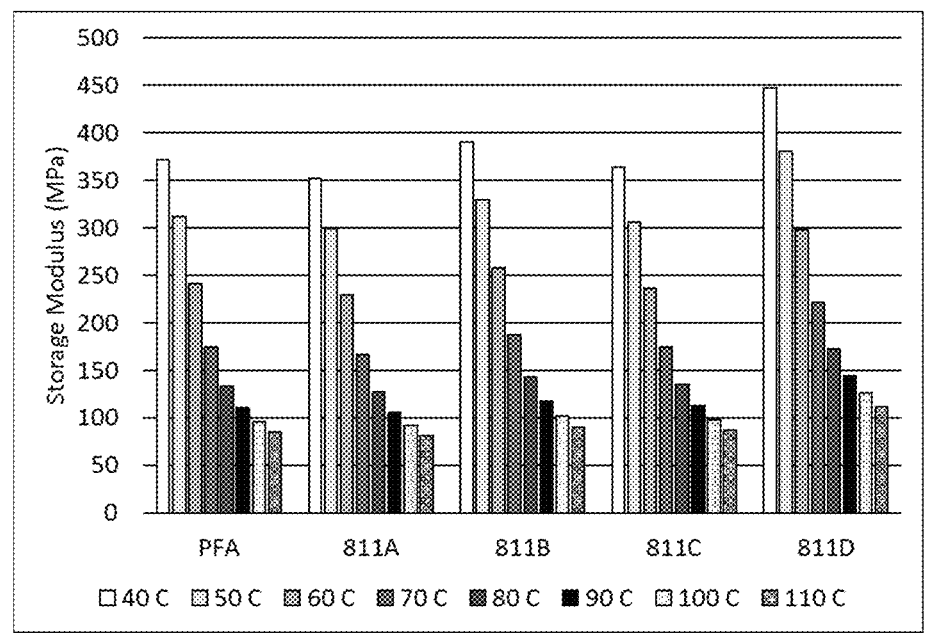
FIG. 23A shows a graph showing the storage modulus of select polymer samples.
Figure 23B:
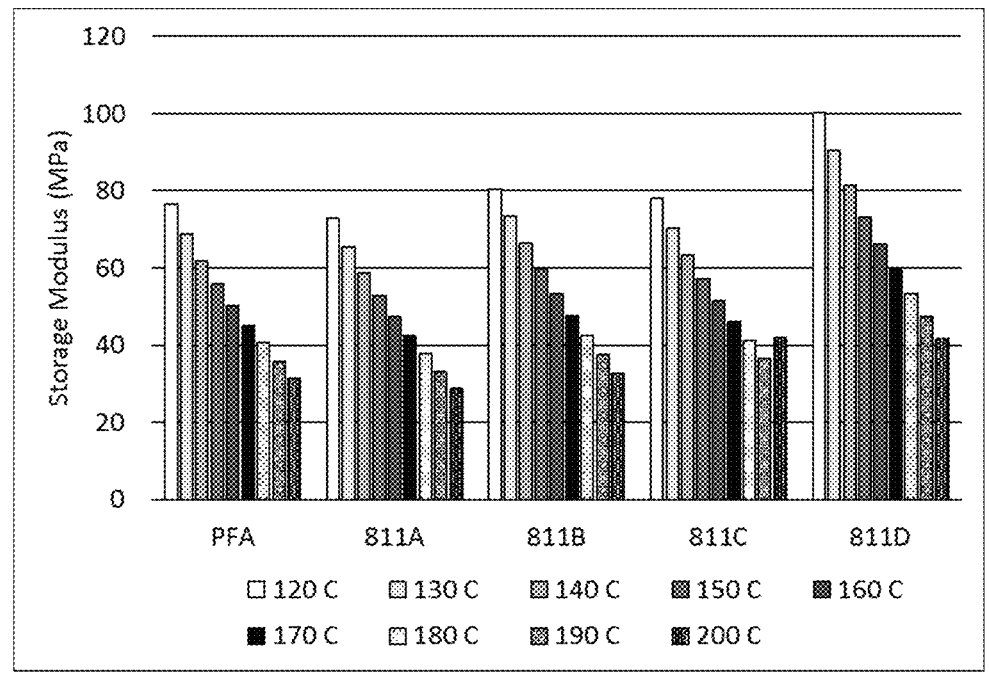
FIG. 23B shows a graph showing the storage modulus of select polymer samples.

FIGS. 23A and 23B show the storage modulus of samples studied in Example 3 and PFA. FIG. 23A shows the storage modulus measured at temperatures between 40° and 110° C., while FIG. 23B shows the storage modulus measured at temperatures between 120° and 200° C. Measurements were taken on a section of injection molded parts using a DMA. Samples with 2% concentration of bisoxazoline (111D) show improved storage modulus at all temperatures studied here.

Figure 24:
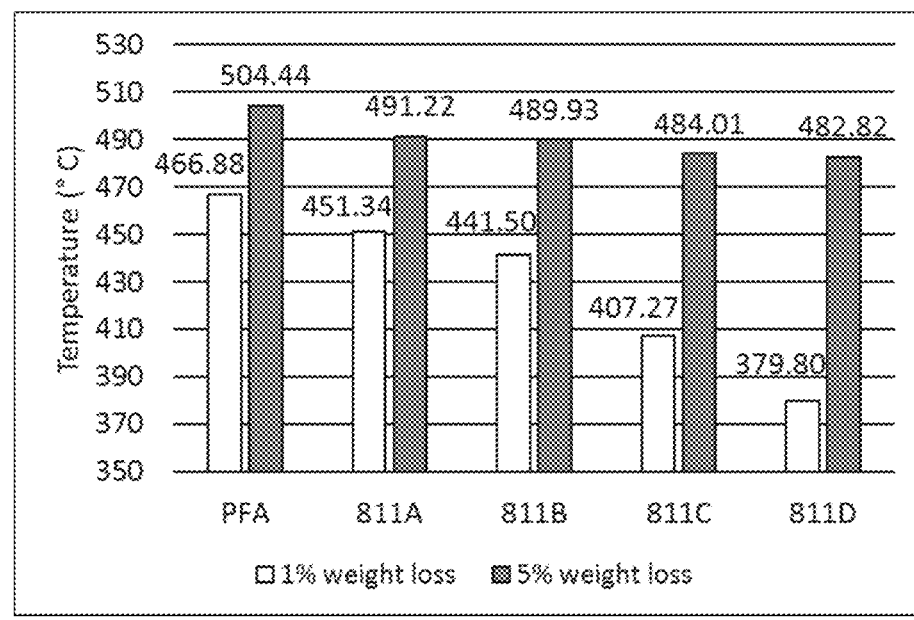
FIG. 24 shows a graph showing the weight loss temperatures of selected polymer samples.

FIG. 24 shows the temperatures (° C.) at which 1% and 5% of the initial weights of each sample in Example 3 and PFA are lost in TGA experiments. The data was collected using pellets (not injection molded). Samples with higher bisoxazoline concentrations have lower 5% weight loss temperatures.

Figure 25A:
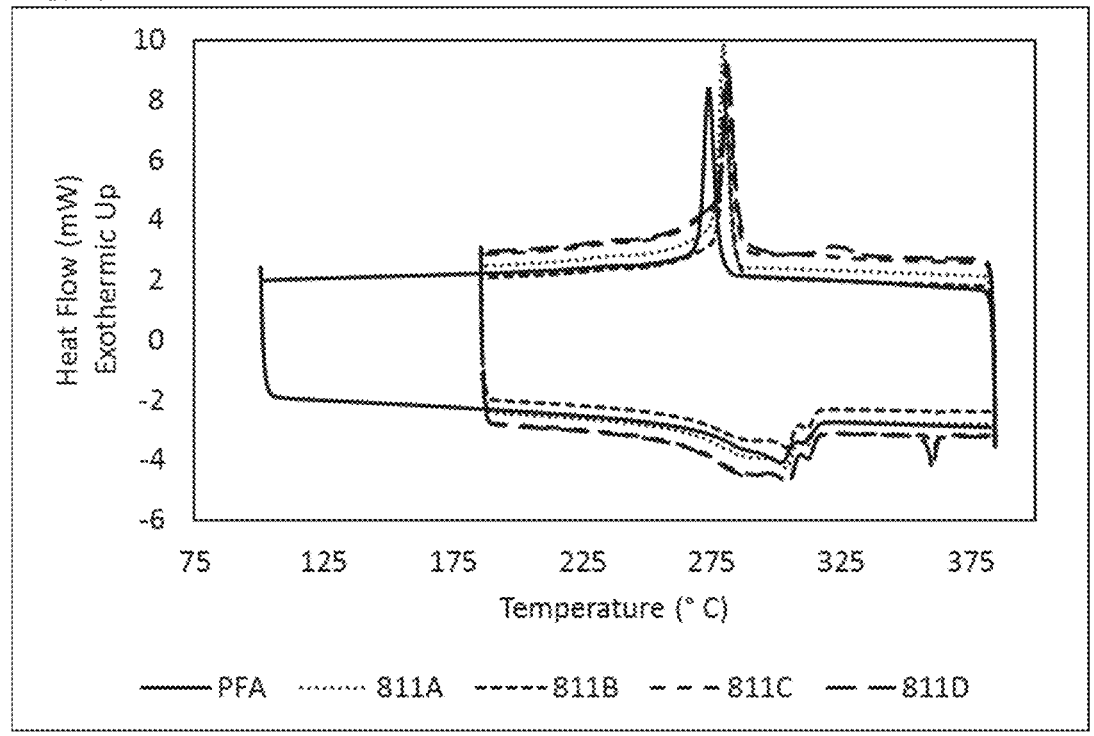
FIG. 25A shows a graph showing the thermal response of selected polymer samples.
Figure 25B:
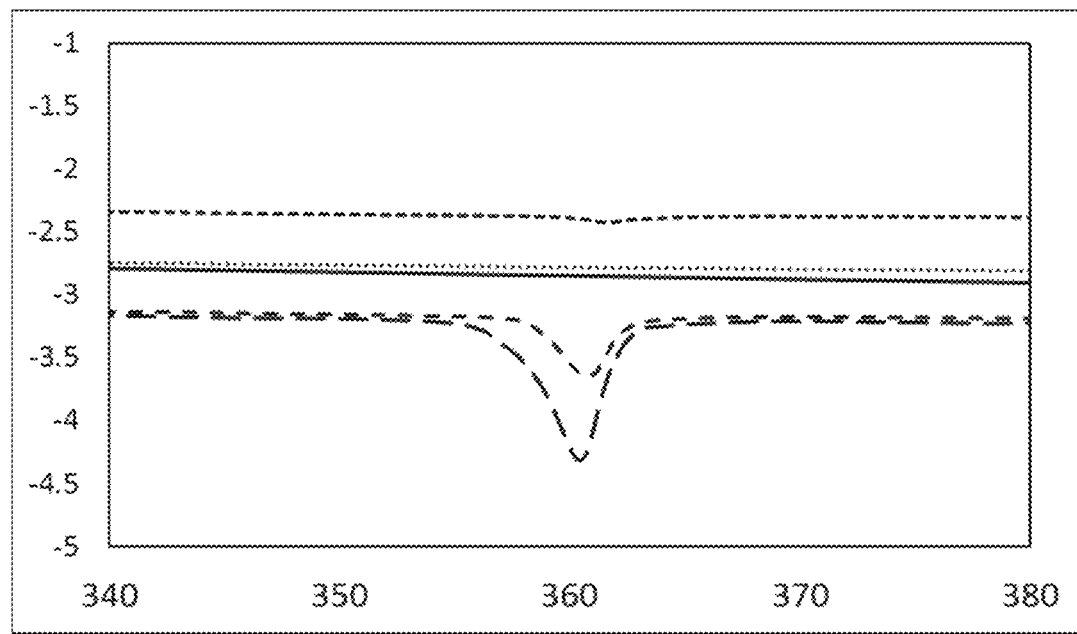
FIG. 25B shows a specific section of the graph showing the thermal response of selected polymer samples shown in FIG. 25A.

FIGS. 25A and 25B show DSC curves of the samples in Example 3. The data was collected using pellets (not injection molded). All samples show a melting peak at approximately 305° C., which is the melting point of PFA. Some samples show a smaller additional melting peak at approximately 360° C. This corresponds to the melting of the bisoxazoline used in these samples. FIG. 25B shows this temperature range in more detail.

As shown above, samples with 2% bisoxazoline (811D) perform differently than PFA without any additives. For tensile modulus, 1% bisoxazoline is required to achieve a statistically significant increase in tensile modulus. Similar results can be seen in FIGS. 21 and 22, in which samples with 0.1% and 0.5% bisoxazoline show similar tensile modulus, elongation at break, and flexural modulus to PFA without additives. In FIGS. 23A and 23B, only sample 811D has a noticeable increase in storage modulus across a range of temperatures. This sample shows a 31.7% higher tensile modulus compared to PFA alone, a decrease in elongation at break to 52.5% of the value of PFA, and a 10.6% increase in flexural modulus over PFA. The storage modulus of sample 811D is 21.9 to 40.8% higher than that of PFA across the temperature range studied here; it is the only sample in this example to have a storage modulus increase of at least 20% at all temperatures.

In addition to comparisons within this example, it is elucidating to compare the data in Example 3 to that in Example 2. The values of storage modulus shown in FIG. 18 are much higher than those shown in FIG. 21; even the value for PFA differs. Without being bound by theory, it is believed that the differences between the values shown in FIG. 18 and FIG. 21 are due to processing differences, specifically differences in injection molding. The temperatures used to injection mold samples in Example 2 were lower than those used in Example 3. This higher injection molding temperature profile is used in all subsequent samples. Additionally, when data from injection molded samples are shown, the PFA was injection molded under the same conditions unless otherwise noted.

While samples with a higher amount (1-2%) of bisoxazoline are in general stiffer than their counterparts with lower amounts of bisoxazoline, the results in FIGS. 24 and 25A indicate that the additives are perhaps not fully integrated into the polymer network. In FIG. 24, the more additives present, the lower both 1% and 5% weight loss temperatures. Without being bound by theory, this may indicate that the small molecules of the bisoxazoline may be degrading at temperatures below the PFA. Similarly, the melting peak of the bisoxazoline can be seen in FIG. 25A. In Table 15, the area in this peak, which is related to the enthalpy change of fusion of the bisoxazoline, is shown. It is evident from FIG. 25A and Table 15 that the bisoxazoline is still present in the samples that have higher initial concentrations of bisoxazoline.

TABLE 15

Enthalpy change of fusion at 360° C. for samples studied in this example

| Sample | PFA | 811A | 811B | 811C | 811D |
|---|---|---|---|---|---|
| Enthalpy change at 360° C. (J/g) | $9.454 \times 10^{-4}$ | $2.483 \times 10^{-3}$ | $6.327 \times 10^{-2}$ | 0.5439 | 1.402 |

Example 4: Changing Processing Conditions

Comparing the results in FIG. 25A to the extruder conditions in Table 22, it was hypothesized that the bisoxazoline was not melted in the extruder, despite higher concentrations of bisoxazoline improving mechanical properties. Two samples with identical compositions were prepared and extruded at two different temperature profiles. The composition of these samples is shown in Table 16, and the extruder temperature profiles are shown in Table 17. In both cases, the extruder was fed at a rate of 4.5 kg/hr and the screw rotated at 250 RPM. Injection molding conditions were the same as those in Example 3.

TABLE 16

Initial Compositions of Samples in Example 4

| Sample Name | PFA (%) | 4,4'-Bis (2-benzo-xazolyl) stilbene (%) | Vinyl POSS OL1172 (%) | Extruder Temperature Profile (see Table 17) |
|---|---|---|---|---|
| AW2008838A | 97.0 | 2.0 | 1.0 | 1 |
| AW2008838B | 97.0 | 2.0 | 1.0 | 2 |

TABLE 17

Temperature Profiles used in the Twin Screw Extruder in Example 4

| Zone | 1 | 2 | 3 | 4 | 5 | 6 | 7 | 8 |
|---|---|---|---|---|---|---|---|---|
| Profile 1 (° C.) | 315 | 315 | 320 | 325 | 330 | 335 | 340 | 350 |
| Profile 2 (° C.) | 355 | 355 | 360 | 365 | 370 | 375 | 380 | 390 |

Mechanical data from these samples is summarized in Table 18. Thermal data is summarized in Table 19. When errors are given, they represent one standard deviation.

TABLE 18

Mechanical and Thermo-mechanical Data for the Samples in Example 4.

| Characteristic | Tensile Modulus (MPa) | Elongation at break (%) | Flexural Modulus (MPa) | Storage modulus (MPa) at | | |
|---|---|---|---|---|---|---|
| (units) Testing method | Instron/ tensile testing | Instron/ tensile testing | Instron/ flexural testing | 50° C. | 100° C. | 150° C. |
| | | | | DMA | | |
| 838A | 136.48 ± 12.79 | 365.20 ± 72.35 | 572 ± 5.56 | 349.3 | 113.9 | 65.69 |
| 383B | 136.76 ± 12.46 | 369.74 ± 26.59 | 581 ± 18.76 | 311.4 | 106.1 | 59.52 |

TABLE 19

Thermal Data for the Samples in Example 4.

| | Characteristic (units) | | |
|---|---|---|---|
| | Enthalpy change at 360° C. (J/g) | 1% wt loss temperature (° C.) | 5% wt loss temperature (° C.) |
| | Testing method | | |
| | DSC | TGA | TGA |
| 838A | 0.7025 | 370.12 | 483.11 |
| 838B | 0.5436 | 387.21 | 485.41 |

The data in Table 18 shows almost identical tensile and flexural properties for samples 838A and 838B. The thermal properties shown in Table 19 indicate that more bisoxazoline may be reacting or becoming incorporated into the polymer network for sample 838B than 838A, as evidenced by its smaller enthalpy change at 360° C. (the melting point of the bisoxazoline). This is also apparent in the storage modulus in Table 18. Higher temperatures may allow more of the bisoxazoline to become incorporated into the polymer matrix, making changes to the storage modulus and DSC and TGA curves while being small enough to have no noticeable impact on the bulk properties of tensile and flexural performance. Therefore, higher temperatures that melt all materials are preferred for extrusion.

Example 5: The Use of an Organic Peroxide as Cross-Linking Initiator

It is of note that the samples in Examples 3 and 4 contained no organic peroxide to act as a cross-linking initiator. However, the mechanical properties still improved relative to PFA. To determine the optimal amount of organic peroxide needed, samples were designed to contain similar compositions with increasing amounts of organic peroxide.

These compositions are shown in Table 20. Note that some of these samples are the same samples from Example 3.

TABLE 20

Sample Compositions in Example 5.

| Sample name | PFA (%) | 4,4'-Bis(2-benzo-xazolyl) stilbene (%) | Vinyl POSS OL1172 (%) | Trigonox 311 (%) |
|---|---|---|---|---|
| AW2008811A | 98.9 | 0.1 | 1.0 | 0.0 |
| AW2008814E | 98.8 | 0.1 | 1.0 | 0.1 |
| AW2008814F | 98.4 | 0.1 | 1.0 | 0.5 |
| AW2008811B | 98.5 | 0.5 | 1.0 | 0.0 |
| AW2008814I | 98.4 | 0.5 | 1.0 | 0.1 |
| AW2008814J | 98.0 | 0.5 | 1.0 | 0.5 |
| AW2008811C | 98.0 | 1.0 | 1.0 | 0.0 |
| AW2008814M | 97.9 | 1.0 | 1.0 | 0.1 |
| AW2008811D | 97.0 | 2.0 | 1.0 | 0.0 |
| AW2008814Q | 96.9 | 2.0 | 1.0 | 0.1 |

Higher amounts of Trigonox 311 were avoided due to processing difficulties of the resulting mixture when 1 wt % Trigonox 311 was used (as in Example 2).

Figure 26A:
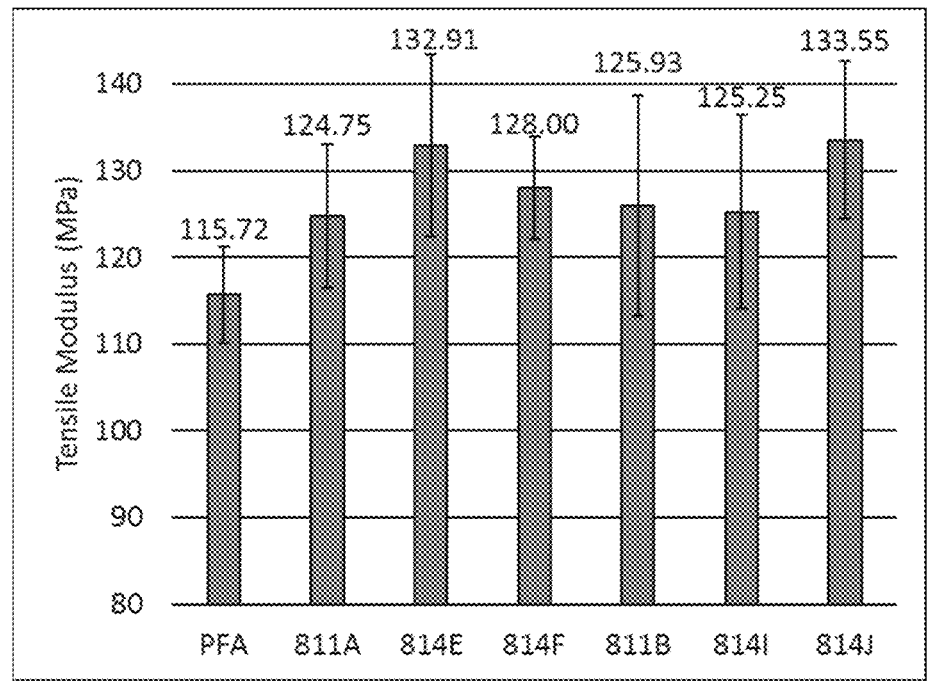
FIG. 26A shows a graph showing the tensile modulus of select polymer samples.
Figure 26B:
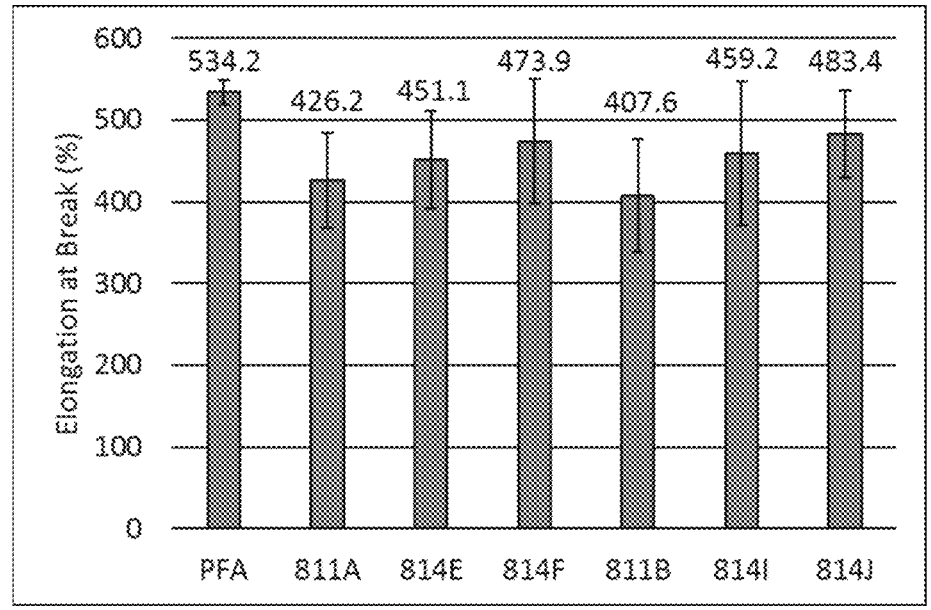
FIG. 26B shows a graph showing the elongation of select polymer samples.

FIG. 26A shows the tensile modulus of selected samples in Example 5 and PFA. FIG. 26B shows the elongation at break of selected samples in Example 5 and PFA. Error bars in both FIGS. 26A and 26B are one standard deviation. These measurements were made using tensile testing on samples that had been injection molded. Data was collected from tensile tests performed based on ASTM D638. All samples with organic peroxide are within one standard deviation of the other samples that contain the same concentration of bisoxazoline.

Figure 27A:
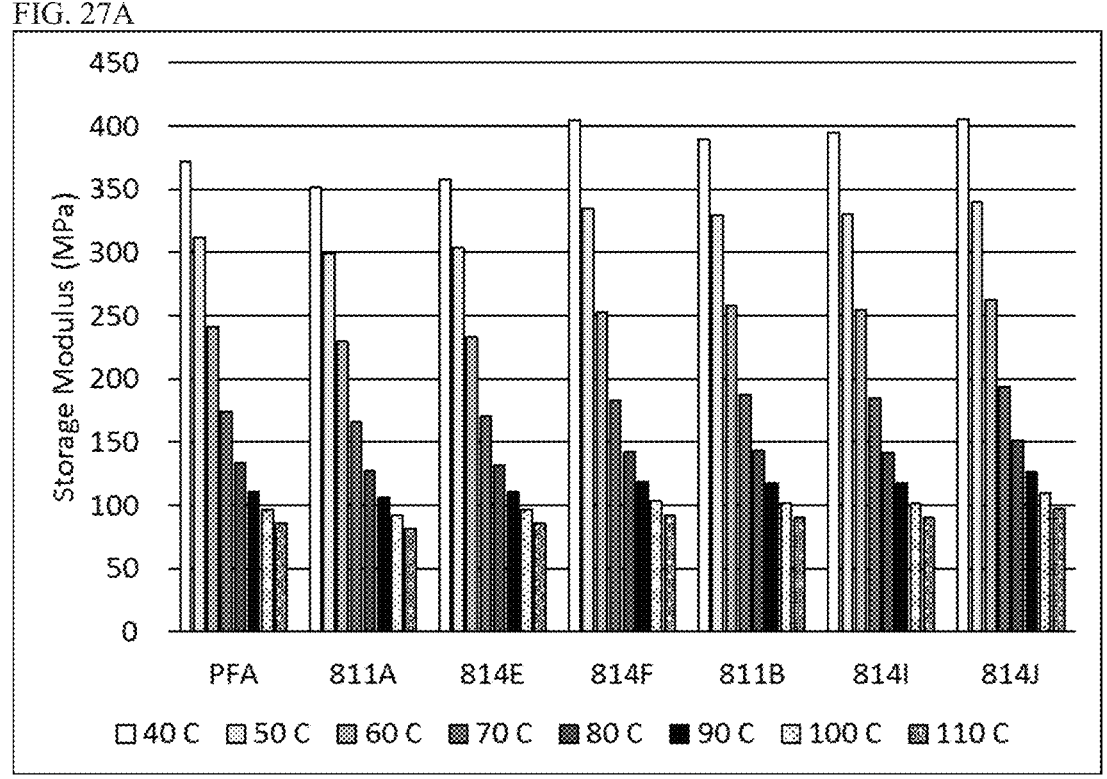
FIG. 27A shows a graph showing the storage modulus of select polymer samples.
Figure 27B:
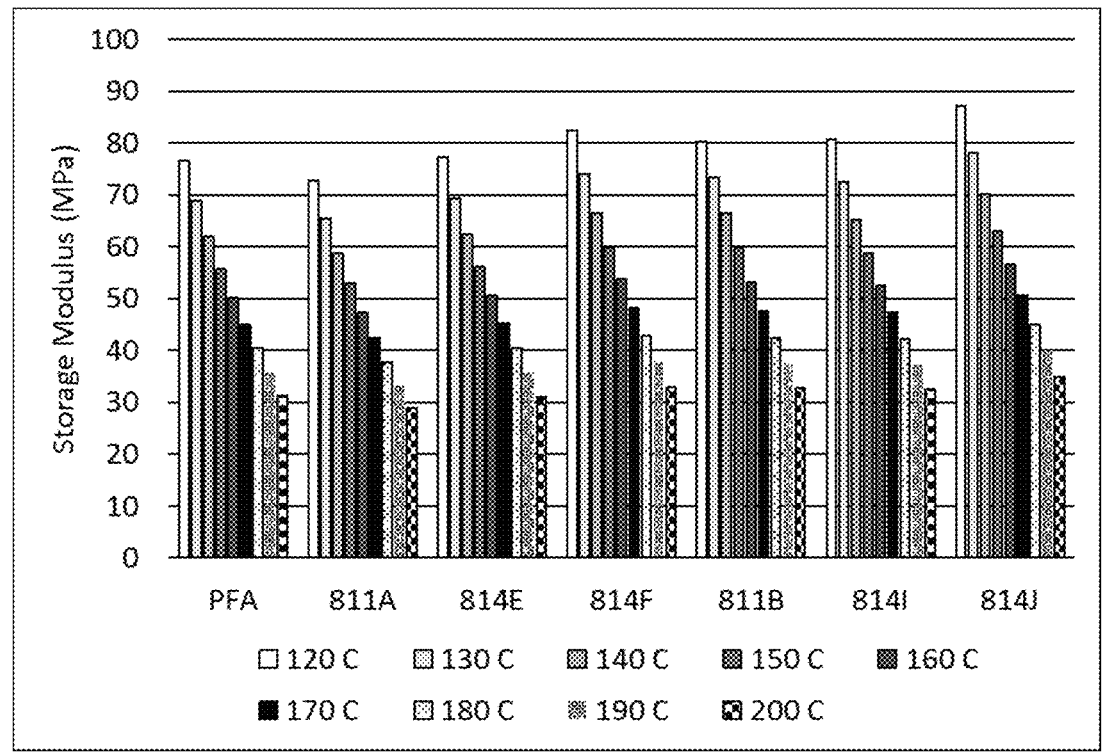
FIG. 27B shows a graph showing the storage modulus of select polymer samples.

FIG. 27A shows the storage modulus of selected samples in Example 5 at temperatures between 40° and 110° C. FIG. 27B shows the storage modulus of selected samples in Example 5 at temperatures between 120° and 200° C. Measurements were taken on a section of injection molded parts using a DMA. Only small (<10%) increases are observed with increasing organic peroxide concentration.

Figure 28:
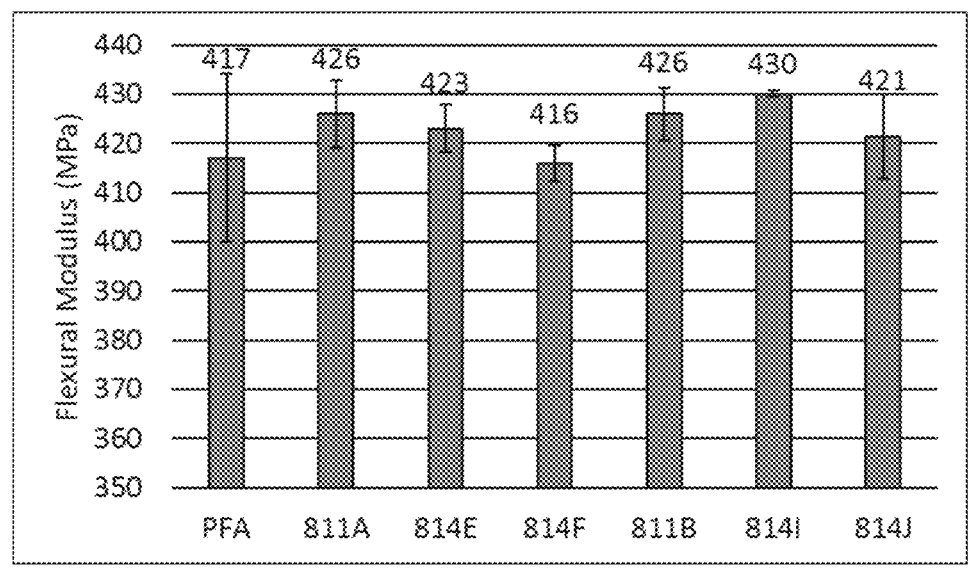
FIG. 28 shows a graph showing the flexural modulus of select polymer samples.

FIG. 28 shows the flexural modulus of selected samples in Example 5 and PFA. These measurements were made using 3-point bend testing on samples that had been injection molded. Error bars represent one standard deviation. All of the tested samples have a flexural modulus within one standard deviation of PFA.

Figure 29:
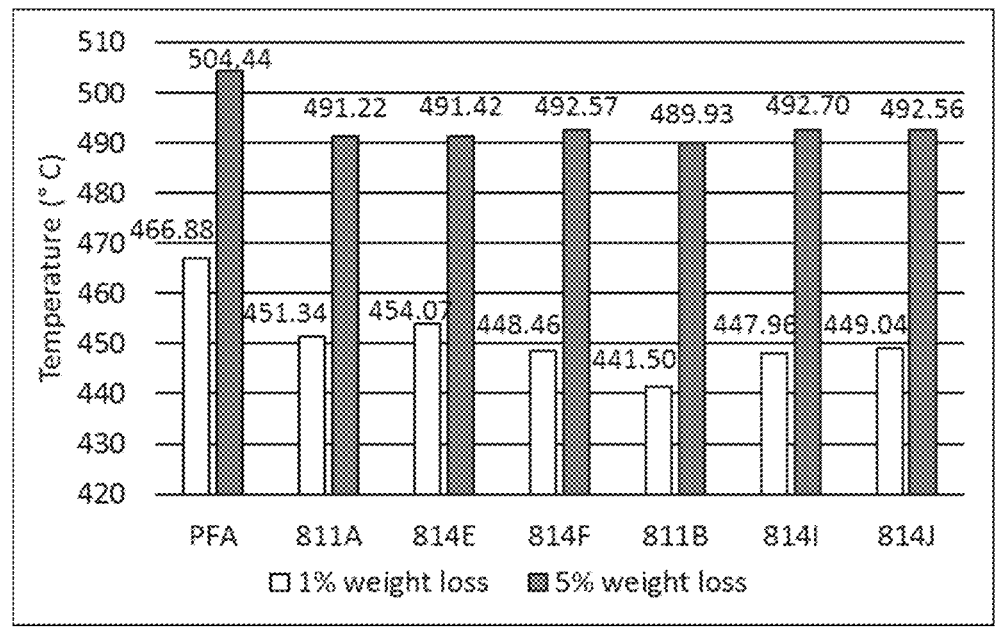
FIG. 29 shows a graph showing the weight loss temperatures of selected polymer samples.

FIG. 29 shows the temperatures (° C.) at which 1% and 5% of the initial weights of selected samples in Example 5 and PFA are lost in TGA experiments. Data was collected using pellets (not injection molded). Samples with higher organic peroxide concentrations have comparable 1% and 5% weight loss temperatures to other samples with lower or no peroxide.

It appears from the data shown in FIGS. 26-29 that the amount of organic peroxide (0, 0.1, or 0.5 wt %) does not meaningfully impact the mechanical and thermal properties; any increase is beneficial properties is of a small magnitude (<10%). However, these samples have lower amounts of bisoxazoline than some embodiments in in Example 3. As discussed in Example 3, samples with higher amounts of bisoxazoline compatibilizer exhibit melting peaks in DSC at approximately 360° C. If organic peroxide was necessary for the incorporation of the bisoxazoline compatibilizer into the polymer matrix, samples with organic peroxide and high amounts of the bisoxazoline should display a smaller or no peak in DSC at 360° C. As can be seen in FIG. 30, the bisoxazoline melting peak is still present in samples that contain 2% bisoxazoline and organic peroxide.

Figure 30A:
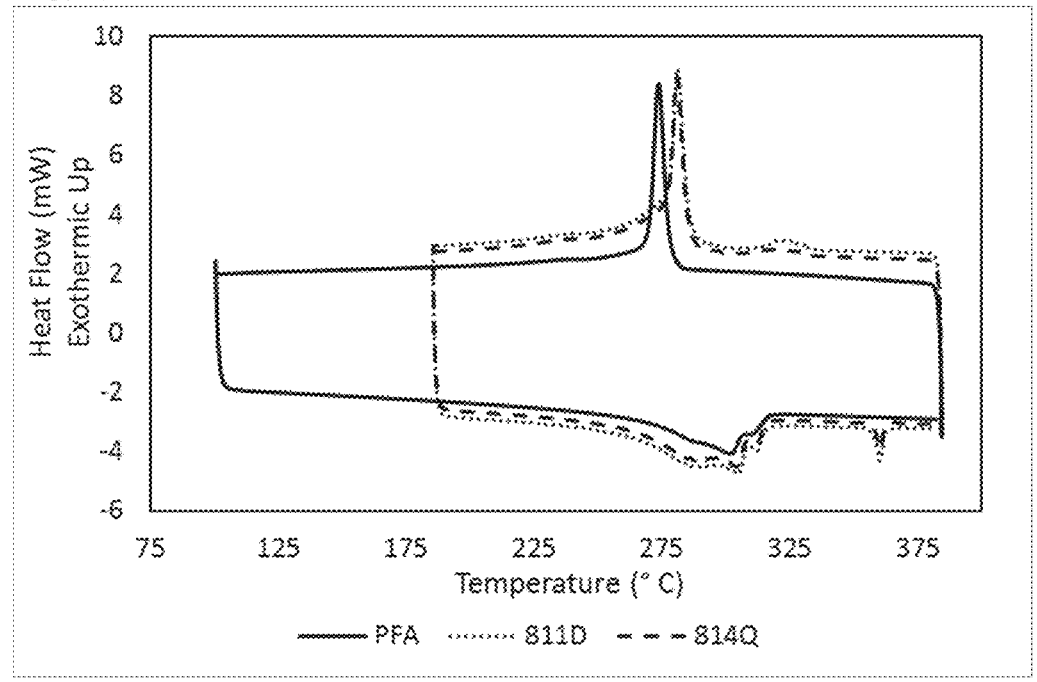
FIG. 30A shows a graph showing the thermal response of selected polymer samples.
Figure 30B:
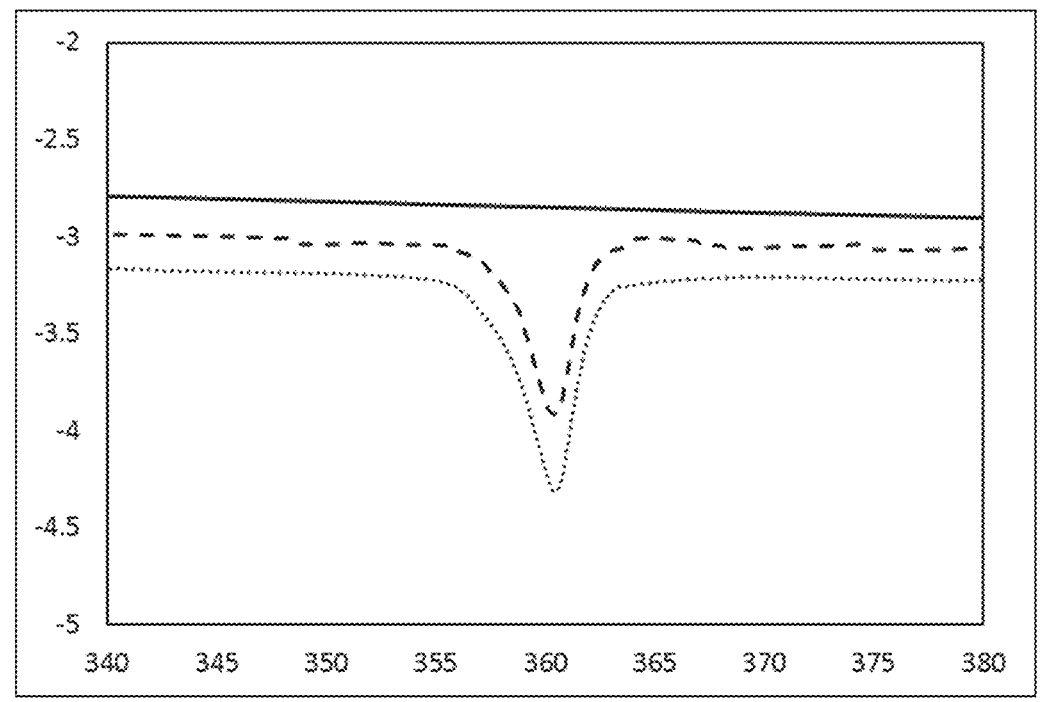
FIG. 30B shows a specific section of the graph showing the thermal response of selected polymer samples shown in FIG. 30A.

FIG. 30A shows DSC curves of selected samples in Example 5 and PFA. Data was collected using pellets (not injection molded). All samples show a melting peak at approximately 305° C., which is the melting point of PFA. Some samples show a smaller additional melting peak at approximately 360° C. This corresponds to the melting of the bisoxazoline used in these samples. FIG. 30B shows this temperature range in more detail.

Figure 31:
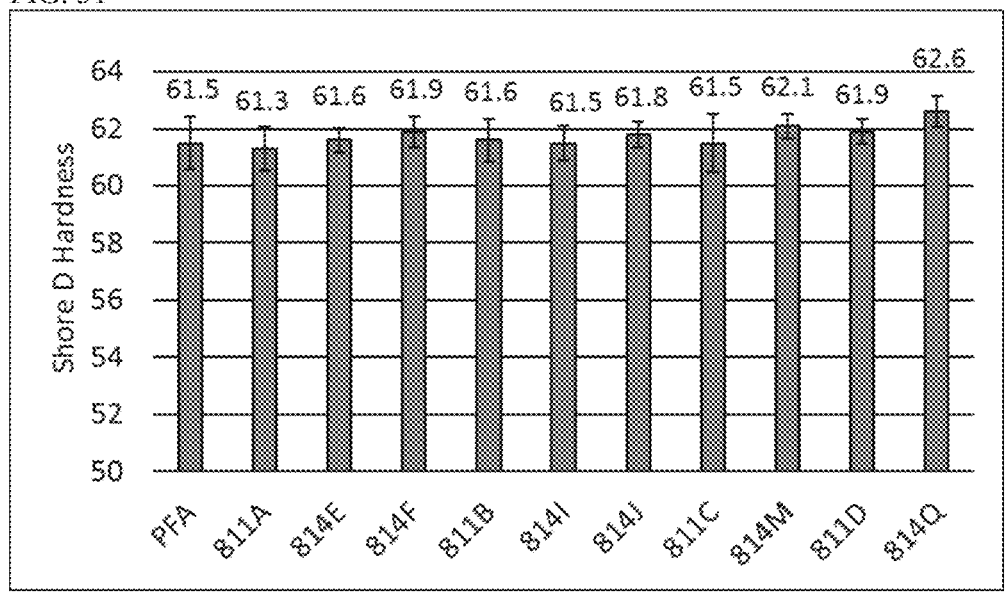
FIG. 31 shows a graph showing the shore D hardness of selected polymer samples.

FIG. 31 shows the Shore D Hardness of samples in Example 5. Hardness is tunable with bisoxazoline and peroxide concentration.

The change in enthalpy of fusion of the bisoxazoline is 1.402 J/g for 811D, compared to 1.145 J/g for 814Q. This, taken with the tunability of hardness shown in FIG. 31, indicates that the presence and amount of bisoxazoline is a driving factor behind mechanical and thermal properties of this system. Therefore, in some embodiments, organic peroxide is not required.

Example 6: The Use of Various Cross-Linking Agents

To improve the tensile strength of some PFA materials, a high-temperature, multi-functional cross-linker was employed. A tetravinyl-terminated polyimide was used in lieu of the vinyl POSS utilized in some other examples. The compositions of samples in this example are given in Table 21; extrusion conditions are given in Table 22 and injection molding temperatures given in Table 23.

TABLE 21

Initial Compositions of Samples in Example 6.

| Sample Name | PFA (%) | 4,4'-Bis(2-benzoxazolyl) stilbene (%) | PI-tetravinyl (%) |
|---|---|---|---|
| AW2008842A | 97.9 | 2.0 | 0.1 |
| AW2008842B | 97.0 | 2.0 | 1.0 |
| AW2008842C | 94.0 | 2.0 | 4.0 |

TABLE 22

Temperature Profiles used in the Twin Screw Extruder in Example 6

| Zone | 1 | 2 | 3 | 4 | 5 | 6 | 7 | 8 |
|---|---|---|---|---|---|---|---|---|
| Temperature (° C.) | 315 | 315 | 320 | 325 | 330 | 335 | 340 | 350 |

TABLE 23

Temperature of Injection Molding Machine used in Example 6

| Zone | 1 | 2 | 3 | 4 | 5 | Water |
|---|---|---|---|---|---|---|
| Temperature (° F.) | 610 | 671 | 680 | 698 | 707 | 110 |

Select mechanical and thermal data for samples from this example are given in FIGS. 32-35.

Figure 32A:
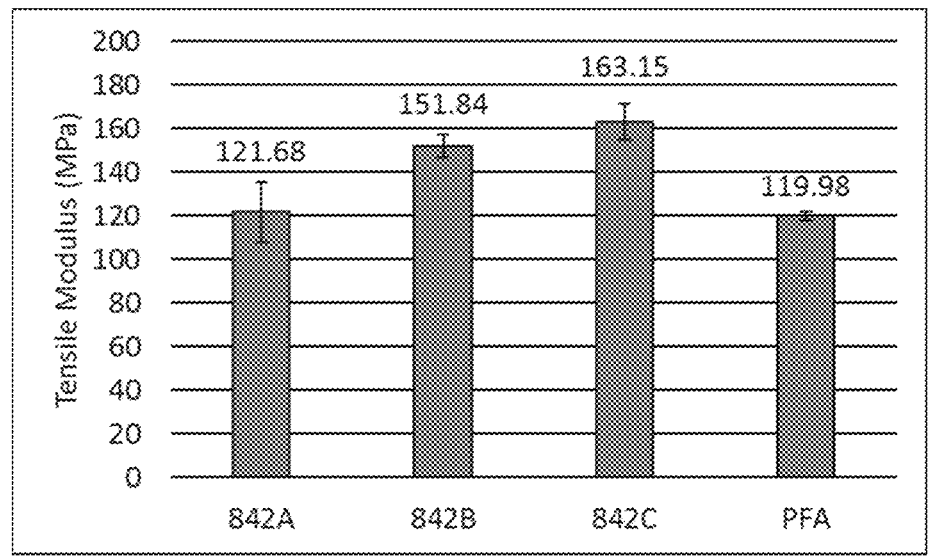
FIG. 32A shows a graph showing the tensile modulus of selected polymer samples.
Figure 32B:
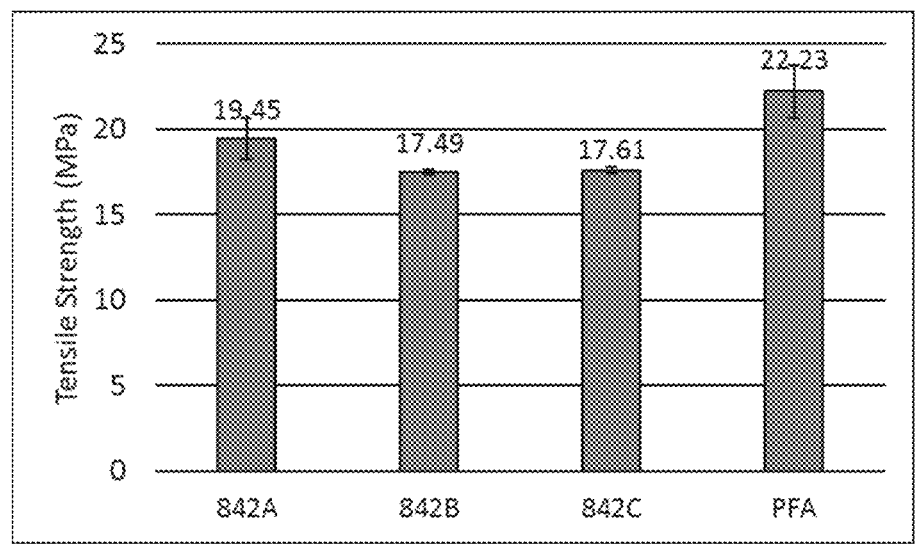
FIG. 32B shows a graph showing the tensile strength of selected polymer samples.
Figure 33:
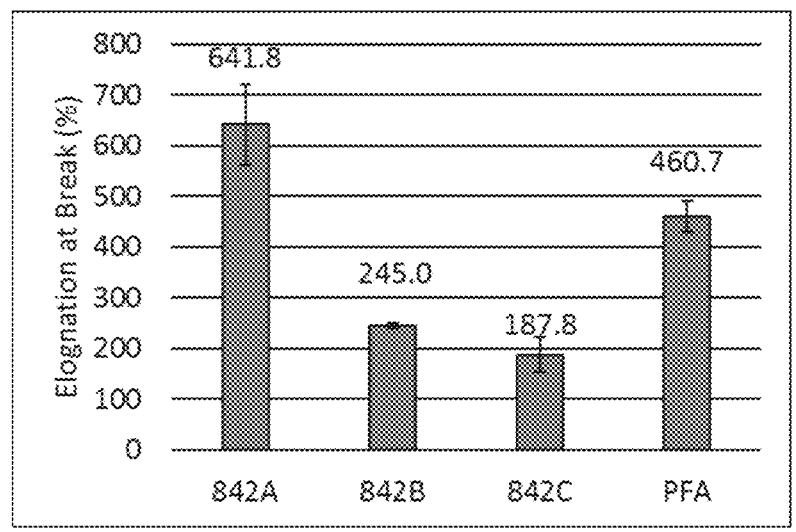
FIG. 33 shows a graph showing the elongation of selected polymer samples.

FIG. 32A shows the tensile modulus of samples in Example 6. FIG. 32B shows the tensile strength of samples in Example 6. All samples have similar or higher tensile modulus than PFA, while all samples have lower tensile strength than PFA. This data was collected on samples that had been injection molded. Error bars represent one standard deviation FIG. 33 shows the elongation at break of samples studied in Example 6. Higher concentrations of PI-tetravinyl resulted in lower elongation at break. This data was collected on the same samples as in FIG. 32. Error bars represent one standard deviation.

Figure 34:
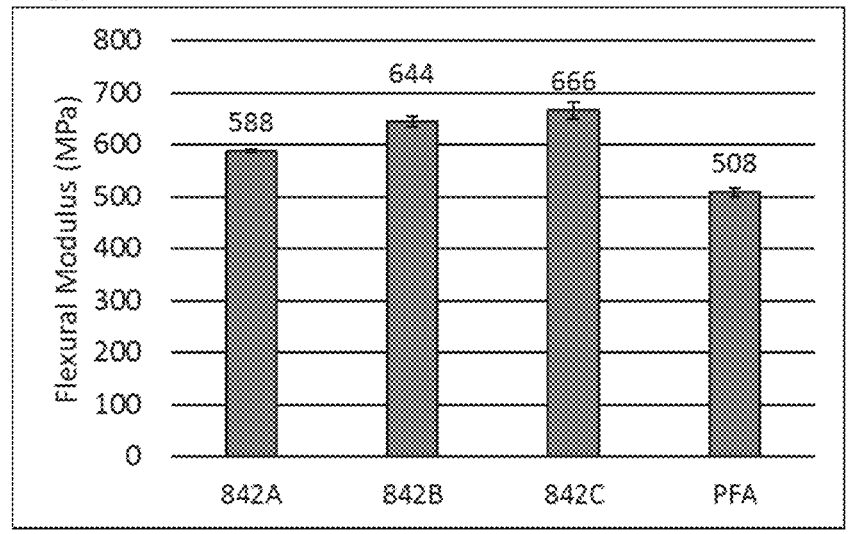
FIG. 34 shows a graph showing the flexural modulus of selected polymer samples.
Figure 35A:
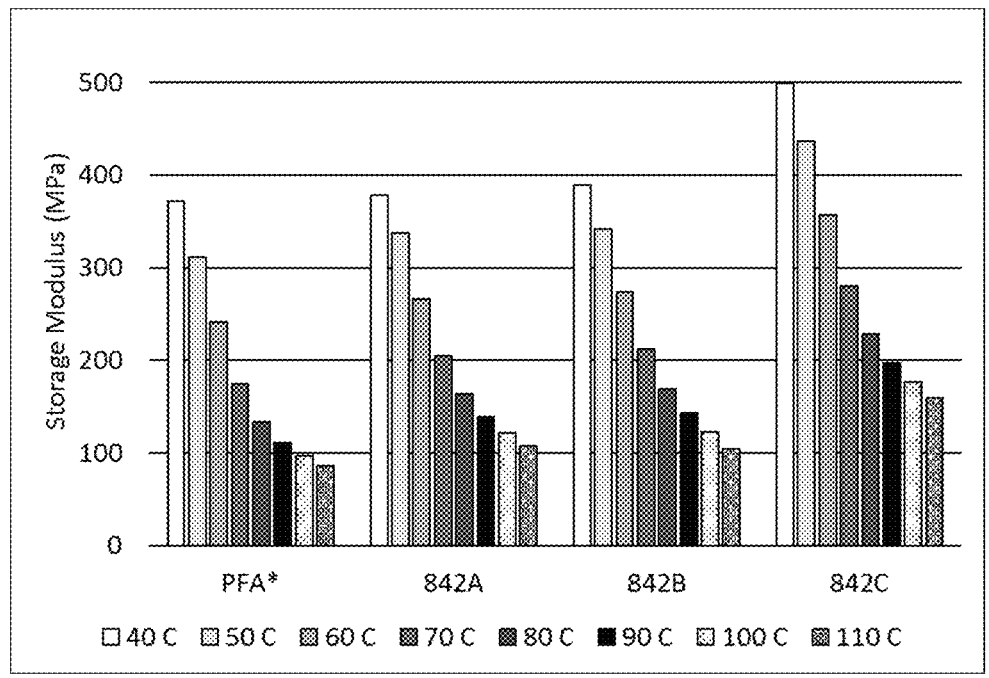
FIG. 35A shows a graph showing the storage modulus of select polymer samples.
Figure 35B:
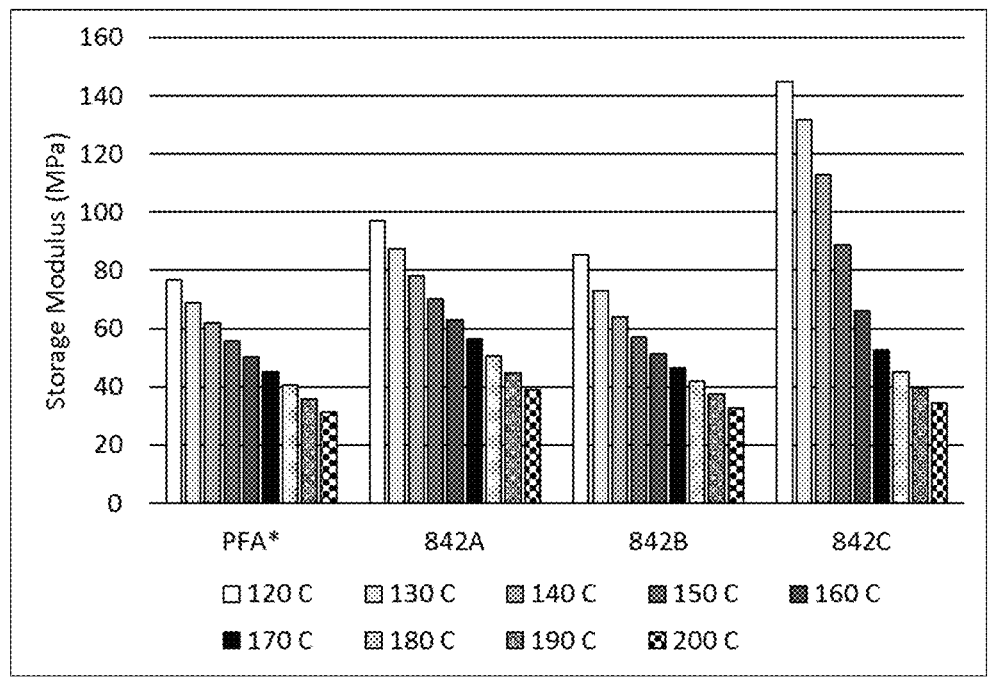
FIG. 35B shows a graph showing the storage modulus of select polymer samples

FIG. 34 shows the flexural modulus of samples studied in Example 6. Higher concentration of PI-tetravinyl results in higher flexural modulus. This data was collected on samples that had been injection molded. Error bars represent one standard deviation FIG. 35A shows the storage modulus of samples studied in Example 5 at temperatures between 40° and 110° C. FIG. 35B shows the storage modulus of samples studied in Example 5 at temperatures between 120° and 200° C. All samples have a higher storage modulus than PFA at the temperatures shown.

Figure 36A:
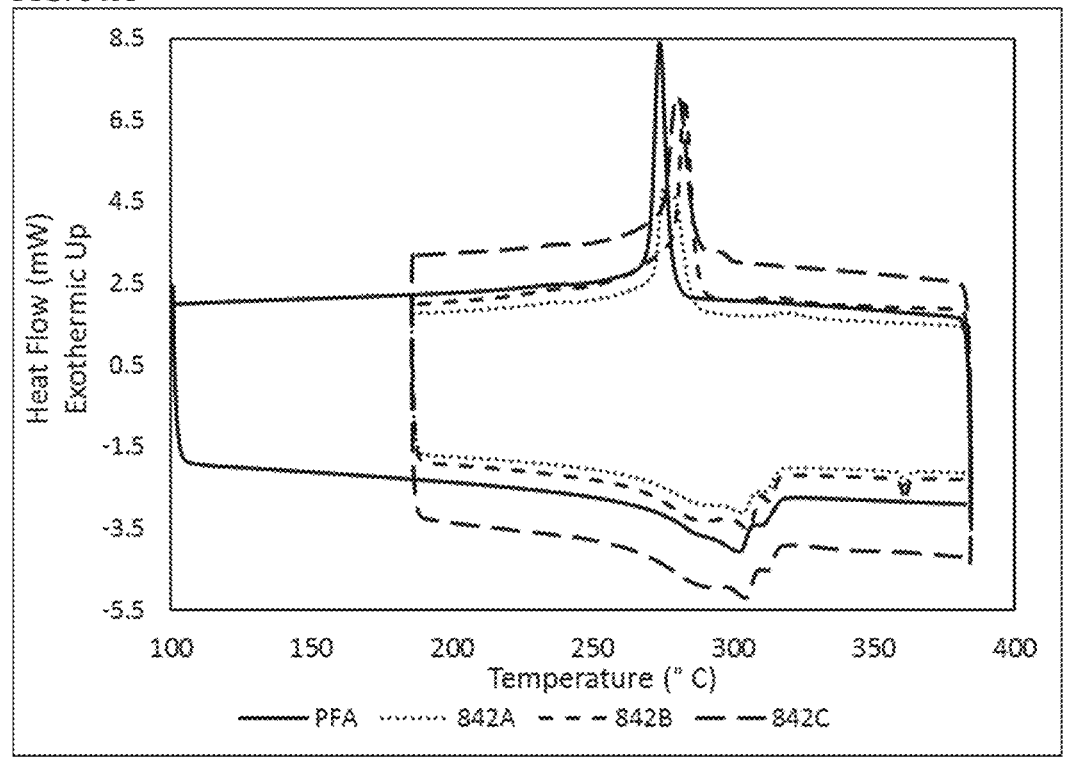
FIG. 36A shows a graph showing the thermal response of selected polymer samples.
Figure 36B:
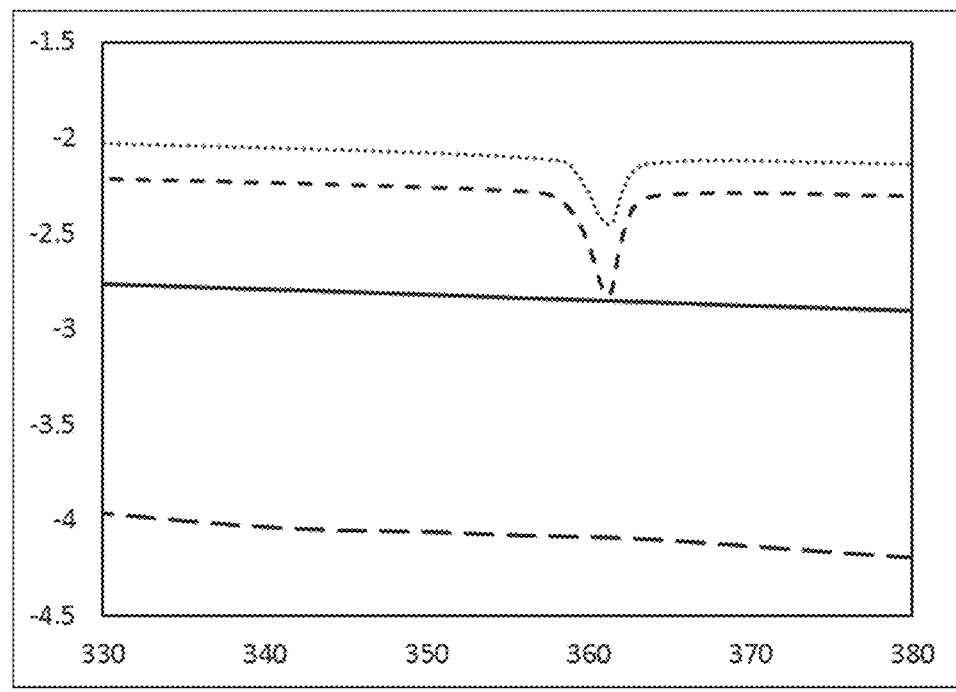
FIG. 36B shows a specific section of the graph showing the thermal response of selected polymer samples shown in FIG. 36A.

FIG. 36A shows DSC curves of the samples in Example 6. Data was collected using pellets (not injection molded parts). All samples show a melting peak at approximately 305 C, which is the melting point of PFA. Samples 842A and B show an additional melting peak at approximately 360° C., which corresponds to the melting of the bisoxazoline. This peak is not clearly present in the curve for 842 C. FIG. 36B shows this area in more detail.

From FIGS. 32-35, it can be seen that increasing the amount of PI-tetravinyl increases the tensile modulus and storage modulus, while the elongation at break decreases. Of interest is that the bisoxazoline peak that is observed in FIG. 25 (Example 3) is decreased and eventually not apparent for higher concentrations of PI-tetravinyl. This suggests that perhaps the increased tensile strength is due to reactions that occur between the bisoxazoline and PI-tetravinyl. Higher amounts of PI-tetravinyl are able to react more fully with the bisoxazoline.

While this mechanical testing takes place at room temperature, it is of interest how materials will perform when exposed to a wide range of temperatures. To this end, selected samples were placed in an oven at 250° C. for 7 days to simulate the ageing of materials at high temperatures. This temperature was chosen as it is just below the continuous use temperature of PFA (260° C.). Tensile tests were performed on these samples after the ageing was completed and the samples fully cooled back to room temperature. The results of these tests are shown in FIGS. 37 and 38.

Figure 37A:
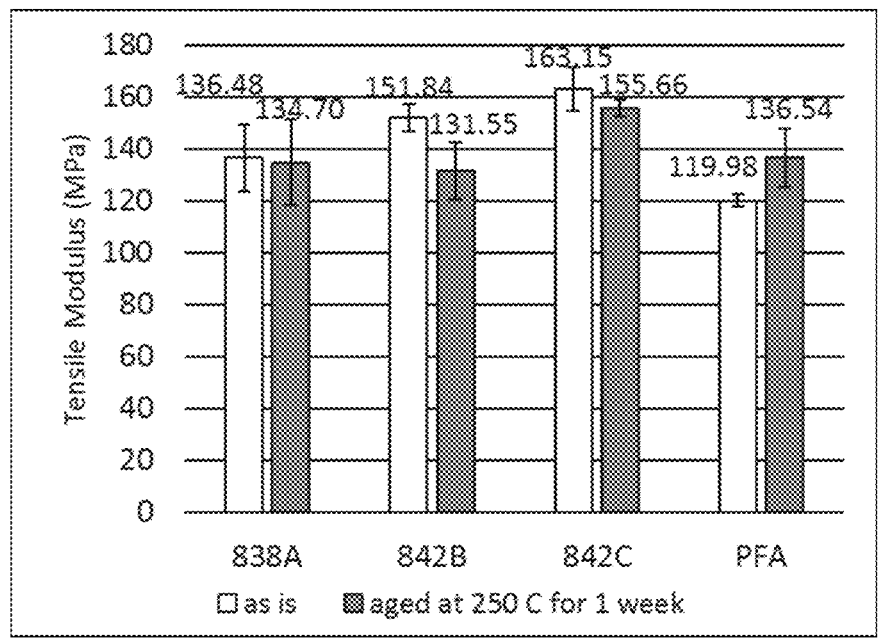
FIG. 37A shows a graph showing the tensile modulus of selected polymer samples.
Figure 37B:
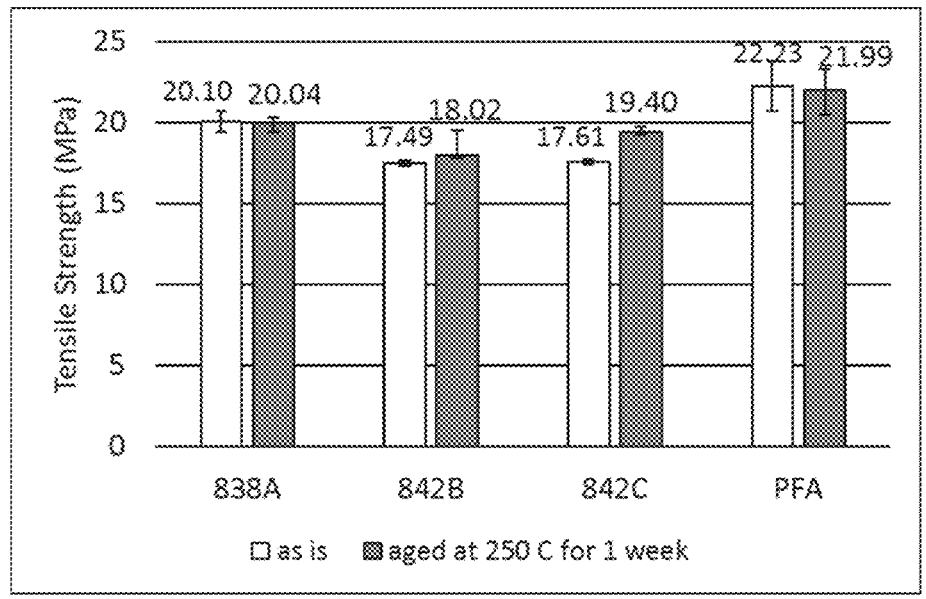
FIG. 37B shows a graph showing the tensile strength of selected polymer samples.

FIG. 37A shows a comparison of tensile modulus for selected samples compared to their aged counterparts. FIG. 37B shows a comparison of tensile strength for selected samples compared to their aged counterparts. In general, little change is observed between aged and un-aged samples. Tensile modulus and tensile strength data on select un-aged samples can also be found in FIGS. 32A and 32B. All data was collected on injection molded samples.

Figure 38:
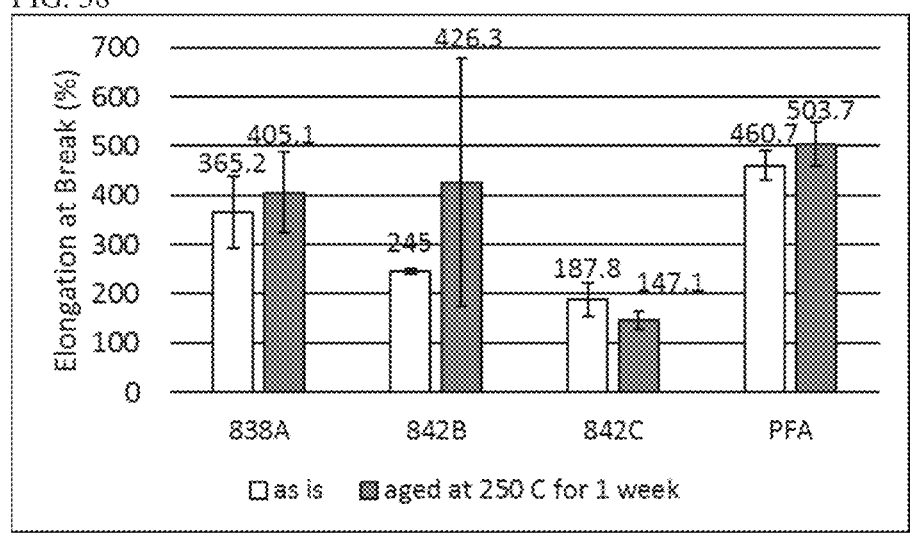
FIG. 38 shows a graph showing the elongation of selected polymer samples.

FIG. 38 shows Elongation at Break for selected samples compared to their aged counterparts. In general, any changes are within one standard deviation of the original values. Data from select un-aged samples can also be found in FIG. 33. All data was collected on injection molded samples.

In FIGS. 37 and 38, little change can be observed between each sample and its aged counterpart. There is no trend that can be observed. Overall, values for aged samples are similar to their original, un-aged, values, which holds true for PFA and the modified versions studied here. Based on this data, it is believed that these samples may resist thermal ageing in a similar manner to PFA.

Example 7: The Necessity of Cross-Linkers in Addition to Compatabilizers

The effect of compatibilizer alone was studied by creating samples with PFA and compatabilizer only; no cross-linker was used in these samples. The compositions of these samples are given in Table 24. The extrusion and injection molding conditions of these samples is the same as in Tables 22 and 23, respectively.

TABLE 24

| Initial Compositions of Samples In Example 6 | | |
|---|---|---|
| Sample | PFA (%) | 4,4'-Bis(2-benzoxazolyl) stilbene (%) |
| AW2008842D | 99.9 | 0.1 |
| AW2008842F | 98.0 | 2.0 |

The results of various mechanical and thermal tests performed on these samples are shown in FIGS. 39-43.

Figure 39A:
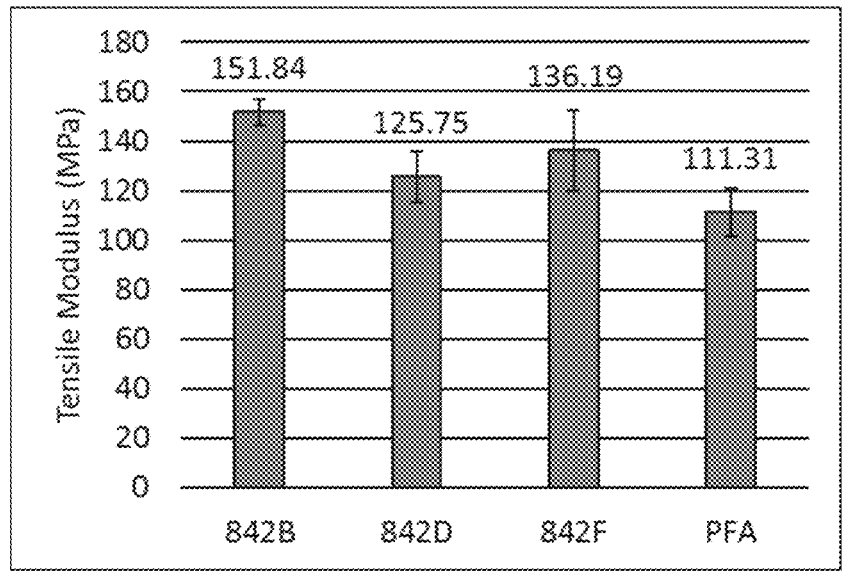
FIG. 39A shows a graph showing the tensile modulus of selected polymer samples.
Figure 39B:
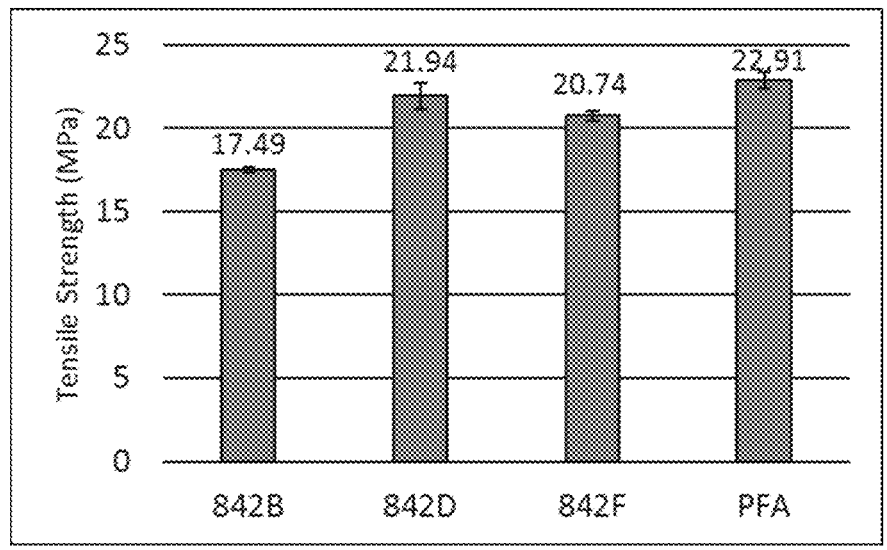
FIG. 39B shows a graph showing the tensile strength of selected polymer samples.

FIG. 39A shows the tensile modulus of the samples in Example 7. FIG. 39B shows the maximum tensile stress of the samples in Example 7, More bisoxazoline resulted in higher tensile modulus, while tensile strength remains largely unchanged. A much larger change is observed for samples with PI-tetravinyl (842B). This data was collected on injection molded samples. Error bars represent one standard deviation.

Figure 40:
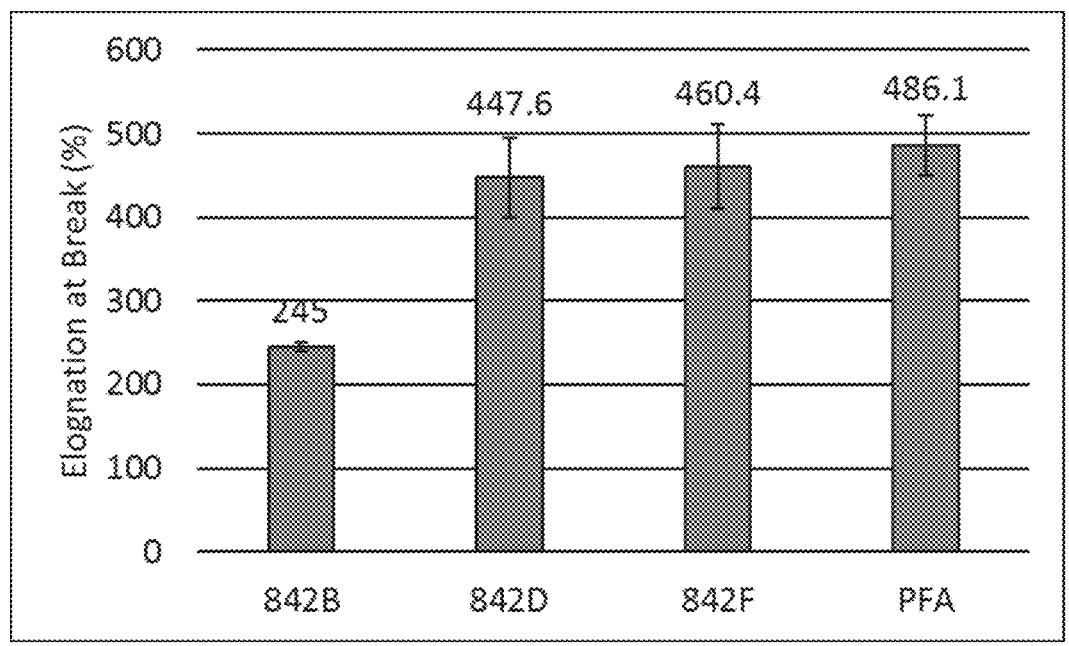
FIG. 40 shows a graph showing the elongation of selected polymer samples.

FIG. 40 shows elongation at break of samples in Example 7. According to this data, incorporation of the bisoxazoline does not alter elongation. A larger change is observed for samples with PI-tetravinyl (842B). Error bars represent one standard deviation. This data was collected on injection molded samples.

Figure 41:
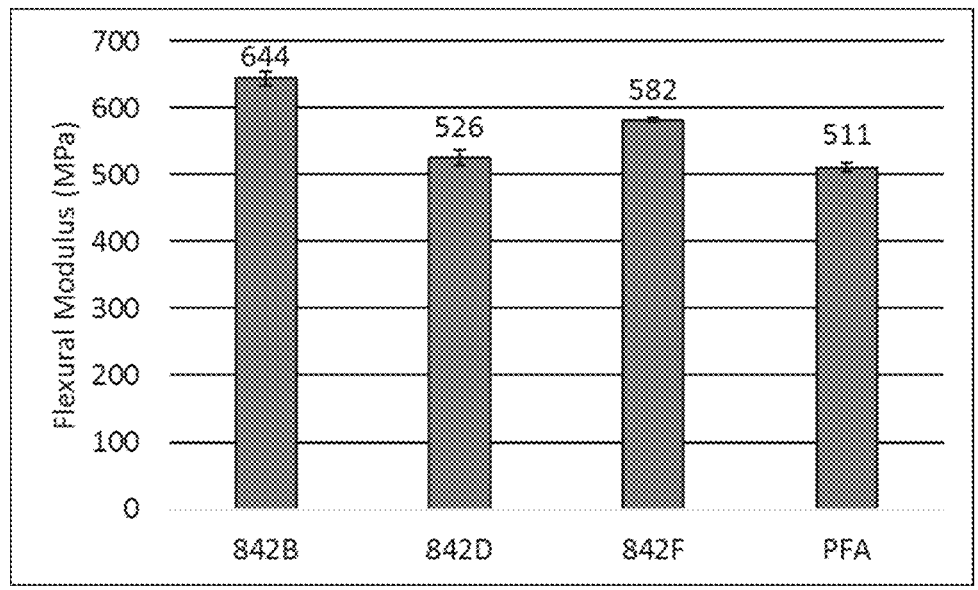
FIG. 41 shows a graph showing the flexural modulus of selected polymer samples.

FIG. 41 shows the flexural modulus of injection molded samples in Example 7. An addition of 1 wt % of PI-tetravinyl increases the flexural moulus compared to the same composition without PI-tetravinyl. Error bars represent one standard deviation.

Figure 42A:
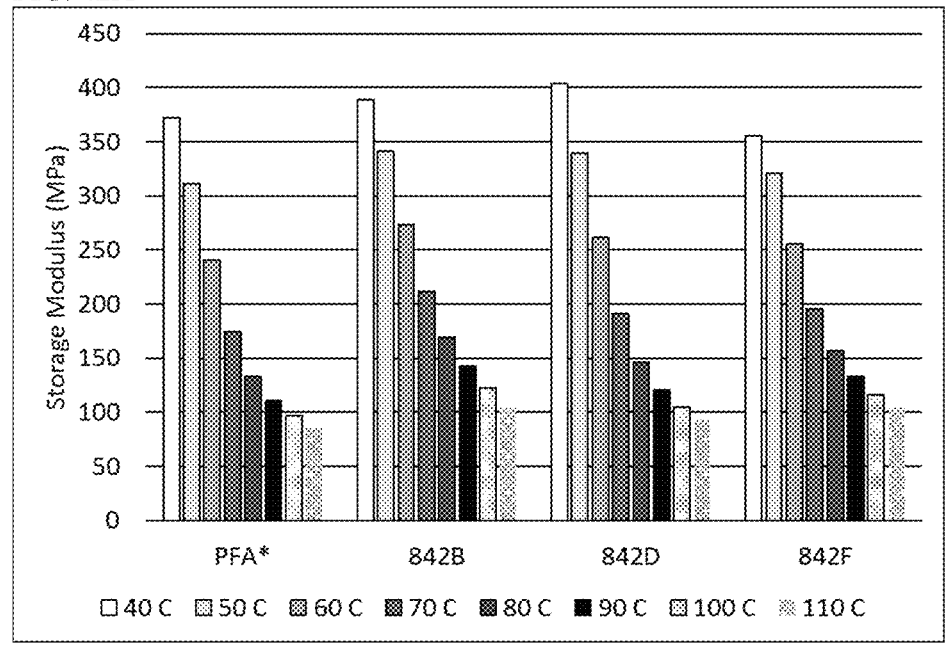
FIG. 42A shows a graph showing the storage modulus of select polymer samples.
Figure 42B:
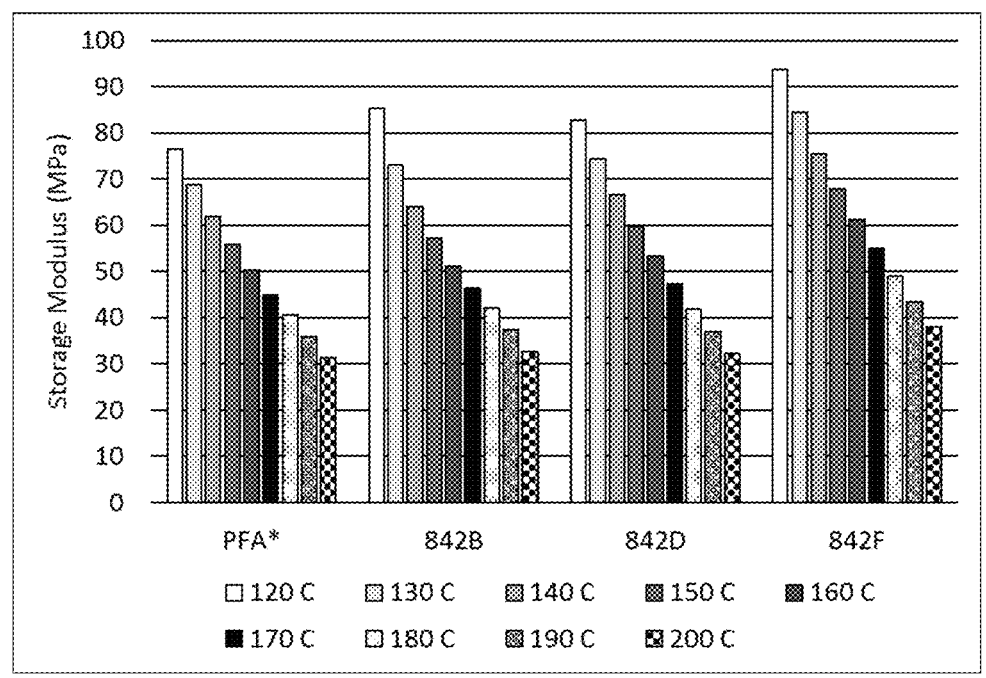
FIG. 42B shows a graph showing the storage modulus of select polymer samples.

FIG. 42A shows the storage modulus at temperatures between 40° and 110° C. for samples in Example 7. FIG. 42B shows the storage modulus at temperatures between 120° and 200° C. for samples in Example 7. At lower temperatures, the addition of cross-linker (e.g. 842B) increases the storage modulus more than bisoxazoline alone. However, at and above 150° C., the samples without cross-linker show higher storage modulus than those with cross-linker. This PFA was injection molded under similar conditions as the samples studied here.

Figure 43:
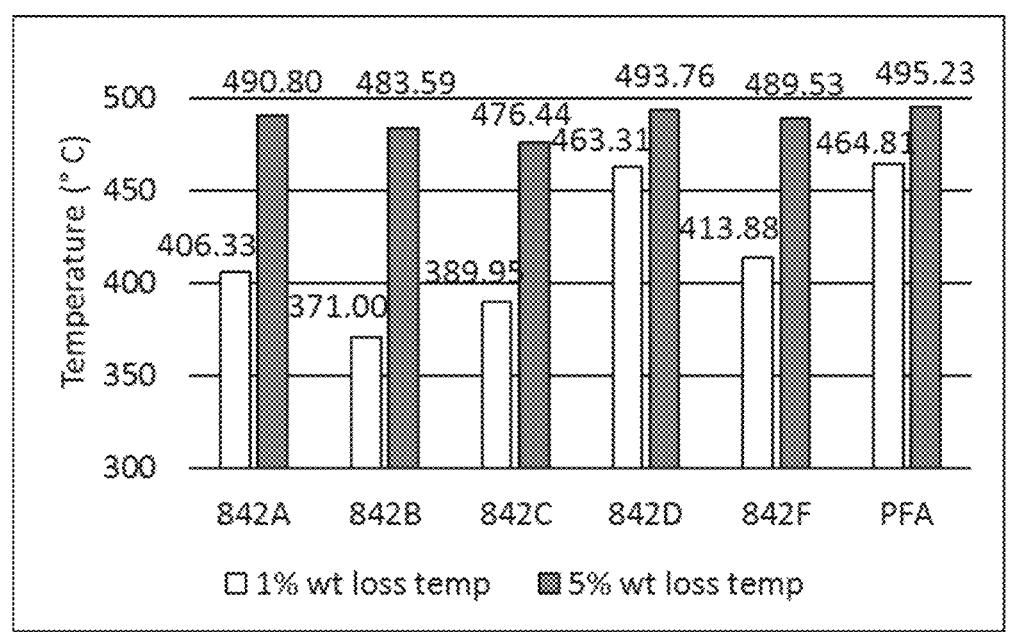
FIG. 43 shows a graph showing the weight loss temperatures of selected polymer samples.

FIG. 43 shows the 1% and 5% weight loss temperatures for samples in Examples 6 and 7. This data was collected on pellets (not injection molded parts). Adding cross-linker appears to cause a decrease in 1% weight loss temperature. 842D has nearly equal weight loss temperatures as PFA.

As can be seen in FIGS. 39-41, 1% cross-linker improves the mechanical properties of samples over those that only contain compatibilizer. In FIGS. 40 and 41, it appears that the cross-linker lowers somewhat the thermal stability of these materials. However, this may be due to the lower total amount of PFA in these samples. The cross-linker is effective at room temperature, and indeed, up to 100° C., as seen in FIG. 42. Therefore, the interaction of cross-linker and compatabilizer imparts improved mechanical properties at temperatures up to 100° C.

Example 8: The Use of High-Temperature Additives and Further Cross-Linkers

As seen in FIGS. 32, 37, and 39 many of the samples in previous examples show lower tensile strength, despite increased tensile modulus and decreased elongation. While increased tensile modulus is a beneficial property, increased tensile modulus coupled with increased tensile strength poses additional benefits. Therefore, in an effort to increase tensile strength of materials, additional cross-linkers and other high-temperature additives were investigated.

Of particular interest was PFA-PEI block copolymer. As described above, this material combines PFA Grade 2 with a reactive PEI. In some cases, characteristics such as melting point of this material are reported for comparison purposes. The compositions of Example 8 were chosen such that all samples have the same ratio of PFA:PFA-PEI. In some cases, characteristics such as melting point of these compositions are reported for comparison purposes. Other high-temperature additives include maleimide-terminated polyimide (PI-maleimide), vinyl-functionalized silica (vinyl-$SiO_2$), amine-functionalized silica ($NH_2$—$SiO_2$), and a PEI homopolymer (specifically EXTEM XH 1015).

The temperature profiles used in extrusion of these samples is shown in Table 25. The temperature profile of the extruder was chosen based on the melting or softening temperature of the highest temperature component. For some samples, the highest temperature component was the PEI portion of the PFA-PEI. For samples with PEI homopolymer, the EXTEM XH1015 was the highest temperature material. The compositions of samples in this example are shown in Table 26. Injection molding conditions are the same as in Table 23.

TABLE 25

Extrusion Profiles for Samples in Example 8.

| Zone | 1 | 2 | 3 | 4 | 5 | 6 | 7 | 8 |
|---|---|---|---|---|---|---|---|---|
| Profile 3 (° C.) | 330 | 360 | 350 | 340 | 350 | 350 | 360 | 365 |
| Profile 4 (° C.) | 375 | 385 | 380 | 385 | 380 | 385 | 385 | 385 |

TABLE 26

Initial Composition of Samples in Example 8.

| Sample | Extrusion Profile | PFA (%) | PFA-PEI (%) | Bi-soxazoline (%) | PI-tetra-vinyl (%) | PI-Maleimide (%) | PEI (%) | $NH_2$—$SiO_2$ (%) | Vinyl-$SiO_2$ (%) |
|---|---|---|---|---|---|---|---|---|---|
| AW2008869D | 3 | 70.46 | 21.54 | 2.0 | 6.0 | 0.0 | 0.0 | 0.0 | 0.0 |
| AW2008869E | 3 | 71.84 | 21.96 | 2.0 | 4.0 | 0.0 | 0.0 | 0.2 | 0.0 |
| AW2008869F | 3 | 71.84 | 21.96 | 2.0 | 4.0 | 0.0 | 0.0 | 0.0 | 0.2 |
| AW2008869G | 4 | 70.46 | 21.54 | 2.0 | 4.0 | 0.0 | 2.0 | 0.0 | 0.0 |
| AW2008869H | 3 | 69.70 | 21.30 | 2.0 | 4.0 | 3.0 | 0.0 | 0.0 | 0.0 |
| AW2008869I | 4 | 68.01 | 20.79 | 2.0 | 4.0 | 3.0 | 2.0 | 0.1 | 0.1 |

Samples in this Example 8 were made using bisoxazoline from a different supplier than other examples. Therefore, two additional samples were made using previous formulations. This allows a direct comparison of the samples in this example to previous formulations, as well as provides a basis for qualifying the bisoxazoline from different suppliers. The initial compositions of these comparison/control samples are found in Table 27. These samples were extruded at the same conditions as in Table 22 and injection molded at the same conditions as in Table 23.

TABLE 27

Initial Composition of Samples for Comparison in Example 8.

| Sample | PFA (%) | Bis-oxazoline (%) | PI-tetravinyl (%) | Vinyl POSS (%) | Compare to sample |
|---|---|---|---|---|---|
| AW2008869B | 94.0 | 2.0 | 4.0 | 0.0 | AW2008842C |
| AW2008869C | 97.0 | 2.0 | 0.0 | 1.0 | AW2008838A |

Figure 44A:
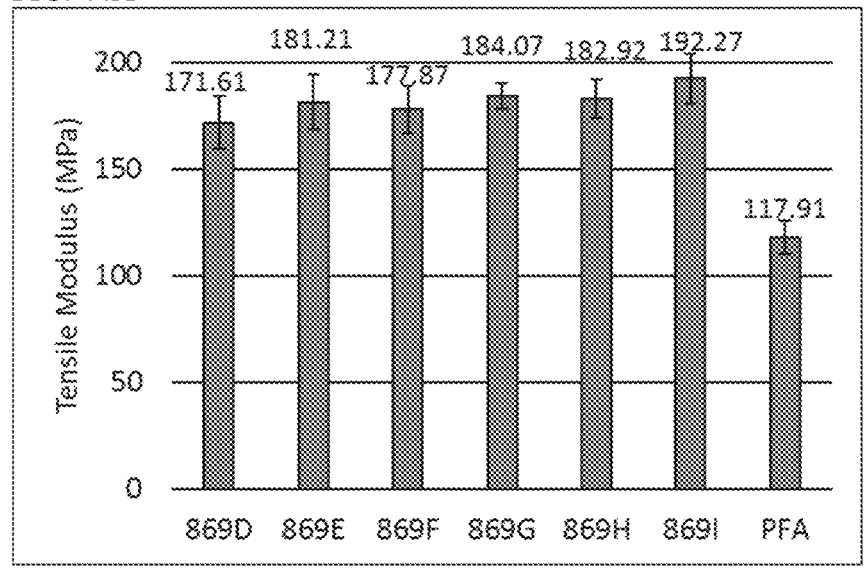
FIG. 44A shows a graph showing the tensile modulus of selected polymer samples.
Figure 44B:
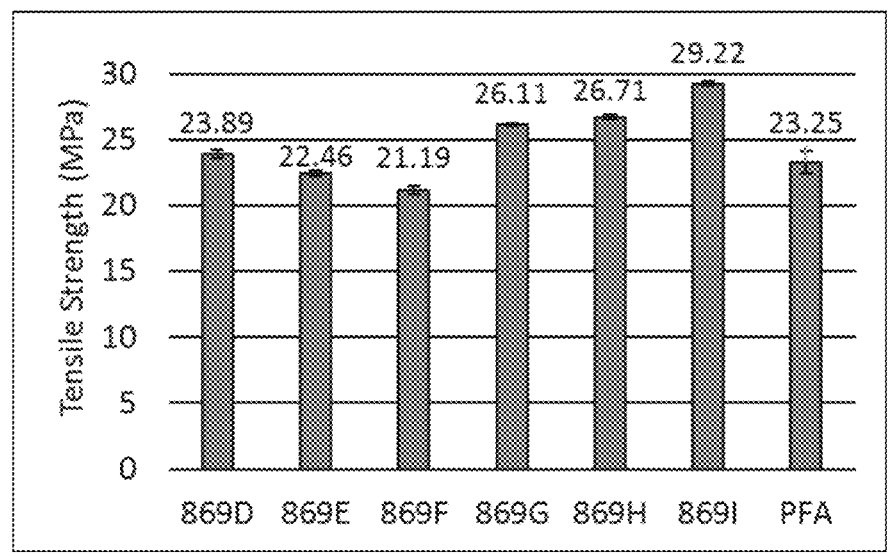
FIG. 44B shows a graph showing the tensile strength of selected polymer samples.

FIG. 44A shows the tensile modulus of injection molded samples in Example 8. FIG. 44B shows the tensile strength of injection molded samples in Example 8. All samples have an improved tensile modulus over PFA, while some samples also show an increased tensile strength over PFA. Error bars represent one standard deviation.

Figure 45:
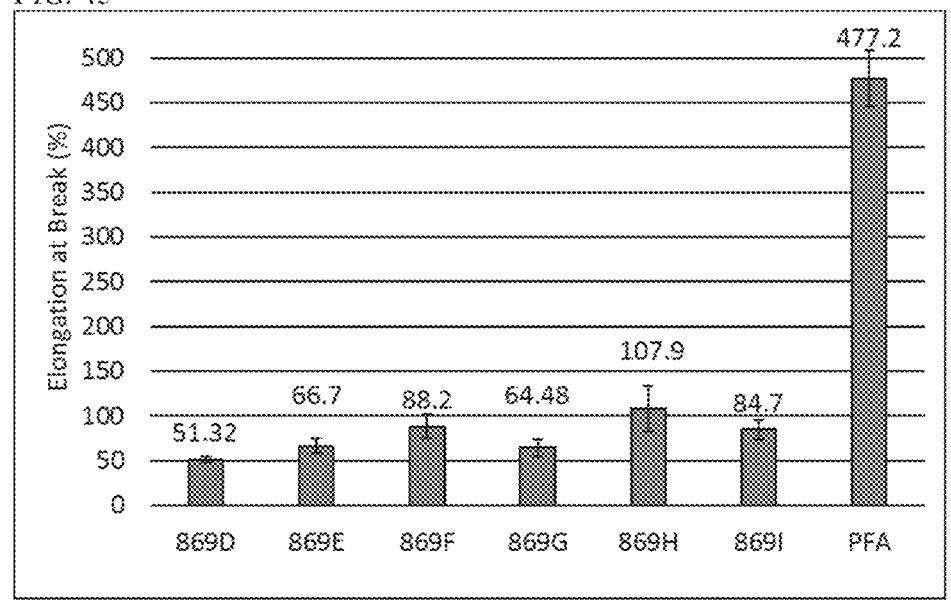
FIG. 45 shows a graph showing the elongation of selected polymer samples.

FIG. 45 shows elongation at break of samples in this example. All samples have lower elongation than PFA. Only one sample (869H) has an average elongation above 100%. Error bars represent one standard deviation. This data was collected on injection molded samples.

Figure 46:
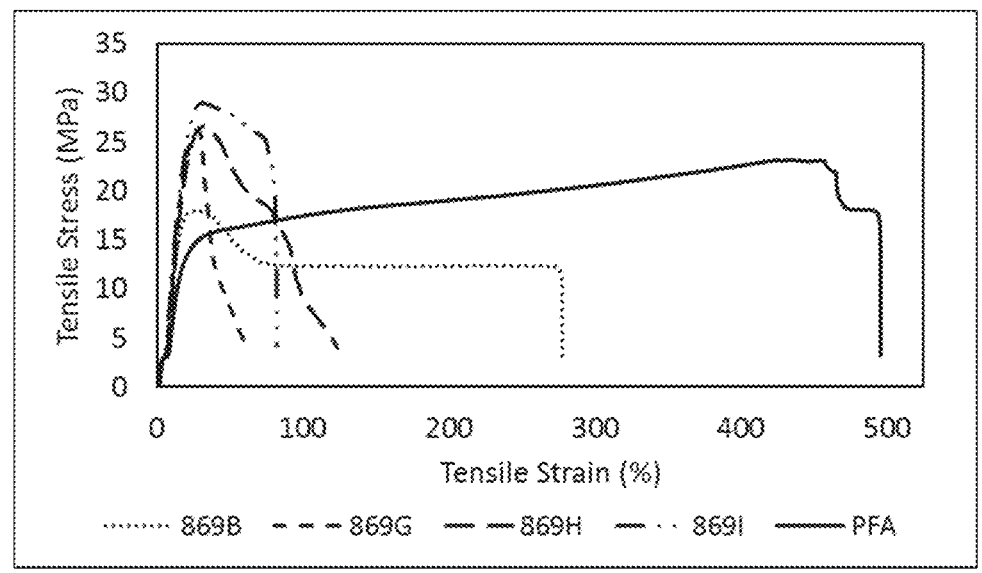
FIG. 46 shows a graph showing the tensile stress of selected polymer samples.

It is clear from FIGS. 44 and 45 that these samples display different properties than previous samples. Multiple samples exhibit a tensile strength above that of PFA. These differences can also be observed in the shape of the tensile curves; selected tensile curves are shown in FIG. 46. In addition to a higher tensile strength, many of the samples in this example show a higher yield point (the stress at which the curve is no longer linear).

FIG. 46 shows tensile stress-strain curves of selected samples. The addition of PFA-PEI changes the shape of the curve from samples without PFA-PEI and from neat PFA. For tensile measurements, 5 measurements are performed for each sample. The curve shown is a representative curve from each sample. Summary data is reported in FIGS. 44 and 45.

While 869B has a higher yield point than PFA, it still has a lower tensile strength. The addition of PFA-PEI and other additives such as those used in 869G, 869H, and 869I change the shape of the tensile curve.

Figure 47:
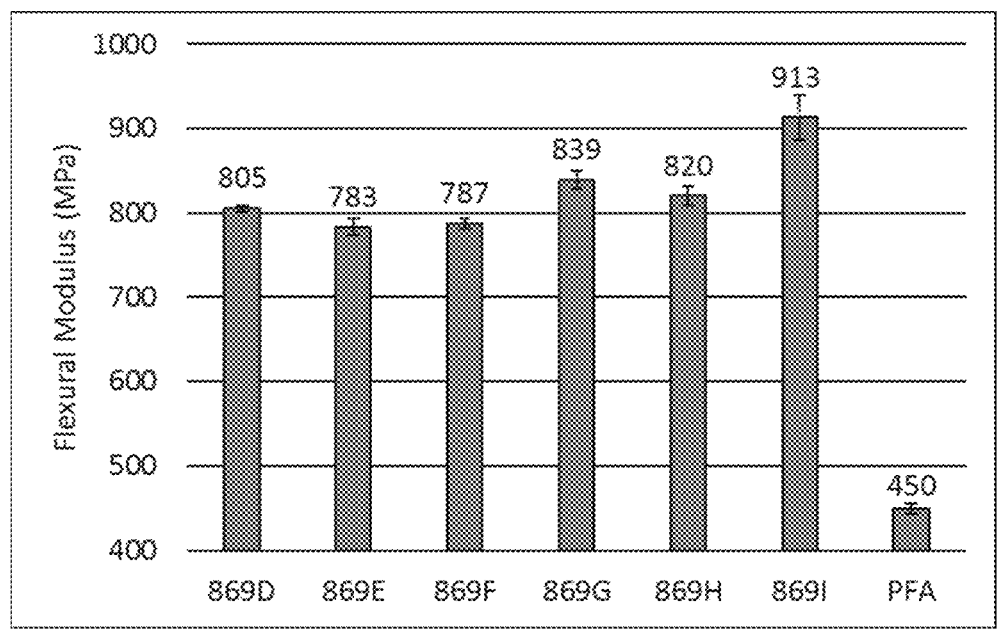
FIG. 47 shows a graph showing the flexural modulus of selected polymer samples.

As shown in FIG. 47, in addition to improved tensile properties, samples in this example show improved flexural properties as well. Sample 869I shows over two times the flexural modulus of PFA alone. This means that in addition to being able to withstand a higher amount of tensile stress, these polymers exhibit greater stiffness and resistance to deformation.

FIG. 47 shows the flexural modulus of samples in Example 8. All samples show an increase in flexural modulus over PFA. Sample 869I has over two times the flexural modulus of PFA. Error bars represent one standard deviation. This data was collected on injection molded parts.

The mechanical behavior of these polymers under dynamic stress is also of importance, especially as DMA can reveal glass transitions that may not be observed during DSC. The results from DMA are shown in FIGS. 48 and 49 for this example.

The results from dynamic mechanical analysis are very different from those in previous examples. While a glass transition is still observed between 55-65° C. for all samples, many samples now also show a second glass transition. The exact location of this second transition depends on the components in the blend. Samples that contain PI-maleimide, PEI, or both, show a higher Tg than samples without. The addition of the PFA-PEI also appears to shift this second glass transition somewhat higher. High glass transition is beneficial as it helps the polymer to maintain its mechanical strength at higher temperatures.

The mechanical results shown in FIGS. 44-48 show that samples with PFA-PEI show improved mechanical performance over similar materials without PFA-PEI. Specifically, 869G-I show improved mechanical performance over other samples. These are the samples with PI-maleimide, PEI, or both. PEI and PI-maleimide alone give similar tensile strengths, white their combination, along with functional silica, yields the highest tensile strength and flexural modulus. The only sample that achieves both improved tensile strength and elongation at break over 100% is 869H, which contains the PFA-PEI and PI-maleimide.

Figure 48A:
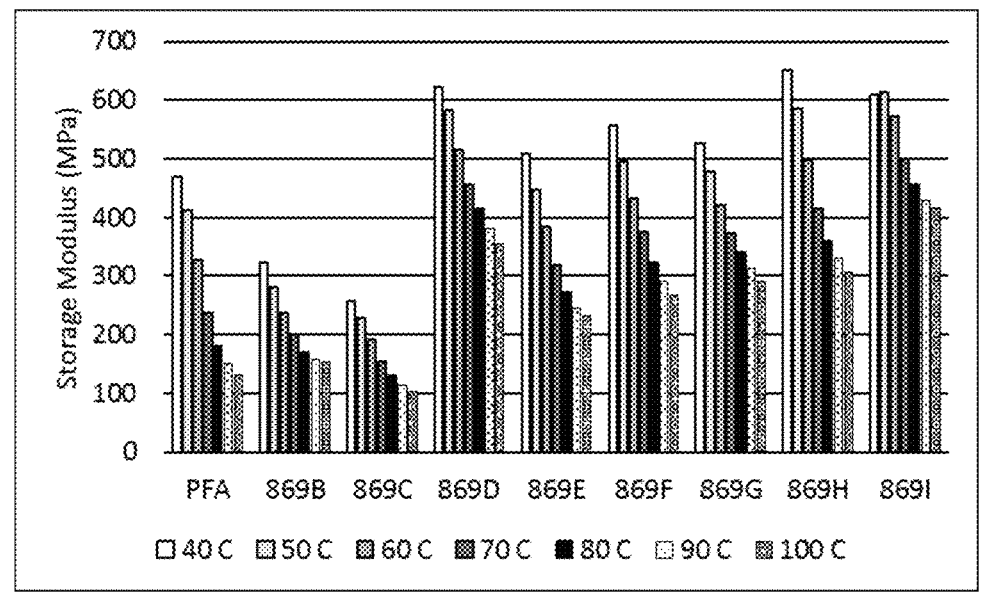
FIG. 48A shows a graph showing the storage modulus of select polymer samples.
Figure 48B:
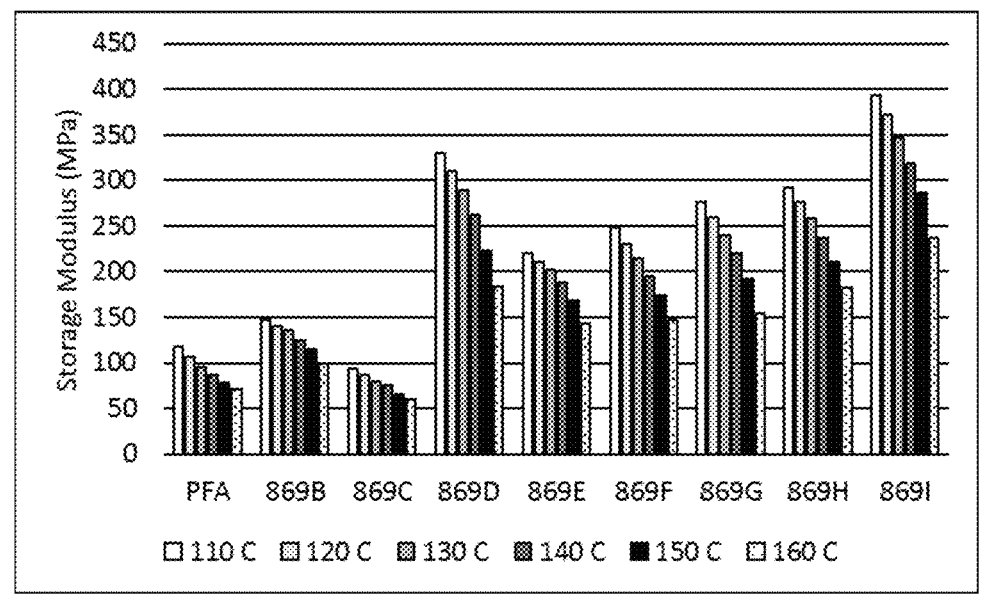
FIG. 48B shows a graph showing the storage modulus of select polymer samples.
Figure 48C:
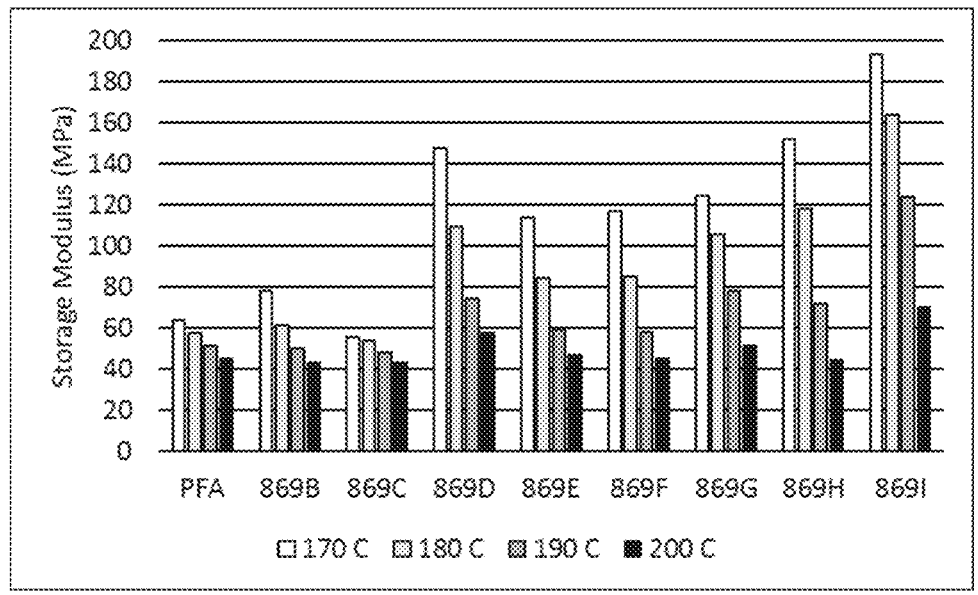
FIG. 48C shows a graph showing the storage modulus of select polymer samples
Figure 49:
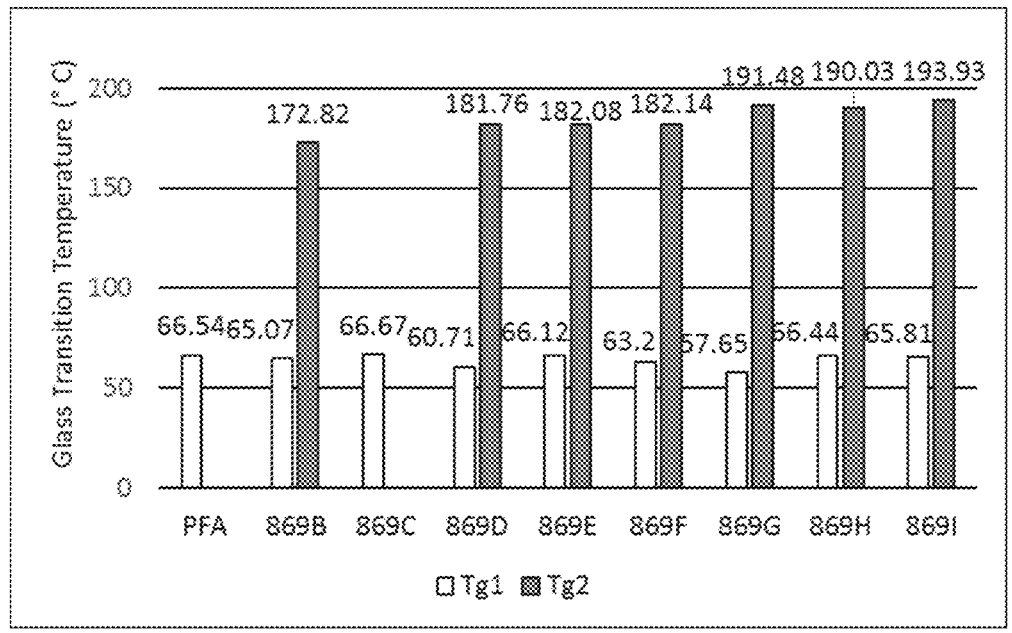
FIG. 49 shows a graph showing the glass transition temperature of select polymer samples

FIG. 48A shows the storage modulus for samples in Example 8 measured at temperatures between 40° and 100° C., while FIG. 48B shows the storage modulus measured at temperatures between 110° and 160° C. and FIG. 48C shows the storage modulus measured at temperatures between 170° and 200° C. This data was collected on injection molded parts via DMA. Note that the samples that contain PFA-PEI (869D-I) show higher storage modulus than PFA at 40°-200° C.

FIG. 49 shows the glass phase transition temperature for samples in Example 8. This data was collected on injection molded parts via DMA. All samples show a first Tg1 peak between 57°-67° C. All samples that contain PI-tetravinyl show a secondary Tg2 peak between 170°-195° C.

Figure 50:
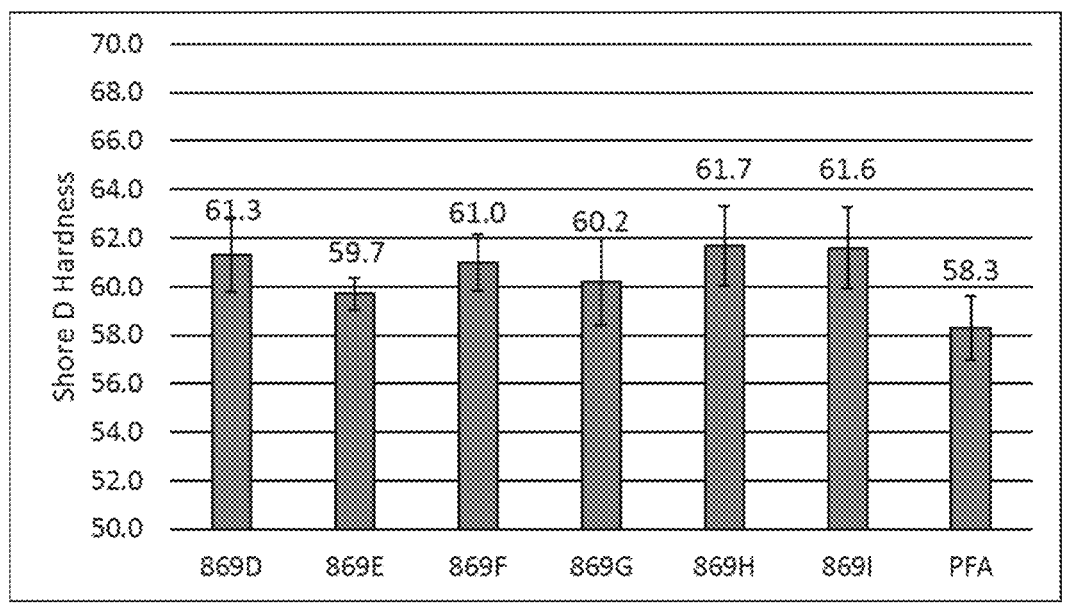
FIG. 50 shows a graph showing the shore D hardness of select polymer samples

The hardness results shown in FIG. 50 also support the analysis that the PI-maleimide improves mechanical performance. While many samples show a higher hardness than PFA, the highest two are from samples with PI-maleimide.

FIG. 50 shows the shore D hardness of samples studied in Example 8. Many samples have hardness higher than that of PFA. Error bars represent one standard deviation; data collected on injection molded parts.

Figure 51A:
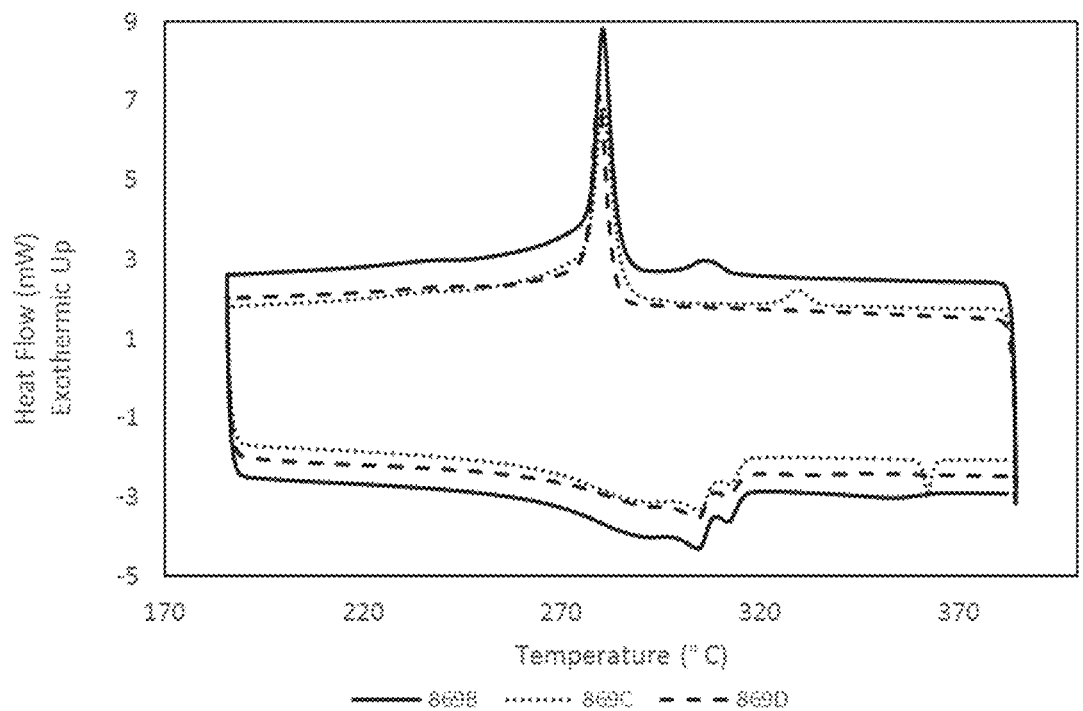
FIG. 51A shows a graph showing the thermal response of selected polymer samples.

The use of DSC offers potential insight into the improved mechanical performance of samples in this example. As can be seen in FIG. 51A, samples that contain PFA-PEI do not display the bisoxazoline melting peak that is observed in samples without it. Without being bound by theory, it is believed that PI-tetravinyl seems to mask this peak somewhat, but the combination of PI-tetravinyl and PFA-PEI seems to allow the full incorporation of the bisoxazoline. In doing so, additional cross-links can be created, resulting in a stiffer, harder system.

Figure 51B:
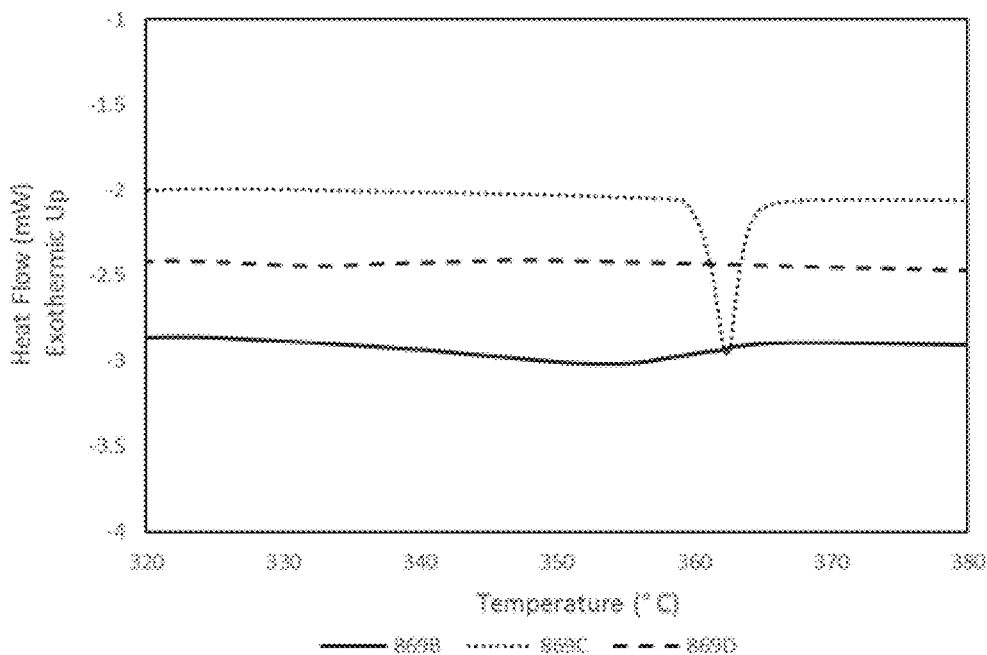
FIG. 51B shows a specific section of the graph showing the thermal response of selected polymer samples shown in FIG. 51A.

FIG. 51A shows DSC curves of selected samples in this Example 8. The addition of PI-tetravinyl appears to reduce the amount of crystalline bisoxazoline. Further addition of PFA-PEI makes it such that the bisoxazoline melting peak is not observable. This data was collected on pellets, not injection molded parts. FIG. 51B shows the area of interest in greater detail.

Figure 52:
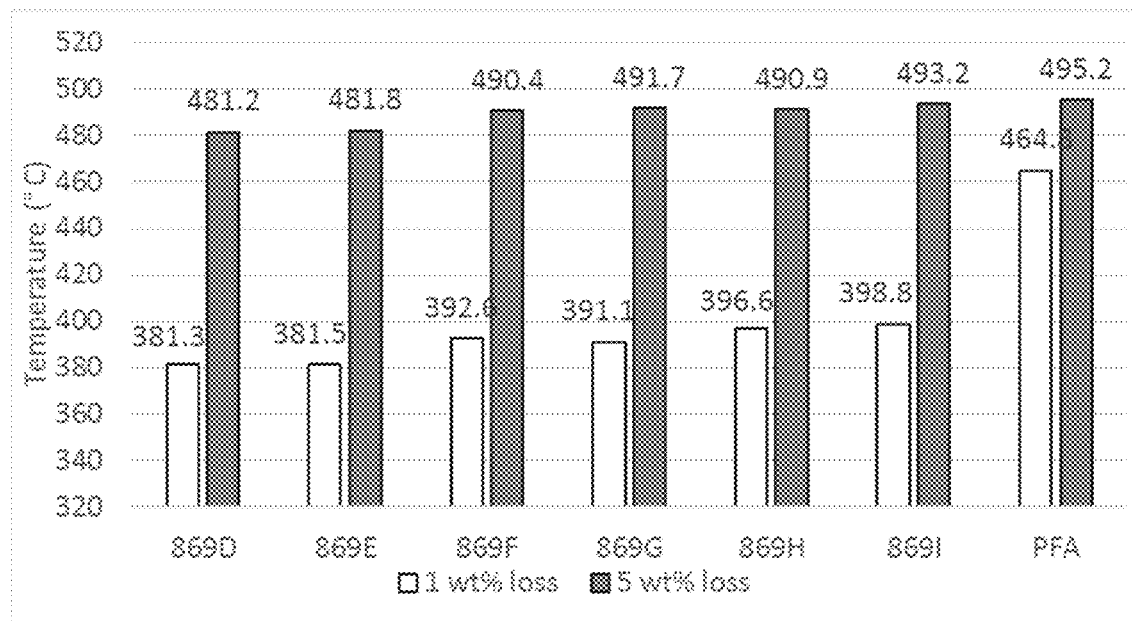
FIG. 52 shows a graph showing the weight loss temperatures of selected polymer samples.

FIG. 52 shows the thermal degradation of samples in Example 8, as measured by TGA of pellets. All samples show lower 1% and 5% weight loss temperatures compared to PFA.

FIG. 52 shows the 1% and 5% weight loss temperatures of samples. The sample with the thermal degradation temperatures closest to that of PFA is the one that contains both PI-maleimide and PEI. This is consistent with the trends in thermal stability seen in FIGS. 47 and 48.

Example 9: PFA-PEI Improvement Comparison Data

Two compositions may be used to illustrate the efficacy of the PFA-PEI in enhancing physical properties. Comparing samples 869B and 869D shows the impact PFA-PEI may have in some embodiments. These compositions can be found in Table 28.

TABLE 28

Compositions of Two Select Samples

| Sample | PFA (%) | 4,4'-Bis (2,benzoxazolyl) stilbene (%) | PI-tetravinyl (%) | PFA-PEI (%) |
|---|---|---|---|---|
| AW2008869B | 94.00 | 2.0 | 4.0 | 0.0 |
| AW2008869D | 70.46 | 2.0 | 6.0 | 21.54 |

Figure 54A:
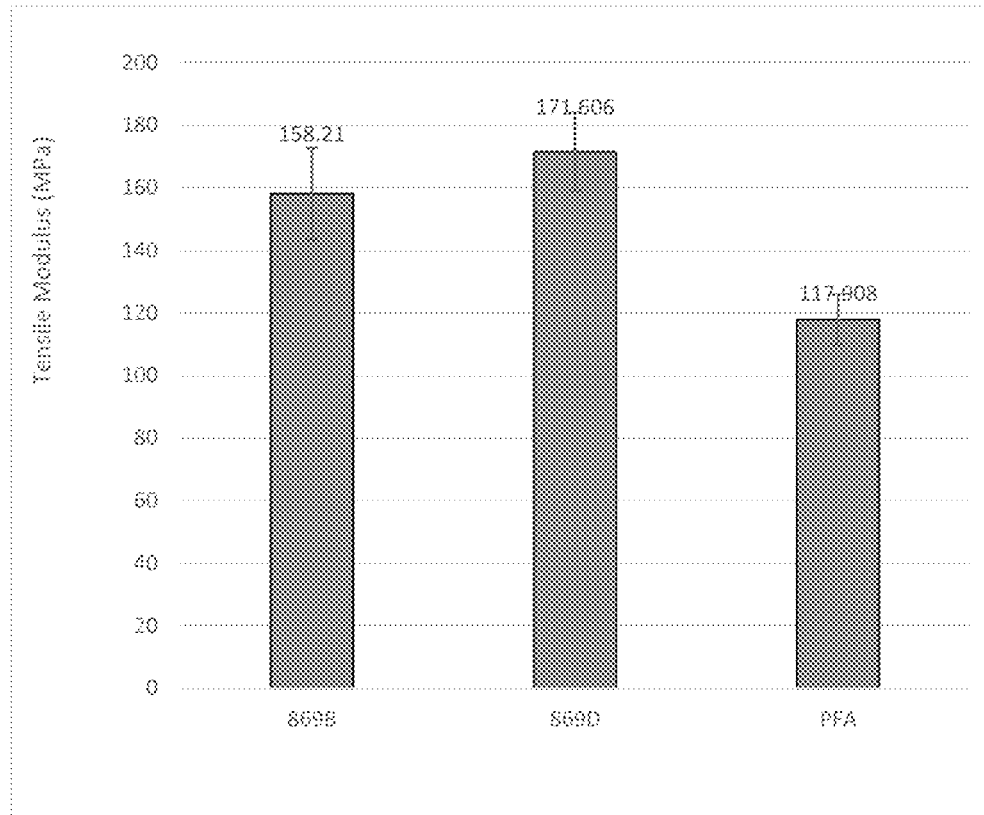
FIG. 54A shows a graph showing the tensile modulus of selected polymer samples.
Figure 54B:
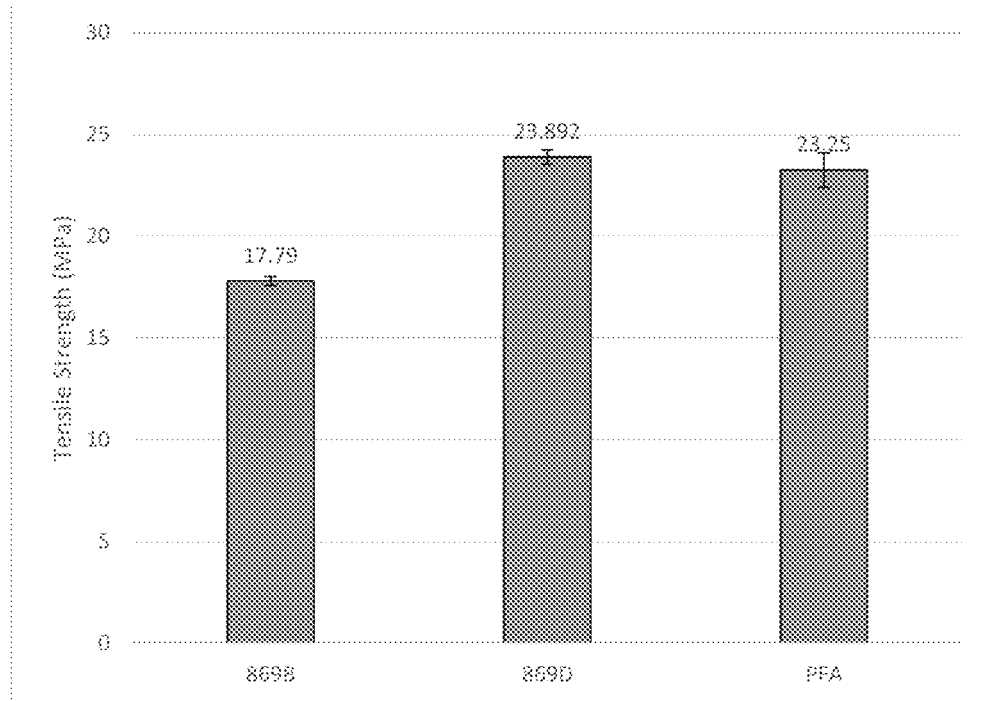
FIG. 54B shows a graph showing the tensile strength of selected polymer samples.

FIG. 54A shows the tensile modulus of the samples of Example 9. FIG. 54B shows the tensile strength of the samples of Example 9. Samples with PFA-PEI show improved tensile strength over samples without. The error bars represent one standard deviation.

Figure 55:
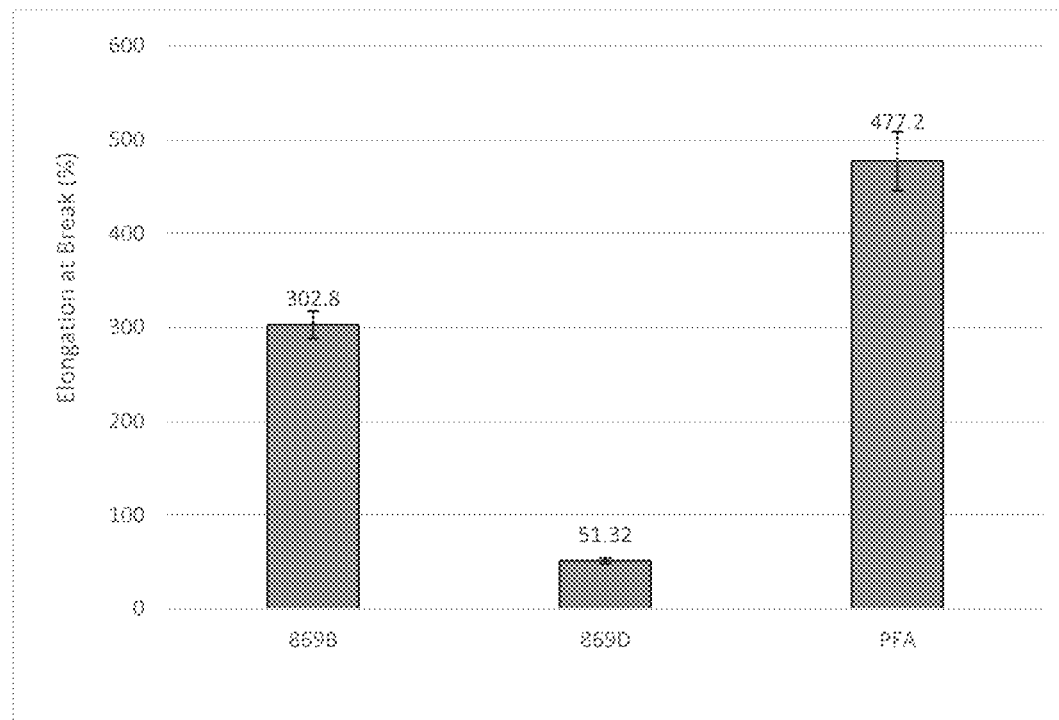
FIG. 55 shows a graph showing the elongation of selected polymer samples.

FIG. 55 shows the elongation at break of select samples to compare the impact of PFA-PEI on performance. Samples with PFA-PEI show elongation that is less than 17% of the value without PFA-PEI. The error bars represent one standard deviation.

Figure 56:
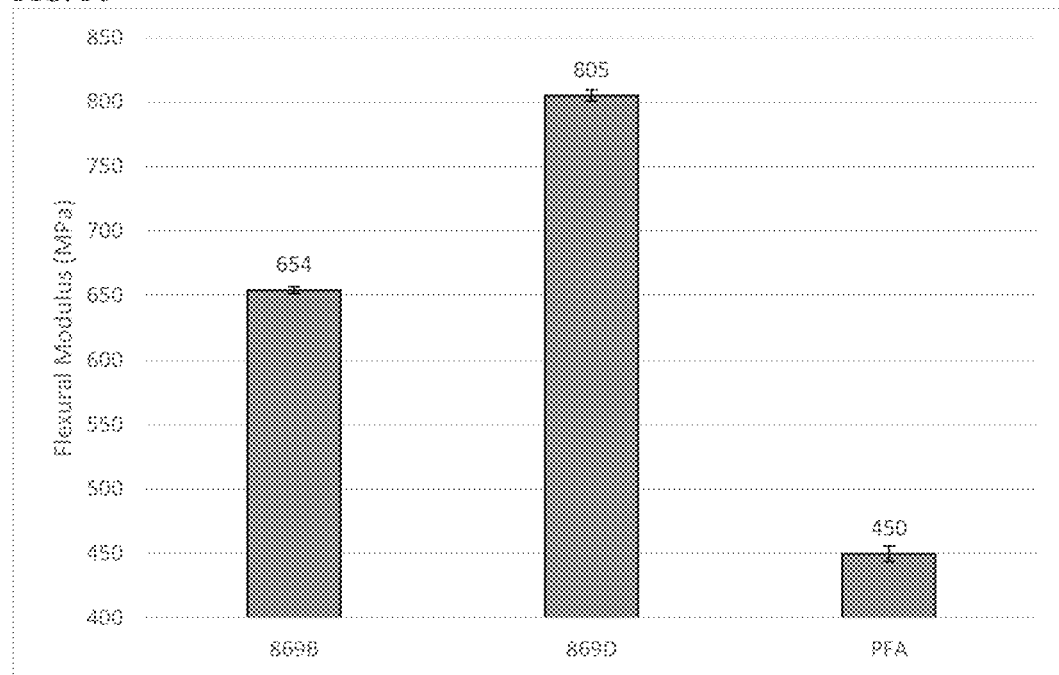
FIG. 56 shows a graph showing the flexural modulus of selected polymer samples.

FIG. 56 shows the flexural modulus of select samples to determine the impact of PFA-PEI. As with tensile strength, PFA-PEI improves flexural modulus. The error bars represent one standard deviation.

In FIG. 51 from Example 8 above, the DSC curves of samples 869B and 869D can be seen. The curve of 869D does not show a melting peak at approximately 360° C., whereas 869B does. Without being bound by theory, this suggests that the PFA-PEI allows the bisoxazoline to react with the other components, causing its melting peak to disappear. The incorporation of additional bisoxazoline may allow for more cross-linking sites for the PI-tetravinyl to cross-link.

The melt flow rates of selected samples discussed herein are shown in Table 29.

TABLE 29

MFR of selected samples

| Sample | MFR (g/10 min) |
|---|---|
| 811A | 32.46 |
| 811B | 32.86 |
| 811C | 33.07 |

TABLE 29-continued

MFR of selected samples

| Sample | MFR (g/10 min) |
|---|---|
| 811D | 33.05 |
| 814E | 32.21 |
| 814F | 33.66 |
| 814I | 32.92 |
| 814J | 32.9 |
| 814M | 33.46 |
| 814Q | 41.07 |
| 838A | 37.71 |
| 838B | 47.69 |
| 842A | 54.48 |
| 842B | 38.44 |
| 842C | 84 |
| 842D | 39.77 |
| 842F | 54.59 |
| 869B | 60.0411 |
| 869C | 33.1354 |
| 869D | 98.0248 |
| 869E | 82.0482 |
| 869F | 79.7204 |
| 869G | 82.0592 |
| 869H | 78.8294 |
| 869I | 79.8381 |

One embodiment of this invention is shown in sample 869H when extruded at higher temperatures. This embodiment shows the following performance improvements over PFA: increase in tensile modulus by 55%, increase in tensile strength by 14%, increase in flexural modulus by 82%, increase in storage modulus at 100° and 150° C. by over 130%. This embodiment also meets potential performance requirements that other embodiments with similar improvements do not, such as: over 100% elongation at break and an increase in Shore D hardness over PFA. This sample 869H has 2 wt % of bisoxazoline, 21.3% PFA-PEI, 4% PI-tetravinyl, and 3% PI-maleimide. Increasing the temperature profile at which this sample is extruded will increase the mechanical performance of the sample, as shown in Example 4.

Some embodiments include a polymer composition comprising a fluoropolymer such as, for example, PFA, FEP, PTFE, PVDF, Ethylene tetrafluoroethylene and hexafluoropropylene copolymer (EFEP) and/or Ethylene tetrafluoroethylene copolymer (ETFE); a copolymer of PFA and PEI, and bisoxazoline. Some embodiments may further comprise tetravinyl-terminated polyimide (PI-tetravinyl), polyimide-maleimide, amine-functionalized silica, Vinyl-functionalized silica, and/or PEI.

Some embodiments comprise between about 65% and 75% PFA and/or another fluoropolymer, between about 15% and 25% PFA-PEI copolymer, and between about 0.1% and 3% bisoxazoline. Some embodiments comprise at least 1% polyimide-maleimide.

In some embodiments, the polymer composition has a melt flow rate between about 75 and about 85 g/10 min; has a tensile modulus of greater than 140 MPa; has a tensile strength of greater than 25 MPa; has an elongation at break of at least 100%; has a flexural modulus of at least 700 MPa; has a storage modulus at 100° C. of at least 200 MPa; has a storage modulus at 160° C. of at least 150 MPa and/or has a Shore D hardness of at least 61.

Some embodiments relate to a method of cross-linking fluoropolymers that comprises creating a PFA-PEI copolymer by reacting a PFA containing at least 1,000 reactive end groups per million carbons with an amine-terminated PEI; blending the copolymer of PFA and PEI with a fluoropolymer and bisoxazoline in an extruder; and then extruding a cross-linked fluoropolymer. In some embodiments, the fluoropolymer is cross-linked after being extruded without requiring additional steps. In some embodiments, creating a PFA-PEI copolymer further comprises reacting a diamine and a dianhydride with the PFA containing at least 1,000 reactive end groups per million carbons and the amine-terminated PEI.

I. Conclusion

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

This application claims benefit of U.S. Provisional Application No. 62/881,703 filed Aug. 1, 2019, incorporated herein by reference in its entirety.

The following is claimed:

1. A polymer composition comprising:
 (a) perfluoroalkoxy alkane (PFA);
 (b) a copolymer of PFA containing 8,000 or less reactive end groups per million carbons and polyether imide (PEI); and
 (c) a bisoxazoline.

2. The polymer composition of claim 1, further comprising (d) tetravinyl-terminated polyimide (PI-tetravinyl).

3. The polymer composition of claim 1, comprising between about 65% and 75% PFA, between about 15% and 25% PFA-PEI copolymer, and between about 0.1% and 3% of the bisoxazoline.

4. The polymer composition of claim 1, further comprising at least 1% polyimide-maleimide.

5. The polymer composition of claim 1, further comprising PEI.

6. The polymer composition of claim 1, further comprising amine-functionalized silica.

7. The polymer composition of claim 1, further comprising Vinyl-functionalized silica.

8. The polymer composition of claim 1, wherein the composition has a melt flow rate measured according to ASTM D-2116 of between about 75 and about 85 g/10 min.

9. The polymer composition of claim 1, wherein the composition has a tensile modulus measured according to ASTM D638 of greater than 140 MPa.

10. The polymer composition of claim 1, wherein the composition has a tensile strength measured according to ASTM D638 of greater than 25 MPa.

11. The polymer composition of claim 1, wherein the composition has an elongation at break measured according to ASTM D638 of at least 100%.

12. The polymer composition of claim 1, wherein the composition has a storage modulus at 100° C. by DMA (dynamic mechanical analysis) using a TA Instruments Q800 with a single cantilever fixture at a frequency of 1 Hz and an amplitude of 15 μm of at least 200 MPa.

13. The polymer composition of claim 1, wherein the composition has a storage modulus at 160° C. by DMA (dynamic mechanical analysis) using a TA Instruments Q800 with a single cantilever fixture at a frequency of 1 Hz and an amplitude of 15 μm of at least 150 MPa.

14. A polymer composition comprising:
(a) a fluoropolymer;
(b) a compatibilizer copolymer of PFA containing 8,000 or less reactive end groups per million carbons and polyether imide (PEI); and
(c) a bisoxazoline.

15. The polymer composition of claim 14, wherein the fluoropolymer is selected form the group consisting of PFA, FEP, PTFE, Polyvinylidene fluoride (PVDF), Ethylene tetrafluoroethylene and hexafluoropropylene copolymer (EFEP), and Ethylene tetrafluoroethylene copolymer (ETFE).

16. A method of cross-linking fluoropolymers comprising:
(a) creating a copolymer of PFA and PEI by reacting a PFA containing at least 1,000 reactive end groups per million carbons with an amine-terminated PEI;
(b) blending the copolymer of PFA and PEI with a fluoropolymer and a bisoxazoline in an extruder; and
(c) extruding a cross-linked fluoropolymer.

17. The method of claim 16, wherein step (a) further comprises reacting a diamine and a dianhydride with the PFA containing at least 1,000 reactive end groups per million carbons and the amine-terminated PEI.

18. The method of claim 16 wherein the fluoropolymer is selected from the group consisting of PFA and FEP.

* * * * *